(12) United States Patent
Haase

(10) Patent No.: US 8,161,748 B2
(45) Date of Patent: Apr. 24, 2012

(54) WATER COMBUSTION TECHNOLOGY—METHODS, PROCESSES, SYSTEMS AND APPARATUS FOR THE COMBUSTION OF HYDROGEN AND OXYGEN

(75) Inventor: Richard Alan Haase, Missouri City, TX (US)

(73) Assignee: ClearValue Technologies, Inc., Missouri City, TX (US)

( * ) Notice: Subject to any disclaimer, the term of this patent is extended or adjusted under 35 U.S.C. 154(b) by 0 days.

(21) Appl. No.: 10/790,316

(22) Filed: Mar. 1, 2004

(65) Prior Publication Data
US 2005/0198958 A1    Sep. 15, 2005

Related U.S. Application Data

(63) Continuation of application No. PCT/US03/11250, filed on Apr. 10, 2003.

(60) Provisional application No. 60/371,768, filed on Apr. 11, 2002, provisional application No. 60/379,587, filed on May 10, 2002, provisional application No. 60/404,644, filed on Aug. 19, 2002, provisional application No. 60/447,880, filed on Feb. 14, 2003.

(51) Int. Cl.
*F01K 23/10* (2006.01)
*F02G 3/00* (2006.01)

(52) U.S. Cl. ............ 60/618; 60/775; 60/39.182; 60/670

(58) Field of Classification Search .................. 60/39.01, 60/39.05, 39.182, 39.6, 670, 775, 614, 616, 60/618
See application file for complete search history.

(56) References Cited

U.S. PATENT DOCUMENTS

| | | | |
|---|---|---|---|
| 2,406,605 A * | 8/1946 | Hurd | 556/474 |
| 3,101,592 A | 8/1963 | Robertson et al. | |
| 3,229,462 A | 1/1966 | Fatica | |
| 3,230,707 A | 1/1966 | Rothmayer et al. | |
| 3,459,953 A * | 8/1969 | Brauser et al. | 290/2 |
| 3,736,745 A | 6/1973 | Karig | |
| 3,898,794 A | 8/1975 | Ariga | |
| 3,934,409 A | 1/1976 | Quillevere | |
| 3,939,806 A | 2/1976 | Bradley | |
| 3,973,931 A | 8/1976 | Collins | |

(Continued)

FOREIGN PATENT DOCUMENTS
GB       2407372       2/2007

OTHER PUBLICATIONS

US 6,761,754, 07/2004, Kim (withdrawn)

*Primary Examiner* — Hoang Nguyen

(57) ABSTRACT

This invention presents improved combustion methods, systems, engines and apparatus utilizing $H_2$, $O_2$ and $H_2O$ as fuel, thereby providing environmentally friendly combustion products, as well as improved fuel and energy management methods, systems, engines and apparatus. The Water Combustion Technology; WCT, is based upon water ($H_2O$) chemistry, more specifically $H_2O$ combustion chemistry and thermodynamics. WCT does not use any hydrocarbon fuel source, rather the WCT uses $H_2$ preferably with $O_2$ and secondarily with air. The WCT significantly improves the thermodynamics of combustion, thereby significantly improving the efficacy of combustion, utilizing the first and second laws of thermodynamics. The WCT preferably controls combustion temperature with $H_2O$ and secondarily with air in the combustion chamber. The WCT preferably recycles exhaust gases as fuel converted from water. The WCT minimizes external cooling loops and minimizes exhaust and/or exhaust energy, thereby maximizing available work and internal energy while minimizing enthalpy and entropy losses.

37 Claims, 30 Drawing Sheets

U.S. PATENT DOCUMENTS

| | | | |
|---|---|---|---|
| 3,975,913 A * | 8/1976 | Erickson | 60/645 |
| 3,978,661 A | 9/1976 | Cheng | |
| 4,003,343 A | 1/1977 | Lee | |
| 4,013,429 A | 3/1977 | Sircar | |
| 4,094,148 A | 6/1978 | Nelson | |
| 4,135,361 A | 1/1979 | Eisenhaure | |
| 4,147,136 A | 4/1979 | Noguchi | |
| 4,167,919 A | 9/1979 | Woolley | |
| 4,209,398 A | 6/1980 | Ii | |
| 4,214,722 A | 7/1980 | Tamura | |
| 4,264,340 A | 4/1981 | Sircar | |
| 4,282,835 A | 8/1981 | Peterson | |
| 4,294,068 A | 10/1981 | Klees | |
| 4,324,664 A | 4/1982 | Snyder | |
| 4,326,980 A | 4/1982 | Snyder | |
| 4,329,158 A | 5/1982 | Sircar | |
| 4,350,313 A | 9/1982 | Adomeit | |
| 4,440,545 A * | 4/1984 | Weidig | 44/351 |
| 4,442,009 A | 4/1984 | O'Leary | |
| 4,481,018 A | 11/1984 | Coe | |
| 4,519,563 A | 5/1985 | Tamura | |
| 4,544,378 A | 10/1985 | Coe | |
| 4,573,435 A | 3/1986 | Shelton | |
| 4,622,924 A | 11/1986 | Lewis | |
| 4,631,131 A | 12/1986 | Cuisia | |
| 4,640,793 A | 2/1987 | Persinski | |
| 4,664,857 A * | 5/1987 | Nambu | 264/28 |
| 4,685,939 A | 8/1987 | Kratz | |
| 4,841,731 A * | 6/1989 | Tindell | 60/641.8 |
| 4,845,941 A | 7/1989 | Paul | |
| 4,942,733 A | 7/1990 | Hosford | |
| 4,957,704 A | 9/1990 | Dohner | |
| 4,960,522 A | 10/1990 | Amjad | |
| 4,975,219 A | 12/1990 | Sato | |
| 4,980,433 A | 12/1990 | Chen | |
| 5,023,011 A | 6/1991 | Busch | |
| 5,068,042 A | 11/1991 | Hen | |
| 5,073,269 A | 12/1991 | Denzinger | |
| 5,137,548 A | 8/1992 | Grenier | |
| 5,152,813 A | 10/1992 | Coe | |
| 5,171,477 A | 12/1992 | Kreh | |
| 5,177,952 A | 1/1993 | Stone | |
| 5,222,361 A | 6/1993 | Nelson | |
| 5,226,593 A | 7/1993 | Beryozkin | |
| 5,245,832 A | 9/1993 | Roberts | |
| 5,258,058 A | 11/1993 | Coe | |
| 5,268,023 A | 12/1993 | Kirner | |
| 5,288,410 A | 2/1994 | Cuisia | |
| 5,331,806 A | 7/1994 | Warkentin | |
| 5,341,646 A | 8/1994 | Agrawal | |
| 5,343,699 A | 9/1994 | McAlister | |
| 5,354,360 A | 10/1994 | Coe | |
| 5,382,367 A | 1/1995 | Zinkan | |
| 5,386,692 A | 2/1995 | Laforce | |
| 5,388,395 A * | 2/1995 | Scharpf et al. | 60/781 |
| 5,398,500 A | 3/1995 | Simpkin | |
| 5,402,647 A | 4/1995 | Bonaquist | |
| 5,413,625 A | 5/1995 | Chao | |
| 5,417,957 A | 5/1995 | Coe | |
| 5,419,891 A | 5/1995 | Coe | |
| 5,438,835 A | 8/1995 | Rathbone | |
| 5,440,884 A | 8/1995 | Bonaquist | |
| 5,454,857 A | 10/1995 | Chao | |
| 5,456,083 A | 10/1995 | Hogg | |
| 5,463,871 A | 11/1995 | Cheung | |
| 5,464,467 A | 11/1995 | Fitch | |
| 5,516,359 A * | 5/1996 | Kang et al. | 95/14 |
| 5,548,952 A | 8/1996 | Stock et al. | |
| 5,581,997 A | 12/1996 | Janes | |
| 5,582,035 A | 12/1996 | Rathbone | |
| 5,582,036 A | 12/1996 | Drnevich | |
| 5,596,886 A | 1/1997 | Howard | |
| 5,599,383 A | 2/1997 | Dyer | |
| 5,644,911 A | 7/1997 | Huber | |
| 5,672,195 A | 9/1997 | Moreau | |
| 5,755,089 A | 5/1998 | Vanselow | |
| 5,761,896 A | 6/1998 | Dowdy et al. | |
| 5,765,396 A | 6/1998 | Bonaquist | |
| 5,772,913 A | 6/1998 | Gill | |
| 5,775,091 A | 7/1998 | Bannister et al. | |
| 5,782,081 A | 7/1998 | Pak et al. | |
| 5,797,997 A | 8/1998 | Noreen | |
| 5,800,732 A | 9/1998 | Coughlin et al. | |
| 5,809,768 A | 9/1998 | Uematsu et al. | |
| 5,810,909 A | 9/1998 | Notaro | |
| 5,820,654 A | 10/1998 | Gottzman | |
| 5,820,655 A | 10/1998 | Gottzmann | |
| 5,837,125 A | 11/1998 | Prasad | |
| 5,868,818 A | 2/1999 | Ogawa | |
| 5,885,331 A | 3/1999 | Reiss | |
| 5,896,755 A | 4/1999 | Wong | |
| 5,899,072 A * | 5/1999 | Gode | 60/670 |
| 5,902,379 A | 5/1999 | Phillips | |
| 5,924,287 A | 7/1999 | Best | |
| 5,930,990 A | 8/1999 | Zachary | |
| 5,934,104 A | 8/1999 | Fidkowski | |
| 5,953,900 A | 9/1999 | Bannister et al. | |
| 5,986,206 A | 11/1999 | Kambe | |
| 5,996,336 A | 12/1999 | Hamedani | |
| 6,004,378 A | 12/1999 | Reiss | |
| 6,048,509 A | 4/2000 | Kawai | |
| 6,051,777 A | 4/2000 | Ashcroft | |
| 6,075,203 A | 6/2000 | Wang | |
| 6,082,136 A | 7/2000 | Yoshino | |
| 6,092,989 A | 7/2000 | Siga | |
| 6,117,210 A | 9/2000 | Prasad | |
| 6,128,903 A | 10/2000 | Riege | |
| 6,139,810 A | 10/2000 | Gottzmann | |
| 6,171,370 B1 | 1/2001 | Hirano | |
| 6,172,296 B1 | 1/2001 | Iwasaki | |
| 6,173,584 B1 | 1/2001 | Agrawal | |
| 6,202,441 B1 | 3/2001 | Ha | |
| 6,212,876 B1 * | 4/2001 | Gregory et al. | 60/201 |
| 6,214,636 B1 | 4/2001 | Sawayama | |
| 6,250,097 B1 | 6/2001 | Lui | |
| 6,263,700 B1 | 7/2001 | Agrawal | |
| 6,277,483 B1 | 8/2001 | Peinemann | |
| 6,279,321 B1 | 8/2001 | Forney | |
| 6,286,315 B1 | 9/2001 | Staehle | |
| 6,289,666 B1 | 9/2001 | Ginter | |
| 6,293,084 B1 | 9/2001 | Drnevich | |
| 6,298,651 B1 | 10/2001 | Iijima | |
| 6,298,664 B1 | 10/2001 | Åsen | |
| 6,298,668 B1 | 10/2001 | Lo | |
| 6,305,901 B1 | 10/2001 | Bell | |
| 6,315,814 B1 | 11/2001 | Barry et al. | |
| 6,315,876 B1 | 11/2001 | Delahoyde | |
| 6,320,395 B1 | 11/2001 | Bosch | |
| 6,321,915 B1 | 11/2001 | Wilson | |
| 6,331,243 B1 | 12/2001 | Lewis | |
| 6,332,754 B1 | 12/2001 | Matsuda | |
| 6,333,015 B1 | 12/2001 | Lewis | |
| 6,333,445 B1 | 12/2001 | OBrien | |
| 6,336,430 B2 | 1/2002 | de Souza | |
| 6,338,786 B1 | 1/2002 | Thorpe | |
| 6,341,941 B1 | 1/2002 | Namura | |
| 6,345,952 B1 | 2/2002 | Oeynhausen | |
| 6,346,188 B1 | 2/2002 | Shuster | |
| 6,347,534 B1 | 2/2002 | Ha | |
| 6,348,143 B1 | 2/2002 | Serikawa | |
| 6,350,298 B1 | 2/2002 | Su | |
| 6,354,798 B1 | 3/2002 | Deckers | |
| 6,357,601 B1 | 3/2002 | Bowers | |
| 6,358,004 B1 | 3/2002 | Shiga | |
| 6,358,397 B1 | 3/2002 | Lyublinski | |
| 6,360,524 B1 | 3/2002 | Drnevich | |
| 6,361,583 B1 | 3/2002 | Pinnau | |
| 6,361,893 B1 | 3/2002 | George | |
| 6,363,710 B1 | 4/2002 | Gebke | |
| 6,372,020 B2 | 4/2002 | Hong | |
| 6,375,906 B1 | 4/2002 | Edlund | |
| 6,376,113 B1 | 4/2002 | Edlund | |
| 6,381,969 B1 | 5/2002 | Afeiche | |
| 6,383,670 B1 | 5/2002 | Edlund | |
| 6,403,041 B1 | 6/2002 | Takahashi | |
| 6,406,997 B1 | 6/2002 | Schroder | |
| 6,423,121 B1 | 7/2002 | Kiyama | |

| | | | | | | |
|---|---|---|---|---|---|---|
| 6,444,189 B1 | 9/2002 | Wang | | 6,571,549 B1 | 6/2003 | Stanek |
| 6,453,893 B1 | 9/2002 | Coleman et al. | | 6,572,678 B1 | 6/2003 | Wijmans |
| 6,459,231 B1 | 10/2002 | Kagatani | | 6,572,679 B2 | 6/2003 | Baker |
| 6,465,118 B1 | 10/2002 | Dickman et al. | | 6,572,759 B1 | 6/2003 | Nishimura |
| 6,471,834 B2 | 10/2002 | Roe | | 6,572,838 B1 | 6/2003 | Sebastian |
| 6,488,995 B1 | 12/2002 | Nishimoto | | 6,579,341 B2 | 6/2003 | Baker |
| 6,489,553 B1 | 12/2002 | Fraas | | 6,580,027 B2 | 6/2003 | Forrest |
| 6,497,098 B2 | 12/2002 | Griffin | | 6,585,882 B1 | 7/2003 | Su |
| 6,499,312 B1 | 12/2002 | Bergman | | 6,588,212 B1 * | 7/2003 | Wallace et al. ............... 60/772 |
| 6,503,648 B1 | 1/2003 | Wang | | 6,589,033 B1 | 7/2003 | Johnson |
| 6,506,295 B1 | 1/2003 | Takahashi | | 6,592,650 B2 | 7/2003 | Pinnau |
| 6,508,210 B2 | 1/2003 | Knowlton | | 6,593,522 B2 | 7/2003 | Nakano |
| 6,510,693 B2 | 1/2003 | Winkler | | 6,594,999 B2 | 7/2003 | Mandai |
| 6,513,330 B1 | 2/2003 | Rice | | 6,644,015 B2 | 11/2003 | McKinney |
| 6,515,219 B2 | 2/2003 | Kondo | | 6,649,556 B2 | 11/2003 | Masini |
| 6,516,787 B1 | 2/2003 | Dutart | | 6,649,824 B1 | 11/2003 | Den |
| 6,516,905 B1 | 2/2003 | Baumert | | 6,652,626 B1 | 11/2003 | Plee |
| 6,523,529 B1 | 2/2003 | Moncelle | | 6,657,378 B2 | 12/2003 | Forrest |
| 6,530,226 B1 | 3/2003 | Harazim | | 6,660,417 B1 | 12/2003 | Nishio |
| 6,536,234 B1 | 3/2003 | Shah | | 6,691,504 B1 | 2/2004 | Provitola |
| 6,537,352 B2 | 3/2003 | Edlund | | 6,698,183 B1 * | 3/2004 | Thordarson ............... 60/39.6 |
| 6,538,194 B1 | 3/2003 | Koyanagi | | 6,761,155 B2 | 7/2004 | Livingston |
| 6,551,386 B2 | 4/2003 | Weiler | | 6,767,663 B2 | 7/2004 | Li |
| 6,551,735 B2 | 4/2003 | Badding | | 6,774,300 B2 | 8/2004 | McFarland |
| 6,562,104 B2 | 5/2003 | Bool, III | | 6,780,806 B1 | 8/2004 | Yang |
| 6,564,581 B2 | 5/2003 | Pompl | | 6,783,741 B2 | 8/2004 | Edlund |
| 6,565,626 B1 | 5/2003 | Baker | | 7,062,912 B2 * | 6/2006 | Penfornis et al. ............... 60/649 |
| 6,568,908 B2 | 5/2003 | Namura | | | | |

\* cited by examiner

Figure 1
WCT Symbols in Flow Diagrams and in Figures 1 through 23A

| Symbol | Description | Notes |
|---|---|---|
| Combustion Engine (CE) | Combustion Engine | CE can be any combustion design as is known in the art, i.e. internal combustion engine, turbine, furnace, etc. CE combines fuel and ignites fuel with a spark generation device. Fuel is most preferably $O_2$, $H_2$ and $H_2O$. Fuel is preferably $O_2$ and $H_2$. Fuel can be used in combination with air. |
| ◁ | Gas Compressor | Used in Cryogenic Refrigeration. Designs are plentiful in the art. Compressor symbols: A = Air, D1 = First Distillation, D2 = Second Distillation, O1 = $O_2$, H1 = $H_2$, O = $O_2$ Storage and H = $H_2$ Storage. |
| ▷ | Joule-Thompson Expansion Valve | Two types are normally used in the art --<br>1. An expansion valve, 2. A cylinder. |
| ▯ | Separation (Distillation Column) | Diameter and Height dependent upon separation efficiency and loading. Separation efficiency dependent upon compounds separated and column packing. Distillation Temperatures are relative to Separation Operating Pressure.<br>Depending on the desired $O_2$ purity, the second $O_2/N_2$ separation column is optional. |
| Q X'fer | Heat Exchanger to cool compressed gases | During normal operation, it is preferred that the waste $N_2$ is coolant. Depending upon design, upon start-up water may be necessary for an efficient start-up. |
| ○ | Cryogenic Storage Tank | Tank is to be made of materials known in the art to withstand liquid cryogenic temperatures/pressure of $O_2$ and/or $H_2$. Tank may have refrigeration loop per Figure 13, which operates of off at least one of: the combustion engine, a battery and a fuel cell. |
| - +<br>T | Turbine | Depending upon application, turbine is to be turned by steam, air or water movement.<br>Turbine is preferred to generate electricity, preferably driving a generator and/or alternator. It is most preferred that the electricity performs electrolysis. |
| PC | Pressure Controller | Pressure controller can be of any design as is known in the art. PC protects downstream equipment from pressure surges. In high pressure surge situations, PC vents to the atmosphere. |
| Q | Energy in the form of heat | Energy is transferred (managed) during many methods, processes and systems of this invention. |
| CONT | Fuel Mixture Controller | $H_2$, $O_2$, $H_2O$, air bypass and engine coolant. Controller manages fuel mixture ratios. $H_2O$ ratio in combustion is managed depending upon combustion temperature and/or engine temperature. Air bypass is to be managed depending upon $O_2$ tank level. Engine coolant loop dependant on high engine temperature. |

Figure 1A
WCT Symbols in Flow Diagrams and in Figures 1 through 23A

| Symbol | Description | Notes |
|---|---|---|
| | Clutch | Used to transfer $E_w$ to at least one of a flywheel and a generator. Clutch preferably engages during periods of little to no work and disengaged during periods of work. Design and assembly to be as known in the art. |
| | Flywheel | Used to store rotational kinetic energy during periods of little to no work; rotational energy to be utilized during periods of work. |
| | Generator | Used to generate electrical energy. Generator can be of the type to generate an alternating current (A/C), such as in power generation applications or a Dynamo to generate a direct current (D/C) to power electrolysis. A/C current can be turned into D/C with an A/C to D/C converter and D/C can be turned into A/C with a D/C to A/C converter. |
| | Electrolysis | Electrolysis of $H_2O$ to $O_2$ and $H_2$ is to be performed. Electrolysis is to be performed by methods and systems known in the art of electrolysis. It is most preferred that an electrolyte be present in the H2O to further electrolysis and the efficiency of electrolysis. It is preferred that the electrolysis unit be cooled. |
| | Air Line | Line primarily contains air. |
| ................ | $O_2$ Line | Line primarily contains $O_2$. |
| — — — | $N_2$ Line | Line primarily contains $N_2$. |
| | $H_2$ Line | Line primarily contains $H_2$. |
| —.—.. | $H_2O$ Line | Line primarily contains $H_2O$. |
| —..—. | Products Line | Line primarily contains combustion products, preferably $H_2O$, yet can be $H_2O$ and X, wherein X is $N_2$, $CO_x$ and $NO_x$ and can contain $SO_x$. |
| — — — — | Coolant (C) Line | Line symbol indicates flow of coolant, which is preferably used with electrolysis. C can be used with CE; however this is not preferred. C can be any type as is known in the art; coolant is preferred a mixture of water, glycol, corrosion inhibitor and dispersant. |
| | Control Line | Electrical or pneumatic line. Electrical wire carrying a small current, preferably 4 to 20 mA. Pneumatic line may carry a gas and/or a liquid under pressure. |
| —■— | Flow Transmitter & Control Valve | Used in combination with control line and controller (CONT.) to control flow of fuel and/or coolant (C) |
| | Coolant Radiator | Used to release heat from coolant and pump back to heat source. Preferably used for electrolysis. Preferably used to cool oil for CE. It is not preferred to cool CE. |

Combustion Fueled by H₂ and O₂ with Air as Alternate - O₂ Distillation

Combustion Fueled by $H_2$ and $O_2$ with Air as Alternate – Electrolysis – $H_2$ Catalysis Combustion Fueled by H₂ and O₂ with Air as Alternate - Electrolysis - H₂ Catalysis - O₂ Distillation Combustion Fueled by $H_2$ and $O_2$ with Air as Alternate - Electrolysis - $O_2$ Separation by Membranes or PSA Combustion Fueled by $H_2$ and $O_2$ with Air as Alternate – $H_2$ Catalysis – $O_2$ Distillation Combustion Fueled by H₂ and O₂ with Air as Alternate – O₂ Distillation Combustion Fueled by H₂ and O₂ with Air as Alternate - H₂ Catalysis O₂ Separation by Membranes or PSA

Combustion Fueled by $H_2$ and $O_2$ and/or Air - Fuel Preheating

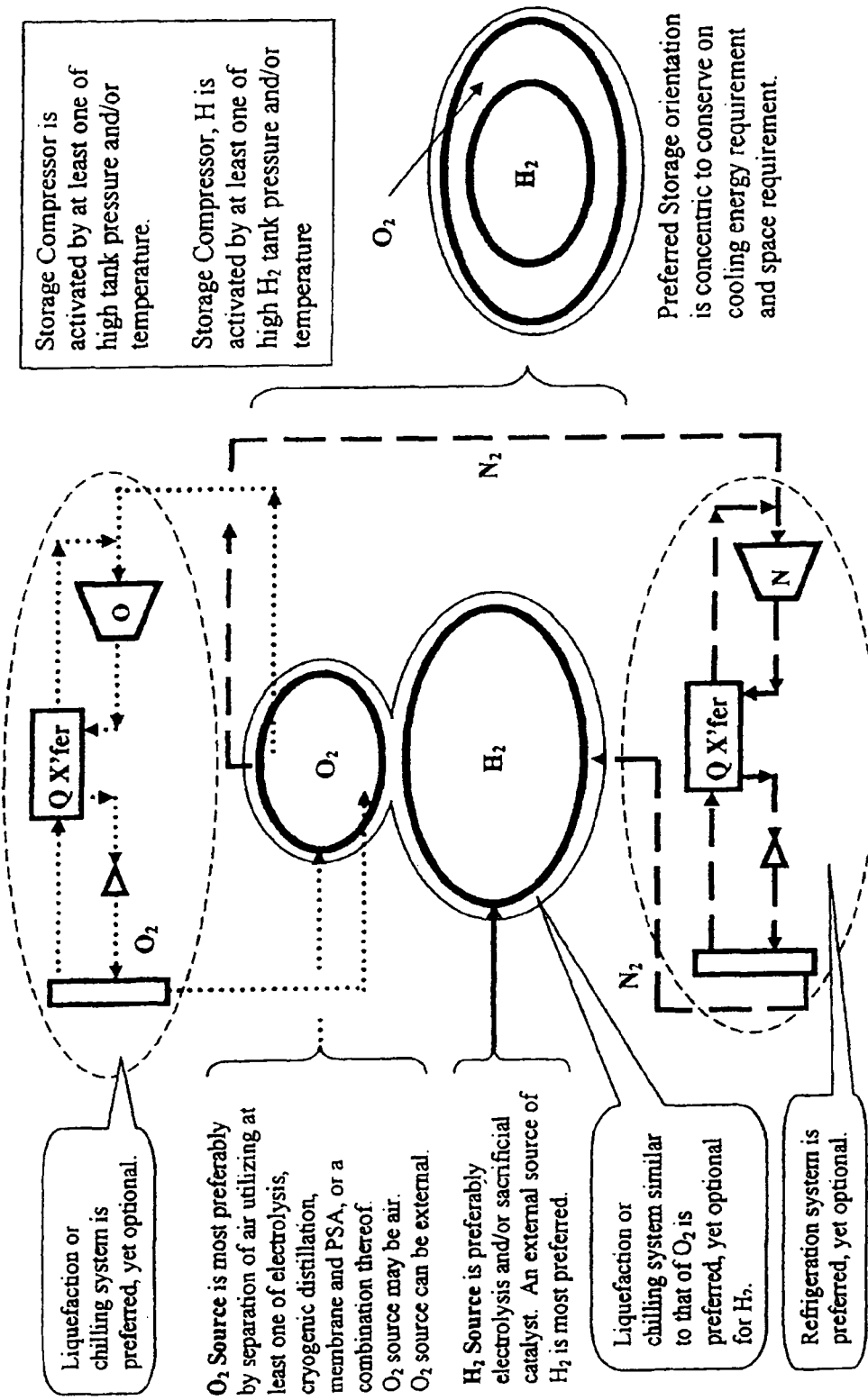

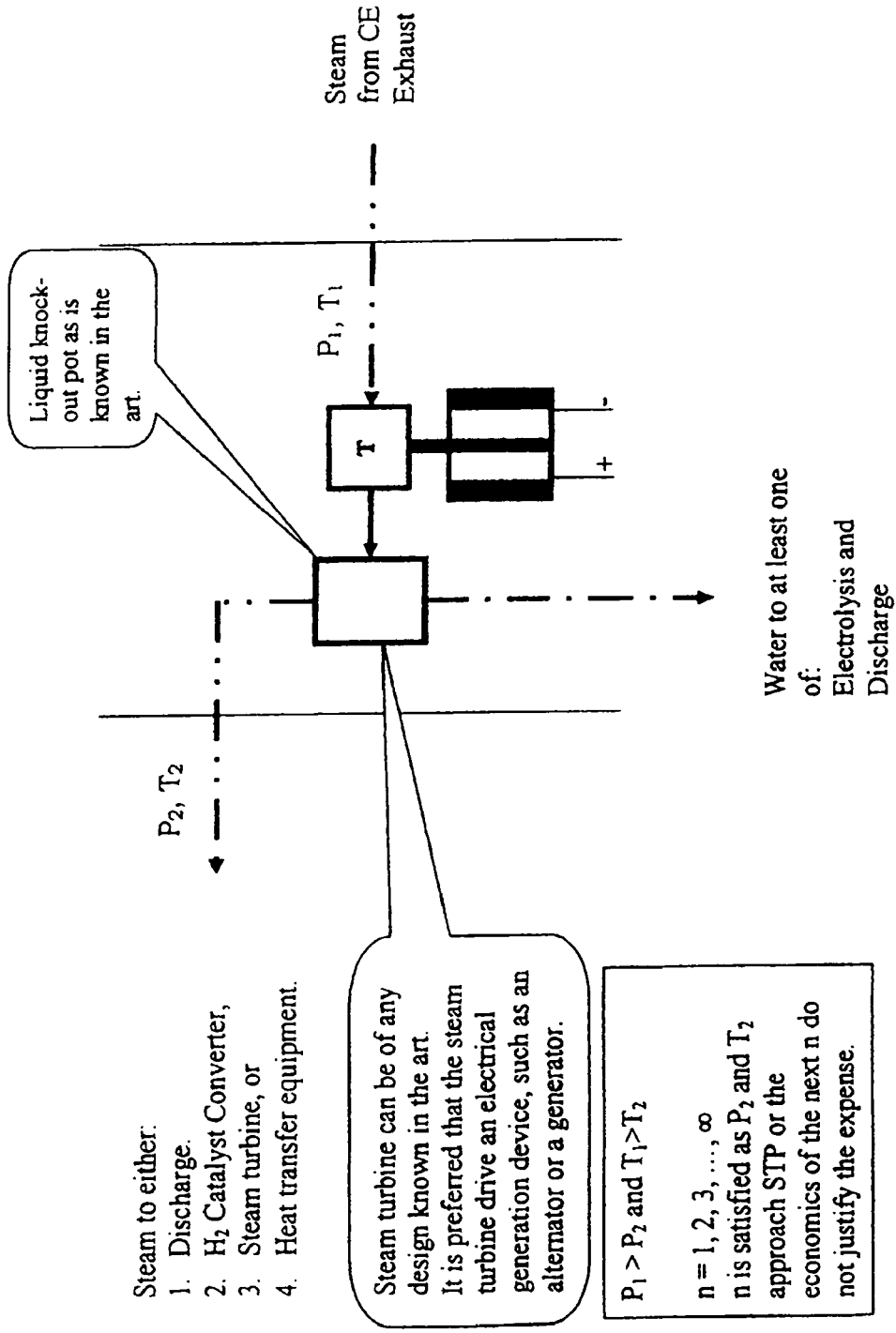

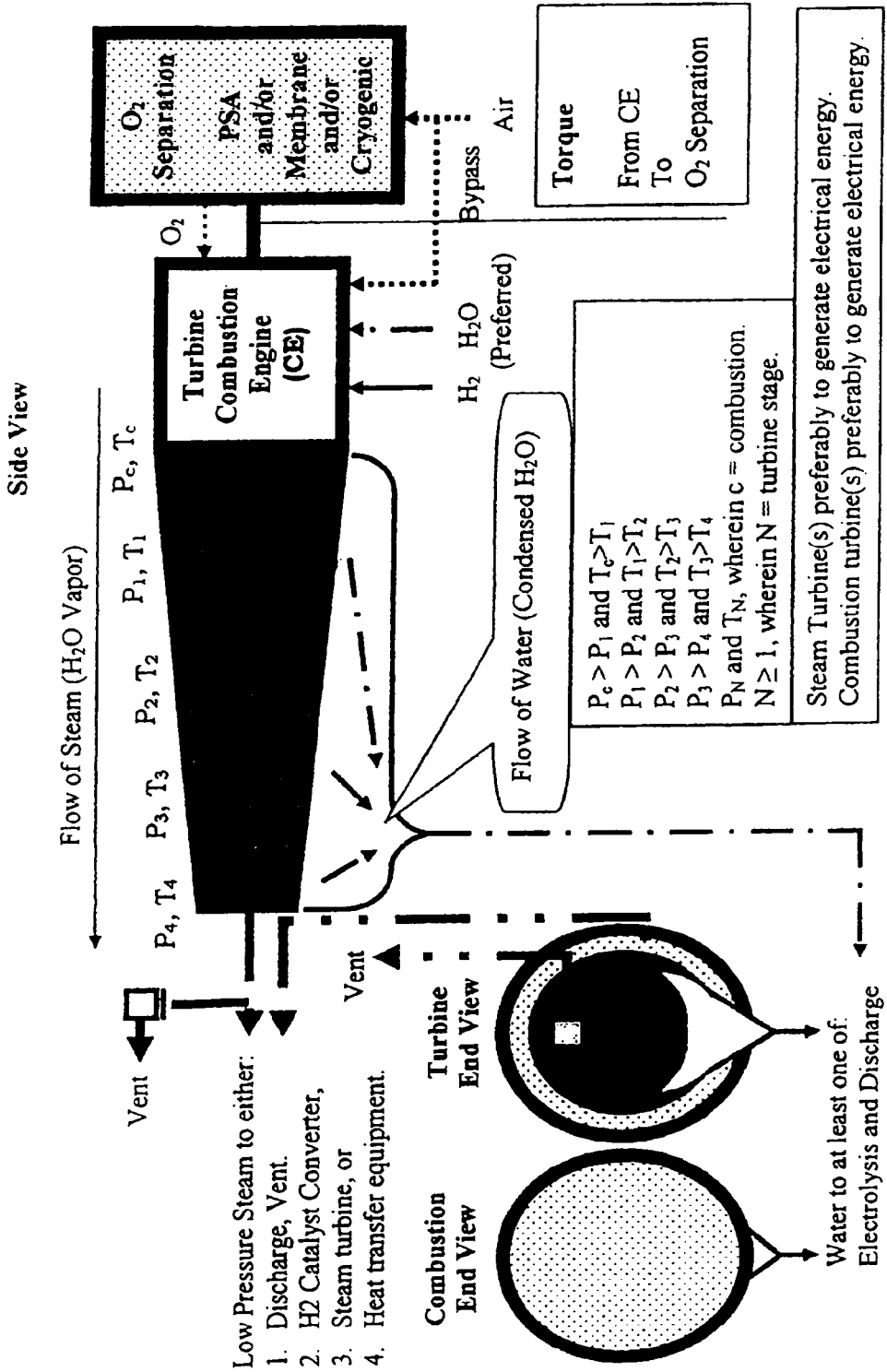

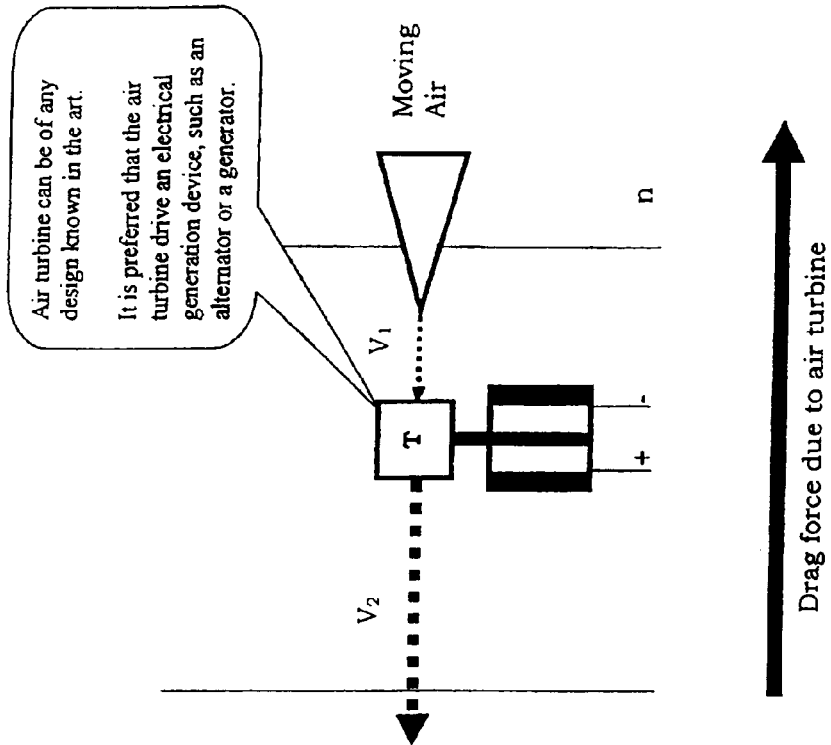

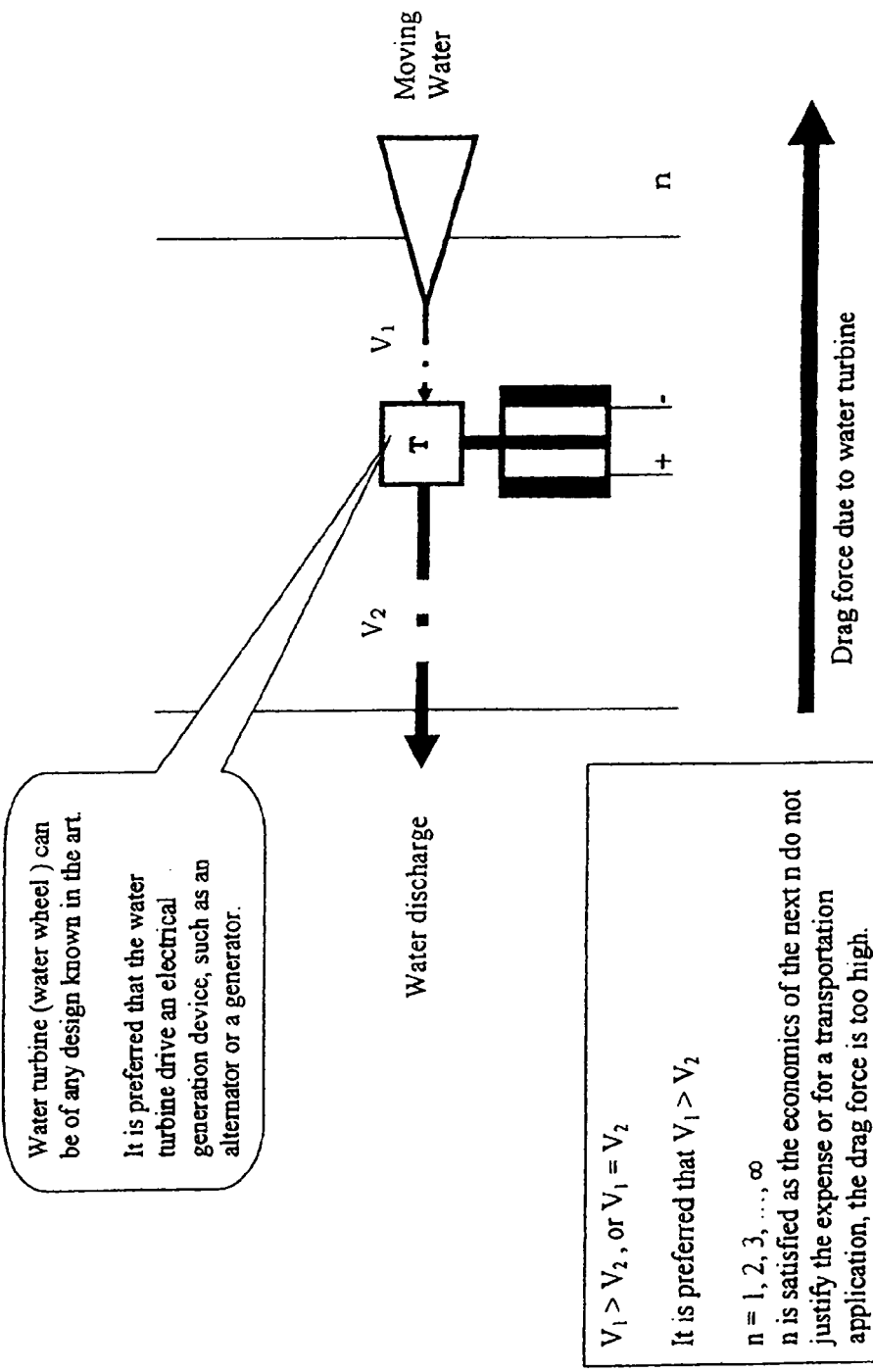

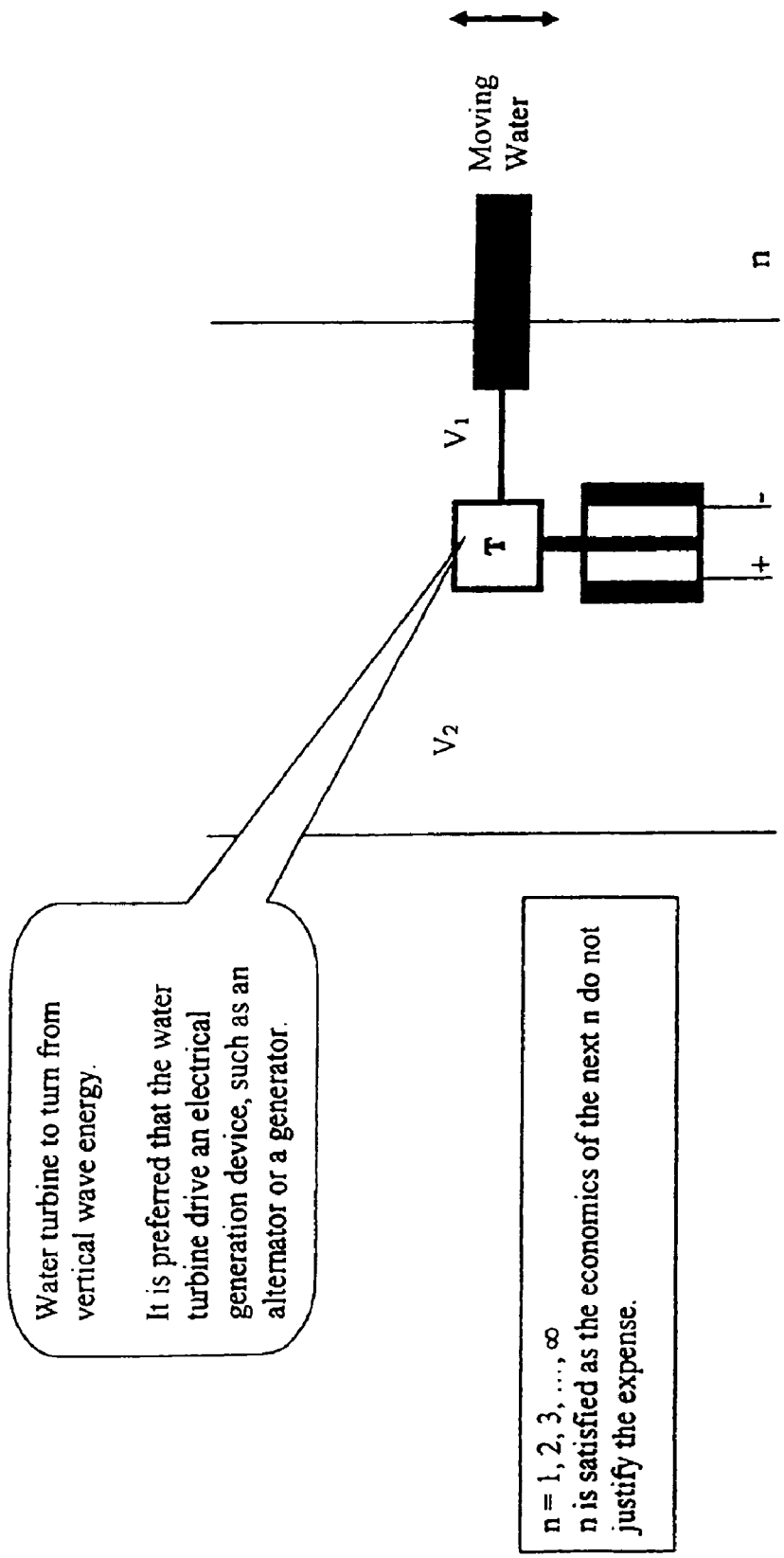

Pressure Control Configuration(s)**

Methods and Processes of Refrigeration and Liquefaction

Methods and Processes of a Jet Engine

Thrust=Force=F=dMe/dt Ve-dMo/dt Vo; Let Me=Mo+$M_F$, wherein $M_F$=mass of fuel.

WATER COMBUSTION TECHNOLOGY—METHODS, PROCESSES, SYSTEMS AND APPARATUS FOR THE COMBUSTION OF HYDROGEN AND OXYGEN

RELATED APPLICATION DATA

This application is a continuation of PCT/US 03/11250 filed Apr. 10, 2003; this continuation claims priority of PCT/US 03/11250 filed Apr. 10, 2003, of PCT/US 03/41719 filed Feb. 14, 2003; of U.S. Provisional Patent Application Ser. No. 60/371,768 filed Apr. 11, 2002, of U.S. Provisional Patent Application Ser. No. 60/379,587 filed May 10, 2002 and of U.S. Provisional Patent Application Ser. No. 60/404,644 filed Aug. 19, 2002 and of U.S. Provisional Patent Application Ser. No. 60/447,880 filed Feb. 14, 2003.

BACKGROUND OF THE INVENTION

1. Field of the Invention

This invention relates to improved combustion methods, processes, systems and apparatus, which provide environmentally friendly combustion products, as well as to fuel and energy management methods, processes, systems and apparatus for said improved combustion methods, processes, systems and apparatus. The combustion and/or fuel and/or energy management methods, processes, systems or apparatus (Water Combustion Technology, WCT) is based upon the chemistry of Water ($H_2O$), incorporating Hydrogen ($H_2$) and Oxygen ($O_2$) as fuel, as well as $H_2O$ and/or air as at least one of a heat sink and/or a fuel source. The WCT does not use a hydrocarbon as a fuel source, rather the WCT uses $H_2$ in combination preferably with $O_2$ a secondarily with air. The primary product of the combustion of $H_2$ and $O_2$ is $H_2O$. Further, in many embodiments the WCT separates $H_2O$ into $H_2$ and $O_2$, thereby making $H_2O$ an efficient method of storing fuel.

As used herein, the term combustion can incorporate any combustion method, system, process or apparatus, such a furnace, a combustion engine, an internal combustion engine, a turbine or any combustion system wherein mechanical, electrical or heat energy (heat energy can include thrust energy) is created. The discovered WCT contain embodiments wherein nitrogen ($N_2$) or $N_2$ and Argon (Ar) is partially or totally removed from the fuel mixture to improve the energy output of combustion and/or reduce the pollution output of combustion.

The discovered WCT relate to improved methods, processes, systems and apparatus for combustion that significantly improve the thermodynamics of combustion, thereby significantly improving the efficiency of combustion. Further, the discovered WCT relate to improved methods, processes, systems and apparatus for combustion wherein $H_2O$ is added to the fuel mixture to control the combustion temperature, thereby utilizing $H_2O$ during combustion as a heat sink. The WCT incorporate embodiments wherein steam produced by combustion and/or the cooling of combustion: 1) maintains the power output of combustion, 2) provides method(s) of energy transfer and 3) provides an efficient method of energy recycle. Steam presents a reusable energy source in the exhaust, both from the available kinetic and the available heat energy, as well as the conversion of said steam into $H_2$ and/or $O_2$.

Incorporating $H_2O$ into the fuel mixture with the intent of minimizing or excluding $N_2$, or $N_2$ and Ar from the fuel mixture culminates in a fuel mixture that is/are at least one of: $O_2$, $H_2$ and $H_2O$; $O_2$, $H_2$, $H_2O$ and $N_2$; $O_2$, $H_2$, $H_2O$, $N_2$ and Ar; $O_2$, $H_2$, $H_2O$ and air; $H_2$, $H_2O$ and air; and $H_2$ with excess air wherein said excess air is used to control combustion temperature. As used herein, the fuel mixture in the WCT is defined to incorporate either: $O_2$ and $H_2$; $O_2$, $H_2$ and $N_2$; $O_2$, $H_2$ and Ar; $O_2$, $H_2$ and air; $O_2$, $H_2$ and $H_2O$; $O_2$, $H_2$, $H_2O$ and $N_2$; $H_2$, $H_2O$, $N_2$ and Ar; $O_2$, $H_2$, $H_2O$ and air; $H_2$, $H_2O$ and air; or $H_2$ and excess air.

The discovered WCT relate to methods, processes, systems and apparatus of generating electricity. Four methods, processes, systems and apparatus of generating electricity are discovered. The first places a steam turbine in the exhaust of the combustion engine, wherein said steam turbine is driven by said steam produced in combustion; said steam turbine turning a generator (the term generator is used herein to define either an alternator or a dynamo), wherein at least a portion of said steam energy is converted into said electrical energy. The second places a generator on the mechanical energy output of a combustion engine, wherein at least a portion of said mechanical energy is converted by said generator into electrical energy. The third incorporates a physical system of focusing air and/or water currents onto a generator or dynamo, wherein said generator or dynamo is driven by said moving air or water to generate electrical energy. The fourth uses a photovoltaic cell to generate electrical energy.

It is discovered to use at least a portion of said electrical energy for the electrolytic generation of $H_2O$ into $O_2$ and $H_2$. If a dynamo is used, at least a portion of the dynamo D/C current is used for electrolysis; if an alternator is used an A/C to D/C converter preferably converts at least a portion of the alternating current into direct current for electrolysis. It is further discovered and preferred to utilize at least one of said electrolysis generated $O_2$ and/or $H_2$ as fuel in the WCT.

The discovered WCT further relate to methods, processes, systems and apparatus for separating $O_2$ from air. Three are discovered. By the first, $O_2$ is separated utilizing energy available from said WCT to power a cryogenic distillation system, wherein air is chilled and distilled into $O_2$ and $N_2$. By the second, air is separated producing $O_2$ utilizing membranes; said membranes can be of either organic (polymer) construction or of inorganic (ceramic) construction. By the third, air is separated producing $O_2$ utilizing Pressure Swing Adsorption (PSA). While the separation of air into $O_2$ and $N_2$ can have many degrees of separation efficiency, it is to be understood that the term $O_2$ as used herein is to mean at least enriched $O_2$, wherein the $O_2$ concentration is at least 40 percent; preferably pure $O_2$, wherein the $O_2$ concentration is at least 80 percent; and most preferably very pure $O_2$, wherein the $O_2$ concentration is at least 90 percent.

The discovered WCT further relate to methods, processes, systems and apparatus of metal catalysis, wherein said steam produced in the WCT is converted into $H_2$ and metal oxides, as part of a catalyst system. It is further discovered and preferred that at least a portion of said $H_2$ be used as a fuel in the WCT. As used herein, the term metal catalysis is to mean any metal or combination of metals in the periodic table, wherein the metal or combination of metals will convert the $H_2O$ within steam or water vapor into the corresponding metal oxide(s) and $H_2$.

2. Background of the Invention

Mankind, has over the centuries, provided many forms of energy and many forms of transportation. In the modern capitalistic economy, the availability of energy is important to literally "fuel" the economic engine, which heats homes, provides electricity, powers lights, powers transportation and powers manufacturing facilities, etc. The availability of energy is especially important in the transportation of goods and people. During the 19'th and 20'th centuries mankind developed fossil fuels into reliable and inexpensive fuels for many uses including transportation, powering factories, generating electricity and generating heat. During the 20'th century, the use of fossil fuels increased to such an extent as to cause the combustion products of fossil fuels to be a major source of air and water pollution.

It must be understood and appreciated that most fossil fuel combustion systems have an efficiency that is less than 40 percent and that the internal combustion engine has an efficiency of less than 20 percent. These very poor results are a direct consequence of the thermodynamics of combustion. Current combustion systems significantly increase entropy, releasing entropy as well as enthalpy, to their surroundings. This is because it is very difficult for fossil fuel combustion systems to manage temperature without significant entropy and enthalpy losses to their environment; these losses are exhibited as exhaust gases and heat losses to the environment. In summary, the first and second laws of thermodynamics are a liability to fossil fuel combustion systems.

Hydrocarbon(s) have been used in combination with air as fuel for combustion. The hydrocarbons utilized have been petroleum distillates such as gasoline, diesel, fuel oil, jet fuel and kerosene, or fermentation distillates such as methanol and ethanol, or naturally occurring substances such as methane, ethane, propane, butane, coal and wood. The combustion of fossil fuel(s) does not work in concert with nature. The products of fossil fuels were thought to work in concert with nature's oxygen-carbon cycle.

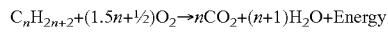

More specifically:

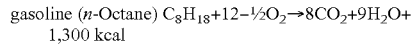

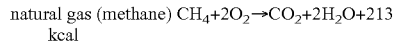

Oxides of carbon ($CO_X$, CO and/or $CO_2$) are produced by the combustion of fossil fuels. This production in combination with significant deforestation has left plant life incapable of converting enough of the manmade $CO_2$ back into $O_2$. CO, an incomplete combustion by-product, is toxic to all human, animal and plant life. Global warming is a result of a buildup of $CO_X$ in the Earth's atmosphere. The combustion of air also creates oxides of Nitrogen (N), converting a portion of the $N_2$ to $NO_X$ (NO, $NO_2$ and/or $NO_3$). $NO_X$ is toxic to all human, animal and plant life. $NO_X$ is known to inhibit photosynthesis, which is nature's biochemical pathway of converting $CO_2$ back into $O_2$. The formation of $NO_X$ is endothermic, thereby lessening combustion efficiency. Further, $NO_X$ reacts with $O_2$ in the atmosphere to produce ozone ($O_3$). $O_3$ is toxic to all human, animal and plant life. $O_3$ should only exist in higher levels of the atmosphere, wherein $O_3$ is naturally created from $O_2$. In the higher levels of the atmosphere $O_3$ protects all human, animal and plant life from the harmful rays of the sun. Lastly, liquid and solid fossil fuels naturally contain sulfur (S) as a contaminant. In combustion, S is oxidized to $SO_X$ ($SO_2$, $SO_3$ and/or $SO_4$). $SO_X$ are toxic to all human, animal and plant life. $CO_X$, $NO_X$ and $SO_X$ react with water in the air to form acids of $CO_X$, $NO_X$ and/or $SO_N$, which literally rain acids upon the earth. In summary, $CO_X$, $NO_X$, $SO_X$ and $O_3$ in the air adversely affect the health of all human, animal and plant life. An environmentally acceptable alternative to fossil fuels would be a fuel system that does work in concert with nature. Such a system would not produce $CO_X$, $NO_X$ or $SO_X$, and thereby not generate $O_3$.

There has been much done mechanically and chemically to combat the environmental issues associated with hydrocarbon combustion. As an example, industrial facilities are outfitted with expensive scrubber systems whenever the politics demand the installation and/or the business supports the installation. As another example, the internal combustion engine has been enhanced significantly to make the engine more fuel efficient and environmentally friendly. Even with enhancement, the internal combustion engine is only approximately 20 percent efficient and the gas turbine/steam turbine system is only approximately 30 to 40 percent efficient. As depicted in FIG. 2, the internal combustion engine looses as a percentage of available energy fuel value: 1) approximately 35 percent in the exhaust, 2) approximately 35 percent in cooling, 3) approximately 9 percent in friction, and 4) only 1 percent due to poor combustion performance, leaving the engine approximately 20 percent efficient.

Hydrocarbon fuels have been modified with additives to minimize the formation of either $CO_X$ or $NO_X$. However, with all of the scrubber modifications, engine modifications and fuel modifications, the Earth is struggling to deal with manmade pollutants that originate from hydrocarbon combustion systems. In addition to the environmental issues, availability and dependability of large quantities of petroleum hydrocarbons has become a geopolitical issue.

There have been many previous attempts to produce a combustion engine that would operate on air and $H_2$. Those attempts had as difficulties: the high temperature of combustion, increased $NO_X$ formation at higher combustion temperatures, storage capacity for large enough quantities of $H_2$ and cost of operation. Jet propulsion applications had as difficulties: high combustion temperatures, lack of available thrust and a lower altitude propulsion limit than kerosene. As compared to hydrocarbons, the combustion of $H_2$ occurs with $H_2$ having three times the available combustion energy per pound; in addition $H_2$ is much less dense than hydrocarbons, this density difference is significant in both in the available gas and in the cryogenically stored liquid form. $H_2$ is a gas at atmospheric pressure. $H_2$ is not a liquid until the temperature is lowered to near $-430°$ F.; therefore, storage equipment for $H_2$ need to either be able to withstand high pressure, cryogenic temperatures or both. Such storage equipment for large volumes of $H_2$ becomes economically impractical.

Historically and currently it has been believed that the electric motor is the solution to finding an environmentally friendly energy source. However, this concept has deficiencies in that the electrical energy required to power an electric motor must be created and stored. Electrical energy is created with either: 1) hydrocarbon combustion/steam generation processes, 2) photovoltaic generation processes, 3) water driven generation processes, 4) windmill driven generation processes or 5) nuclear generation/steam driven generation processes. While the photovoltaic process is environmentally friendly, the photovoltaic process is not reliable or effective enough in many applications to replace the combustion engine. While the water driven (water wheel) generation process is environmentally friendly, the water driven generation process is a geographically limited energy source. While the windmill driven generation process is environmentally friendly, wind is a limited non-reliable resource. While the nuclear generation/steam driven generation process is environmentally friendly, concerns over the safety of such installations have limited applications.

Commercialization of the electric car has been limited due to electrical energy cost and the electrical energy mass storage requirement being so massive that under the best of circumstances the electric car must be limited to short distances or supplemented with an internal combustion engine.

Previous and current attempts to produce a fuel cell that would operate on $H_2$ and air, as well as hydrocarbons and air are showing promising results. However, the capital investment to power output ratio for fuel cells is 400 to 500 percent of that same investment for traditional combustion systems. Also, the required maintenance of fuel cells increases the cost of operation. In addition, fuel cells require Platinum; there is not enough Platinum in the Earth's crust for one year's automotive production, much less enough for the energy needs of the world. Lastly, in transportation the fuel cell does not have the same "feel" as the internal combustion engine, which may lead to acceptance challenges. Previous attempts to replace or reduce the power of the internal combustion engine have failed due to market acceptance. Auto enthusiasts have come to enjoy and expect the "feel" and power of the internal combustion engine.

Previous work to develop a combustion engine that would operate on fuel(s) other than hydrocarbon(s) can be referenced in U.S. Pat. No. 3,884,262, U.S. Pat. No. 3,982,878, U.S. Pat. No. 4,167,919, U.S. Pat. No. 4,308,844, U.S. Pat. No. 4,599,865 U.S. Pat. No. 5,775,091, U.S. Pat. No. 5,293, 857, U.S. Pat. No. 5,782,081, U.S. Pat. No. 5,775,091 and U.S. Pat. No. 6,290,184. The closest work is U.S. Pat. No. 6,289,666 B1. While each of these patents present improvements in combustion technology, each leaves issues that have left the commercialization of such a combustion engine impractical.

While there are many methods to prepare $O_2$, the separation of air into its component gases is industrially performed by three methods: cryogenic distillation, membrane separation and PSA.

There are many methods and processes utilized for cryogenic refrigeration, which is a component of cryogenic distillation. A good reference of cryogenic refrigeration methods and processes known in the art would be "Cryogenic Engineering," written by Thomas M. Flynn and printed by Dekker. As written by Flynn, cryogenic refrigeration and liquefaction are the same processes, except liquefaction takes off a portion of the refrigerated liquid which must be made up, wherein refrigeration all of the liquid is recycled. All of the methods and processes of refrigeration and liquefaction are based upon the same basic refrigeration principals, as depicted in FIG. 25.

As written by Flynn, there are many ways to combine the few components of work (compression), rejecting heat, expansion and absorbing heat. There exist in the art many methods and processes of cryogenic refrigeration, all of which can be adapted for cryogenic liquefaction. A listing of those refrigeration cycles would include: Joule Thompson, Stirling, Brayton, Claude, Linde, Hampson, Postle, Ericsson, Gifford-McMahon and Vuilleumier. As written by Flynn, "There are as many ways to combine these few components as there are engineers to combine them." (It is important to note, as is known in the art, that $H_2$ has a negative Joule-Thompson coefficient until temperatures of approximately 350 R are obtained.)

Conventional cryogenic air distillation processes that separate air into $O_2$, Ar and $N_2$ are commonly based on a dual pressure cycle. Air is first compressed and subsequently cooled. Cooling may be accomplished by one of four methods: 1—Vaporization of a liquid, 2—The Joule Thompson Effect (which performs best when augmented with method 3), 3—Counter-current heat exchange with previously cooled warming product streams or with externally cooled warming product streams and 4—The expansion of a gas in an engine doing external work. The cooled and compressed air is usually introduced into two fractionating zones. The first fractionating zone is thermally linked with a second fractionating zone which is at a lower pressure. The two zones are thermally linked such that a condenser of the first zone reboils the second zone. The air undergoes a partial distillation in the first zone producing a substantially pure $N_2$ fraction and a liquid fraction that is enriched in $O_2$. The enriched $O_2$ fraction is an intermediate feed to the second fractionating zone. The substantially pure liquid $N_2$ from the first fractionating zone is used as reflux at the top of the second fractionating zone. In the second fractionating zone separation is completed, producing substantially pure $O_2$ from the bottom of the zone and substantially pure $N_2$ from the top. When Ar is produced in the conventional process, a third fractionating zone is employed. The feed to this zone is a vapor fraction enriched in Ar which is withdrawn from an intermediate point in the second fractionating zone. The pressure of this third zone is of the same order as that of the second zone. In the third fractionating zone, the feed is rectified into an Ar rich stream which is withdrawn from the top, and a liquid stream which is withdrawn from the bottom of the third fractionating zone and introduced to the second fractionating zone at an intermediate point. Reflux for the third fractionating zone is provided by a condenser which is located at the top. In this condenser, Ar enriched vapor is condensed by heat exchange from another stream, which is typically the enriched $O_2$ fraction from the first fractionating zone. The enriched $O_2$ stream then enters the second fractionating zone in a partially vaporized state at an intermediate point, above the point where the feed to third fractionating zone is withdrawn.

The distillation of air, a ternary mixture, into $N_2$, $O_2$ and Ar may be viewed as two binary distillations. One binary distillation is the separation of the high boiling point $O_2$ from the intermediate boiling point Ar. The other binary distillation is the separation of the intermediate boiling point Ar from the low boiling point $N_2$. Of these two binary distillations, the former is more difficult, requiring more reflux and/or theoretical trays than the latter. Ar—$O_2$ separation is the primary function of third fractionating zone and the bottom section of the second fractionating zone below the point where the feed to the third zone is withdrawn. $N_2$—Ar separation is the primary function of the upper section of the second fractionating zone above the point where the feed to the third fractionating zone is withdrawn.

The ease of distillation is also a function of pressure. Both binary separations become more difficult at higher pressure. This fact dictates that for the conventional arrangement the optimal operating pressure of the second and third fractionating zones is at or near the minimal pressure of one atmosphere. For the conventional arrangement, product recoveries decrease substantially as the operating pressure is increased above one atmosphere mainly due to the increasing difficulty of the Ar—$O_2$ separation. There are other considerations, however, which make elevated pressure processing attractive. Distillation column diameters and heat exchanger cross sectional areas can be decreased due to increased vapor density. Elevated pressure products can provide substantial compression equipment capital cost savings. In some cases, integration of the air separation process with a power generating gas turbine is desired. In these cases, elevated pressure operation of the air separation process is required. The air feed to the first fractionating zone is at an elevated pressure of approximately 10 to 20 atmospheres absolute. This causes the operating pressure of the second and third fractionating zones to be approximately 3 to 6 atmospheres absolute. Operation of the conventional arrangement at these pressures results in very poor product recoveries due to the previously described effect of pressure on the ease of separation.

As used herein: the term "indirect heat exchange" means the bringing of two fluid streams into heat exchange relation without any physical contact or intermixing of the fluids with each other; the term "air" means a mixture comprising primarily $N_2$, $O_2$ and Ar; the terms "upper portion" and "lower portion" mean those sections of a column respectively above and below the midpoint of the column; the term "tray" means a contacting stage, which is not necessarily an equilibrium stage, and may mean other contacting apparatus such as packing having a separation capability equivalent to one tray; the term "equilibrium stage" means a vapor-liquid contacting stage whereby the vapor and liquid leaving the stage are in mass transfer equilibrium, e.g. a tray having 100 percent efficiency or a packing element height equivalent to one theoretical plate (HETP); the term "top condenser" means a heat exchange device which generates column downflow liquid from column top vapor; the term "bottom reboiler" means a heat exchange device which generates column upflow vapor from column bottom liquid. (A bottom reboiler may be physically within or outside a column. When the bottom reboiler is within a column, the bottom reboiler encompasses the portion of the column below the lowermost tray or equilibrium stage of the column.)

While it is well known in the chemical industry that the cryogenic distillation of air into $O_2$ and $N_2$ is the most economical pathway to produce these elemental diatomic gases, it has not been proposed to utilize this industrial process to either: distill $H_2$ along with $O_2$ and $N_2$, fuel the combustion of $O_2$ with $H_2$ with $O_2$ from cryogenic distillation and/or utilize the energy of the combustion of $O_2$ with $H_2$ to power the cryogenic distillation of air. Previous work performed to separate air into its components can be referenced in U.S. Pat. No. 4,112,875; U.S. Pat. No. 5,245,832; U.S. Pat. No. 5,976,273; U.S. Pat. No. 6,048,509; U.S. Pat. No. 6,082,136; U.S. Pat. No. 6,298,668 and U.S. Pat. No. 6,333,445.

It is also well known in many industries to separate air with membranes. Two general types of membranes are known in the art: organic polymer membranes and inorganic membranes. These membrane separation processes are improved by setting up an electric potential across a membrane that has been designed to be electrically conductive. While many of these processes are well known and established, it has not been proposed to utilize either of these processes to fuel the combustion of $O_2$ with $H_2$ or to utilize the energy of the combustion of $O_2$ with $H_2$ to power the membrane separation of air. Previous work performed to separate air into its components with membranes can be referenced in U.S. Pat. No. 5,599,383; U.S. Pat. No. 5,820,654; U.S. Pat. No. 6,277,483; U.S. Pat. No. 6,289,884; U.S. Pat. No. 6,298,664; U.S. Pat. No. 6,315,814; U.S. Pat. No. 6,321,915; U.S. Pat. No. 6,325,218; U.S. Pat. No. 6,340,381; U.S. Pat. No. 6,357,601; U.S. Pat. No. 6,360,524; U.S. Pat. No. 6,361,582; U.S. Pat. No. 6,361,583 and U.S. Pat. No. 6,372,020.

It is also known to separate air into $O_2$ and $N_2$ with PSA. However, it has not been proposed to utilize PSA to fuel the combustion of $O_2$ with $H_2$ or to utilize the energy of the combustion of $O_2$ with $H_2$ to power PSA separation of air. Previous work performed to separate air into its components with PSA can be referenced in U.S. Pat. No. 3,140,931; U.S. Pat. No. 3,140,932; U.S. Pat. No. 3,140,933; U.S. Pat. No. 3,313,091; U.S. Pat. No. 4,481,018; U.S. Pat. No. 4,557,736; U.S. Pat. No. 4,859,217; U.S. Pat. No. 5,464,467; U.S. Pat. No. 6,183,709 and U.S. Pat. No. 6,284,201.

The discovered WCT relate to chemical methods, processes, systems and apparatus for producing $H_2$ from steam, since steam is the physical state of the water product from the WCT. Previous work in this field has focused on refinery or power plant exhaust gases; none of that work discusses the separation of $H_2O$ back into $H_2$. Previous work performed to utilize the products of hydrocarbon combustion from an internal combustion engine can be referenced in U.S. Pat. No. 4,003,343. Previous work in corrosion is in the direction of preventing corrosion instead of encouraging corrosion, yet can be referenced in U.S. Pat. No. 6,315,876, U.S. Pat. No. 6,320,395, U.S. Pat. No. 6,331,243, U.S. Pat. No. 6,346,188, U.S. Pat. No. 6,348,143 and U.S. Pat. No. 6,358,397.

The discovered WCT relate to electrolytic methods, processes, systems and apparatus to electro-chemically convert $H_2O$ into $O_2$ and $H_2$. While there have been improvements in the technology of electrolysis and there have been many attempts to incorporate electrolysis with a combustion engine, wherein the hydrocarbon fuel is supplemented by $H_2$ produced by electrolysis, there has been no work with electrolysis to fuel a combustion engine wherein electrolysis is a significant source of $O_2$ and $H_2$. Previous work in electrolysis as electrolysis relate to combustion systems can be referenced in U.S. Pat. No. 6,336,430, U.S. Pat. No. 6,338,786, U.S. Pat. No. 6,361,893, U.S. Pat. No. 6,365,026, U.S. Pat. No. 6,635,032 and U.S. Pat. No. 4,003,035.

The discovered WCT relate to the production of electricity. The mechanical energy for a mechanically driven electrical generation device, which can be a generator or an alternator, is produced by the fuel(s) of the WCT. In addition, the steam energy for a steam driven generator is produced by the fuel(s) of the WCT; the WCT Engine exhaust steam energy may drive a steam turbine, thereby driving a generator creating an electrical current. Further, said exhaust gas, $H_2O$, minimizes environmental equipment. The discovered WCT presents a combustion turbine, wherein the exhaust gas is at least primarily if not totally $H_2O$ or $H_2O$ and air. While there has been much work in the design of steam turbines, in all cases the steam for the steam turbine is generated by heat transfer, wherein said heat for heat transfer is created by nuclear fission or hydrocarbon combustion. The concept of utilizing a steam turbine in the direct exhaust of a combustion engine or to recycle energy within a combustion engine, especially to create electricity for the electrolytic conversion of $H_2O$ into $O_2$ and $H_2$ is new and novel. Previous work in steam turbine generation technology or engine exhaust turbine technology can be referenced in: U.S. Pat. No. 6,100,600, U.S. Pat. No. 6,305,901, U.S. Pat. No. 6,332,754, U.S. Pat. No. 6,341,941, U.S. Pat. No. 6,345,952, U.S. Pat. No. 4,003,035, U.S. Pat. No. 6,298,651, U.S. Pat. No. 6,354,798, U.S. Pat. No. 6,357,235, U.S. Pat. No. 6,358,004 and U.S. Pat. No. 6,363,710, the closest being U.S. Pat. No. 4,094,148 and U.S. Pat. No. 6,286,315 B1.

The discovered WCT relate to air and water driven turbine technologies to create electricity. Air or water driven turbine electrical generation technology would be applicable to combustion system(s) utilizing the discovered WCT, wherein: there is a reliable source of moving air and/or water. While a moving source of air or a moving source of water may be an excellent source of electrical power generation to fuel the electrolysis of $H_2O$, the concept of either: the use of said electrolysis to fuel the discovered WCT or of a windmill or waterwheel to power said electrolysis in order to fuel the discovered WCT is novel. Previous work in wind driven generator technology can be referenced in U.S. Pat. No. 3,995,972, U.S. Pat. No. 4,024,409, U.S. Pat. No. 5,709,419, U.S. Pat. No. 6,132,172, U.S. Pat. No. 6,153,944, U.S. Pat. No. 6,224,338, U.S. Pat. No. 6,232,673, U.S. Pat. No. 6,239,506, U.S. Pat. No. 6,247,897, U.S. Pat. No. 6,270,308, U.S.

Pat. No. 6,273,680, U.S. Pat. No. 293,835, U.S. Pat. No. 294,844, U.S. Pat. No. 6,302,652, U.S. Pat. No. 6,323,572, and U.S. Pat. No. 6,635,981.

The discovered WCT relate to photovoltaic methods, processes, systems and apparatus to create electricity, wherein said electricity is used to create at least one of $H_2$ and $O_2$, wherein said $H_2$ and/or said $O_2$ is used as a fuel in said WCT. There are many methods, processes, systems and apparatus for the photovoltaic production of electricity, as is known in the art. There are many methods, systems and processes wherein a photovoltaic cell is used to create electricity for the electrolytic separation of $H_2O$ into $H_2$ and $O_2$, wherein the $H_2$ is used in a fuel cell. Previous work in photovoltaic cells in relation to the production of $H_2$ can be referenced in: U.S. Pat. No. 5,797,997, U.S. Pat. No. 5,900,330, U.S. Pat. No. 5,986,206, U.S. Pat. No. 6,075,203, U.S. Pat. No. 6,128,903, U.S. Pat. No. 6,166,397, U.S. Pat. No. 6,172,296, U.S. Pat. No. 6,211,643, U.S. Pat. No. 6,214,636, U.S. Pat. No. 6,279,321, U.S. Pat. No. 6,372,978, U.S. Pat. No. 6,459,231, U.S. Pat. No. 6,471,834, U.S. Pat. No. 6,489,553, U.S. Pat. No. 6,503,648, U.S. Pat. No. 6,508,929, U.S. Pat. No. 6,515,219 and U.S. Pat. No. 6,515,283. None of the previous work describes or suggests the use of a photovoltaic cell in combination with said WCT.

The discovered WCT relate to methods of controlling corrosion, scale and deposition in water applications. U.S. Pat. No. 4,209,398 issued to Ii, et al., on Jun. 24, 1980 presents a process for treating water to inhibit formation of scale and deposits on surfaces in contact with the water and to minimize corrosion of the surfaces. The process comprises mixing in the water an effective amount of water soluble polymer containing a structural unit that is derived from a monomer having an ethylenically unsaturated bond and having one or more carboxyl radicals, at least a part of said carboxyl radicals being modified, and one or more corrosion inhibitor compounds selected from the group consisting of inorganic phosphoric acids and water soluble salts therefore, phosphonic acids and water soluble salts thereof, organic phosphoric acids and water soluble salts thereof, organic phosphoric acid esters and water-soluble salts thereof and polyvalent metal salts, capable of being dissociated to polyvalent metal ions in water. The Ii patent does not discuss or present systems of electrolysis or of combustion.

U.S. Pat. No. 4,442,009 issued to O'Leary, et al., on Apr. 10, 1984 presents a method for controlling scale formed from water soluble calcium, magnesium and iron impurities contained in boiler water. The method comprises adding to the water a chelant and water soluble salts thereof, a water soluble phosphate salt and a water soluble poly methacrylic acid or water soluble salt thereof. The O'Leary patent does not discuss or present systems of electrolysis or of combustion.

U.S. Pat. No. 4,631,131 issued to Cuisia, et al., on Dec. 23, 1986 presents a method for inhibiting formation of scale in an aqueous steam generating boiler system. Said method comprises a chemical treatment consisting essentially of adding to the water in the boiler system scale-inhibiting amounts of a composition comprising a copolymer of maleic acid and alkyl sulfonic acid or a water soluble salt thereof, hydroxyl ethylidenel, 1-diphosphic acid or a water soluble salt thereof and a water soluble sodium phosphate hardness precipitating agent. The Cuisia patent does not discuss or present systems of electrolysis or of combustion.

U.S. Pat. No. 4,640,793 issued to Persinski, et al., on Feb. 3, 1987 presents an admixture, and its use in inhibiting scale and corrosion in aqueous systems, comprising: (a) a water soluble polymer having a weight average molecular weight of less than 25,000 comprising an unsaturated carboxylic acid and an unsaturated sulfonic acid, or their salts, having a ratio of 1:20 to 20:1, and (b) at least one compound selected from the group consisting of water soluble polycarboxylates, phosphonates, phosphates, polyphosphates, metal salts and sulfonates. The Persinski patent presents chemical combinations which prevent scale and corrosion; however, the Persinski patent does not address electrolysis or combustion.

SUMMARY OF THE INVENTION

A primary object of the invention is to devise environmentally friendly, effective, efficient and economically feasible combustion methods, processes, systems and apparatus.

Another object of the invention is to devise environmentally friendly, effective, efficient and economically feasible combustion methods, processes, systems and apparatus for an internal combustion engine.

Another object of the invention is to devise environmentally friendly, effective, efficient and economically feasible combustion methods, processes, systems and apparatus for electrical energy generation.

Another object of the invention is to devise environmentally friendly, effective, efficient and economically feasible combustion methods, processes, systems and apparatus for jet propulsion.

Another object of the invention is to devise effective, efficient and economically feasible combustion methods, processes, systems and apparatus that do not produce oxides of carbon.

Another object of the invention is to devise effective, efficient and economically feasible combustion methods, processes, systems and apparatus that minimize the production of oxides of nitrogen.

Another object of the invention is to devise effective, efficient and economically feasible fuel system for an environmentally friendly, effective and efficient combustion methods, processes, systems and apparatus.

Another object of the invention is to devise effective, efficient and economically feasible fuel methods, processes, systems and apparatus for environmentally friendly, effective and efficient internal combustion engines.

Another object of the invention is to devise effective, efficient and economically feasible fuel methods, processes, systems and apparatus for environmentally friendly, effective and efficient electricity production.

Another object of the invention is to devise effective, efficient and economically feasible fuel methods, processes, systems and apparatus for environmentally friendly, effective and efficient heat generation.

Another object of the invention is to devise effective, efficient and economically feasible combustion methods, processes, systems and apparatus that includes hydrogen and oxygen or hydrogen and air or hydrogen and oxygen and air, wherein the temperature of combustion is controlled so that economical materials of construction for a combustion engine can be used.

Another object of the invention is to devise effective, efficient and economically feasible methods, processes, systems and apparatus of increasing the efficiency of combustion.

Another object of the invention is to devise effective, efficient and economically feasible electrolytic methods, processes, systems and apparatus to convert water into oxygen and/or hydrogen utilizing the energy available from combustion.

Another object of the invention is to devise effective, efficient and economically feasible catalytic methods, processes, systems and apparatus for the conversion of stream into hydrogen, wherein the steam is produced by a combustion engine that is fueled by at least one of oxygen, hydrogen and water; oxygen, hydrogen, water and nitrogen; oxygen, hydrogen, water and air; hydrogen, water and air.

Additional objects and advantages of the invention will be set forth in part in a description which follows and in part will be obvious from the description, or may be learned by practice of the invention.

An improved environmentally friendly process to create energy over that of the combustion of fossil fuels would be a process that does not produce a product of which the earth would have to naturally remove or convert. $H_2O$ is a product which could perform such a task. The Earth is covered mostly by water. Water is made by the combustion of $O_2$ and $H_2$. Further, known methods to produce $O_2$ are by: liquefaction (cryogenic distillation) of air; membrane separation of air, Pressure Swing Adsorption (PSA) of air and electrolysis of $H_2O$. All of these processes are friendly to the environment. In addition, $H_2$ is the most abundant element in the universe existing in nearly all compounds and compositions. Modifying our alcohol, oil, coal and gas refineries to produce $H_2$ would stimulate economic expansion, while focusing the responsibility of air pollution into a refining environment, wherein that responsibility can be managed.

The discovered WCT manage energy much more efficiently than that of the traditional combustion engine, as the traditional combustion engine relates to transportation, electricity generation and heat generation applications. This is especially the case with respect to the internal combustion engine. The internal combustion engine, as well as combustion engines generally, loose approximately 60 to 85 percent of their combustion energy in: heat losses from the engine, engine exhaust gases and unused mechanical energy. It is discovered in that this invention recaptures significant energy losses by converting lost energy into potential and into internal energy. This discovery directly follows the first and the second laws of thermodynamics. In one application, an internal combustion engine, exhaust energy is converted into chemical potential energy.

The discovered WCT utilize the energy of combustion of $O_2$ with $H_2$ as the energy source for combustion methods, processes, systems and apparatus to create energy. The combustion product of $O_2$ and $H_2$ is $H_2O$. This combustion reaction is somewhat similar to that of hydrocarbon combustion; however, carbon is removed from the reaction and $N_2$ is partially or totally removed from the reaction. In summary, WCT eliminates environmental issues associated with the combustion of C, N and/or S.

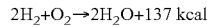

$$2H_2+O_2 \rightarrow 2H_2O+137\ kcal$$

At 68.5 kcal/mole, $H_2$ has an energy value of 34 kcal per pound; this compares favorably to n-Octane which is 1300 kcal/mole=11 kcal per pound and methane which is 213 kcal/mole=13 kcal per pound.

While $H_2O$ is an environmentally friendly combustion product, the combustion temperature of $O_2$ with $H_2$ is too high for most combustion materials. And, especially in the case of the internal combustion engine, the implementation of any new combustion system would be significantly facilitated through the use of traditional materials of construction, so as to minimize the cost of engine construction. $H_2O$ is preferably used to control the combustion temperature of $O_2$ with $H_2$. Said $H_2O$ can be in one of three forms: a solid (ice particles), a liquid (water vapor) and a gas (steam). If $H_2O$ is in the form of a solid, the combustion temperature will be controlled by: the heat capacity of solid $H_2O$, the sublimation energy of $H_2O$, the heat capacity of liquid $H_2O$, the latent heat of vaporization of $H_2O$ and the heat capacity of steam. If $H_2O$ is in the form of a liquid, the combustion temperature will be controlled by: the heat capacity of liquid $H_2O$, the latent heat of vaporization of $H_2O$ and the heat capacity of steam. If the $H_2O$ is a gas, the temperature will be controlled by the heat capacity of steam.

Air has traditionally been used as the combustion oxidant ($O_2$ in air). The combustion of $O_2$ with $H_2$, without the inclusion of $N_2$ and/or Ar or with a minimal inclusion of $N_2$ and/or Ar from air, improves internal combustion energy output by over 300 percent. This aspect of the instant invention can be readily seen by comparing a combustion system which utilizes air for the oxidant, wherein air is approximately only 20 percent $O_2$ and 78 percent $N_2$, and a combustion system which utilizes very pure $O_2$ as the oxidant. Nitrogen reduces the combustion temperature while endothermically producing $NO_X$, thereby creating pollution while reducing engine efficiency. Since air is approximately 78 percent $N_2$, nearly 78 percent of the combustion mixture in a traditional combustion engine provides no energy during combustion, and in actuality, reduces the energy output of combustion. While the $N_2$ in air can keep the combustion temperature down, thereby producing exhaust gas temperatures approximately near or below 1000° F., so that the combustion temperature is not harmful to traditional materials of engine construction, the addition of $H_2O$ to an $O_2/H_2$ fuel mixture approaches isothermal combustion producing steam while cooling the temperature of combustion, thereby converting combustion heat energy into an energy form that is easily utilized and/or recycled. The inclusion of $N_2$ does not provide the ability of energy recycle. The same discussion applies to Ar.

As is readily understood in combustion science, there are three components required for combustion to commence: fuel, heat and ignition. Assuming a constant source of fuel ($H_2$ and $O_2$) and ignition, the addition of $H_2O$ to the combustion mixture presents a method and process to: limit the combustion temperature, minimize $NO_X$ formation, and minimize the cost of materials of construction for the combustion engine, as well as maintain a high enough combustion temperature so that combustion may commence. The addition of $H_2O$ to the combustion chamber can be managed to maintain combustion, as well as control the temperature of combustion. Varying engine configurations, combustion chamber designs and materials of construction will determine the limits of $H_2O$ addition to the combustion chamber within the limits of fuel mixture and combustion temperature. Varying engine configurations, combustion chamber designs and materials of construction will determine the limits of $H_2O$ addition to the combustion chamber within the limits of fuel mixture and combustion temperature. The addition of excess air to the combustion chamber can be managed to maintain combustion, as well as control the temperature of combustion. This concept is especially practical in jet propulsion applications.

$H_2O$ is discovered in this invention as a coolant and as a fuel, as well as a combustion product. $H_2O$ is presented in novel energy recycle methods, processes, systems and apparatus to improve the efficiency of combustion by utilizing water as a combustion product, an energy conduit, a combustion coolant and an energy storage medium. The discovered WCT presents $H_2O$ as at least one of: an energy storage medium, a combustion product, a coolant and an energy transfer conduit and/or any combination therein. The importance of this aspect of the invention can be appreciated by thermodynamic principals. By the first law of thermodynamics, heat added to the system plus work done on the system equals changes in internal energy plus changes in potential and kinetic energy. The recycling of otherwise lost energy increases both internal and potential energy, thereby increasing efficiency of the combustion systems. By the second law of thermodynamics: changes in internal energy equal changes in entropy (at a specific temperature) minus work performed by the system. Since the WCT significantly reduces changes in entropy by focusing otherwise lost entropy and enthalpy into an exhaust enthalpy/entropy which can be recycled into internal and potential energy, the WCT significantly increases internal and potential energy, thereby significantly increasing efficiency. The WCT uses the first and second laws of thermodynamics as an asset. In contrast, hydrocarbon combustion technologies have the first and second laws of thermodynamics as a liability. Further, the use of $H_2O$ in the combustion chamber theoretically approaches isothermal combustion.

It has been learned in the industry that frozen crystals of methane in a $H_2$ gas allow the $H_2$ to form a gel of $H_2$ and methane. Such gel compositions are easier to handle than their cryogenically stored $H_2$. It is an embodiment of the WCT to store at least one of $H_2$ and $O_2$ as a gel wherein the gel contains frozen water crystals, thereby improving the storage characteristics of said $H_2$ or $O_2$.

The WCT utilizes electro-chemical pathways to convert $H_2O$ into $O_2$ and $H_2$, wherein the electrical energy for these pathways is obtained from at least one of cooling the engine, exhaust gas energy, combustion output mechanical energy, photovoltaic energy and the energy of air or water motion. Given that the efficiency of most combustion engines (especially the internal combustion engine) is only approximately 20 percent, the discovered WCT can significantly increase the combustion efficiency. Assuming that the available $H_2$ fuel has a conversion efficiency near that of its hydrocarbon predecessors, thereby presenting a source value of 100 percent for fresh $H_2$ and that the separation of air into $O_2$, $N_2$ and Ar has an efficiency of conservatively near 20 percent, WCT methods, processes, systems and apparatus have the capability to increase the efficiency of a turbine combustion engine to near 40 to 70 percent and the efficiency of the internal combustion engine to near approximately 60 to 70 percent. It is theorized that the combustion efficiency can be increased further, depending on the separation efficiency of air into $O_2$, $N_2$ and Ar, the conversion efficiency of steam into electricity and in most applications the conversion efficiency of electricity into $H_2$ and $O_2$. It is discovered that the theoretical limit of efficiency for the discovered WCT is approximately limited to the efficiency limit in the conversion of steam, mechanical, photovoltaic, wind and waterwheel energy to electricity in combination with the efficiency limit of electrolysis to convert $H_2O$ into $H_2$ and $O_2$ minus friction losses. This theoretical limit presents that the theoretical efficiency limit of the methods, processes, systems and apparatus of the WCT is near approximately 70-90 percent. (There is an interesting situation, wherein the engine is not running and a photovoltaic cell increases the potential energy by creating fuel from water. Under this scenario the engine actually increases its fuel without using any fuel, wherein the efficiency is infinate.)

The discovered WCT present methods, processes, systems and apparatus for separating $O_2$ and $N_2$ from air in combination with the combustion of $O_2$ with $H_2$. There are three methods of separation. By the first method, air is separated utilizing the cryogenic distillation process, which is used to pressure, chill and distill the air, separating air into $O_2$ and $N_2$. By the second method, air is separated utilizing membranes; the membranes can be of either organic polymer construction or of inorganic construction. By the third method, air is separated by utilizing Pressure Swing Adsorption (PSA). Utilizing PSA it is preferred that $O_2$ be absorbed; however, it is practical that $N_2$ be absorbed. The separated $O_2$, produced by at least one of these methods, is preferably used as a fuel in the combustion systems.

Cryogenic Distillation—In the chemical industry, cryogenic distillation of air into $O_2$ and $N_2$ is a common pathway to produce these elemental diatomic gases. However, it has not been proposed previously and it is novel to utilize this process: in combination with $H_2$ distillation, to fuel the combustion of $O_2$ with $H_2$ and/or to utilize the energy of the combustion of $O_2$ with $H_2$ to power the cryogenic distillation of air. In addition, nearly all industrial processes for the separation of air into $O_2$ and $N_2$ utilize $N_2$ or $N_2$ and Ar as industrial products. In the case of the discovered WCT, the primary use of distilled $N_2$ and/or Ar would be as a heat sink. This heat sink is preferably utilized to perform at least one of: cool the storage of $O_2$ or of $H_2$, facilitate cryogenic distillation, cool the combustion engine and/or provide refrigeration and/or provide environmental cooling. In the case of the internal combustion engine, this heat sink is preferably used in place of the engine water coolant cooling system (typically a fan cooled radiator) and/or the compressor for the passenger cooling (air conditioning) system. The distillation of Ar is immaterial except as a combustion efficiency improvement; the additional fractionating column to separate Ar should be viewed on a capital investment—efficiency rate of return analysis.

Membrane Separation—Membrane separation is much simpler than cryogenic distillation; however, nitrogen is not available as a heat sink. By utilizing the membrane separation process, separate cooling systems will need to potentially be available for the engine and for any passenger or environmental cooling.

PSA—PSA separation is simpler than cryogenic processes yet more complicated than membrane separation. PSA has the same drawback as membrane separation; $N_2$ would not be available as a heat sink. By utilizing a PSA separation process, separate cooling systems will need to potentially be available for the engine and for any passenger or environmental cooling.

The discovered WCT relate to chemical methods, processes, systems and apparatus of producing $H_2$ from steam, since steam is the physical state of the water product from combustion. The WCT converts steam into $H_2$ utilizing a process, which is normally considered a detriment. The WCT utilizes corrosion to chemically convert steam to $H_2$. Corrosion utilizes $O_2$ to convert a metal to its metal oxide, while releasing $H_2$. This metal oxide has traditionally been viewed as a detriment since the metal oxide has less strength, durability and luster than its metal counterpart. The general chemical reaction for corrosion with water as the oxidant would be:

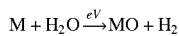

$$M + H_2O \xrightarrow{eV} MO + H_2$$

where, M is any metal or combination of metals from the Periodic Table and eV is the electromotive potential. Due to the electromotive potential of corrosion, many methods of protecting a metal against corrosion are based upon managing the electromotive potential of the metal. One such method is cathodic protection. Under cathodic protection, the metal is protected against corrosion by producing an electromotive potential in the metal that is counter to the electromotive potential for corrosion of that metal. Where traditional cathodic protection methods are used to prevent corrosion, the WCT proposes driving corrosion by creating an anodic potential. The WCT utilizes catalytic sacrificial metal(s) in the exhaust gas (steam), wherein an anodic potential is preferably used to drive corrosion of a metal or a composition of metals, thereby converting at least a portion of the steam to hydrogen. (A good reference for electromotive potentials would be the Handbook of Chemistry and Physics by CRC Press.)

The discovered WCT relate to electrolytic methods, processes, systems and apparatus to electro-chemically convert $H_2O$ into $O_2$ and $H_2$. It is to be understood that under the best of engineered circumstances, the electrical energy required by electrolysis to convert $H_2O$ into $O_2$ and $H_2$ will be greater than the energy obtained by the combustion of $O_2$ and $H_2$. However, electrolysis allows for significant improvements in the efficiency of combustion by reclaiming energy which to would otherwise be lost.

Whether electrical energy is generated from the steam of combustion or from at least one of mechanical energy conversion, steam energy conversion, light energy conversion, wind energy conversion or water wheel energy conversion, once the capital cost of conversion equipment is in place, the cost of energy conversion is limited to equipment maintenance expense. Four types of available electrical energy generation are discovered: mechanical energy, steam energy, moving air (wind) or water energy and photovoltaic (sun) energy.

Electrolysis may create enough fuel from $H_2O$ at a very low energy conversion cost to increase the efficiency of the entire combustion system. The application of the internal combustion engine is an excellent example of a situation wherein electrolysis may be used to turn $H_2O$ into a fuel source (potential energy). The internal combustion engine, once in operation, turns normally at approximately 500 to approximately 6000 rpm and infrequently in specially engineered situation to approximately. 10,000 to 20,000 rpm. There are many situations in the operation of combustion engines wherein a generator either located on the drive shaft or activated by a transmission device and driven by the drive shaft, could be turned by the mechanical energy of the combustion engine to create an electrical current for the electrolytic conversion of $H_2O$ into $O_2$ and $H_2$. In addition, to the extent that $H_2O$ is utilized to control the combustion temperature of the combustion system is to the extent that a steam driven turbine generator can be further utilized in the exhaust stream of the WCT to create electricity. Electricity can then be used for the electrolysis of $H_2O$ into $O_2$ and $H_2$. Once the capital cost of either the mechanical driven generator or the steam driven generator has been made, the conversion cost of the mechanical or steam energy to electricity is limited to equipment maintenance expense. This same cost/benefit scenario would apply to a moving air (wind) or water driven generator, as well as to the photovoltaic system.

The WCT relates to the application of muffler technologies as those technologies are known and used to muffle the noise of combustion. In the case of the internal combustion engine, mufflers are installed to limit the noise produced by combustion. While muffler designs do control the noise or air vibration from a combustion engine, current muffler designs waste available combustion exhaust gas energy. The installation of a steam turbine in the combustion engine exhaust gas stream is preferred to produce an electrical current. It is preferred that the steam turbine absorb air vibration from combustion. It is preferred to install easily oxidized metal(s) in a contact/muffler chamber to create $H_2$ from the steam produced in the combustion systems. The combination of a steam driven turbine generator and catalytic conversion metal(s) in the exhaust would be a most preferred combination to convert the steam energy of the exhaust gases from the combustion systems into electrical energy, while muffling the air vibration in the exhaust gases.

BRIEF DESCRIPTION OF THE DRAWINGS

A better understanding of the present invention can be obtained when the following description of the preferred embodiments are considered in conjunction with the following drawings, in which:

FIGS. 1 and 1A provide a key to the symbols of FIGS. 2 through 26.

FIG. 2A illustrates in block diagram form a general description of proposed methods, processes, systems and apparatus to manage $H_2O$, $O_2$, $H_2$ and air in the discovered WCT combustion engine.

FIG. 20 illustrates in bock diagram form a general description of proposed methods, procedures, systems and apparatus for liquefaction and cooling of $O_2$ and/or $H_2$ storage for a combustion engine that is fueled by at least one of $O_2$ and $H_2$; air and $H_2$; $O_2$, $H_2$ and air wherein $H_2O$ is an option to cool the combustion chamber and to cool the combustion temperature.

FIGS. 21 and 21A illustrate in bock diagram form a general description of proposed methods, procedures, systems and apparatus for steam turbine(s), wherein the steam turbine(s) located in and powered by the exhaust of a combustion engine fueled by at least one of: $O_2$ and $H_2$; air and $H_2$; $O_2$, $H_2$ and air wherein $H_2O$ is an option to cool the combustion chamber and to cool the combustion temperature.

FIG. 22 illustrates in bock diagram form a general description of proposed methods, procedures, systems and apparatus for an air turbine, wherein said air turbine provides electricity to separate $H_2O$ into $H_2$ and $O_2$ for a combustion engine, wherein said combustion engine is fueled by at least one of $O_2$ and $H_2$; air and $H_2$; $O_2$, $H_2$ and air wherein $H_2O$ is an option to cool the combustion chamber and to cool the combustion temperature.

FIGS. 23 and 23A illustrate in bock diagram form a general description of proposed methods, procedures, systems and apparatus for a $H_2O$ turbine, wherein said $H_2O$ turbine provides electricity to separate $H_2O$ into $H_2$ and $O_2$ for a combustion engine, wherein said combustion engine is fueled by at least one of: $O_2$ and $H_2$; air and $H_2$; $O_2$, $H_2$ and air wherein $H_2O$ is an option to cool the combustion chamber and to cool the combustion temperature.

DETAILED DESCRIPTION OF THE PREFERRED EMBODIMENTS

The timing of the invention is significant since global warming is becoming a global political issue. The timing of the invention is significant since the availability of oil and natural gas, the sources of hydrocarbons, are becoming global political issues. The timing of the invention is significant since air pollution is becoming a health issue for much of humanity. The timing of the invention is significant since the market of natural gas (methane, ethane, propane and/or butane) is affecting the production and/or market price of electricity. The WCT presents environmentally friendly combustion methods, processes, systems and apparatus, which are efficient and which will require a reasonable amount of tooling to implement. And, in the case of the internal combustion engine, the WCT present a combustion process, which will have a "feel" to the driver which is similar to that of hydrocarbon combustion engines; this "feel" will further implementation of the invention.

The methods, processes, systems and apparatus of the WCT solve the myriad of challenges that have kept hydrogen based combustion technologies from commercialization. These challenges are, yet are not limited to: 1) fuel combustion temperature and the associated combustion engine cost, 2) the volume of fuel required and the associated fuel storage requirements, 3) engine efficiency and the associated fuel required, 4) the generation of $NO_X$, 5) engine efficiency and the associated cost of operation, 6) combustion engine size and the associated combustion engine cost, 7) required fuel and fuel storage in general, 8) cost of operation in general, 9) combustion engine cost in general, and in the case of the internal combustion engine 10) an engine that meets customer expectations for feel, efficiency, cost and environmental impact.

The methods, processes, systems and apparatus of the WCT utilize the heat of combustion of $O_2$ with $H_2$ as the primary energy source for combustion systems to create energy. A preferred embodiment of the WCT would be a fuel mixture of $O_2$ and $H_2$. A most preferred embodiment of the WCT would be to add $H_2O$ to the combustion chamber to control the combustion temperature. It is an embodiment to cool the engine with $H_2O$ in the combustion chamber, wherein the gas of combustion is at least one of water vapor and steam. It is an embodiment to cool combustion with an excess of air. It is a preferred embodiment of WCT to manage the final temperature in the combustion mixture prior to ignition so that the mixture is in at least one of a gaseous or fluid state. It is a preferred embodiment that the combustion methods, processes, systems and apparatus of the WCT be at least one of: internal combustion, open flame (heating) combustion and turbine combustion, as these applications are known in the art of combustion science.

Figure 1:
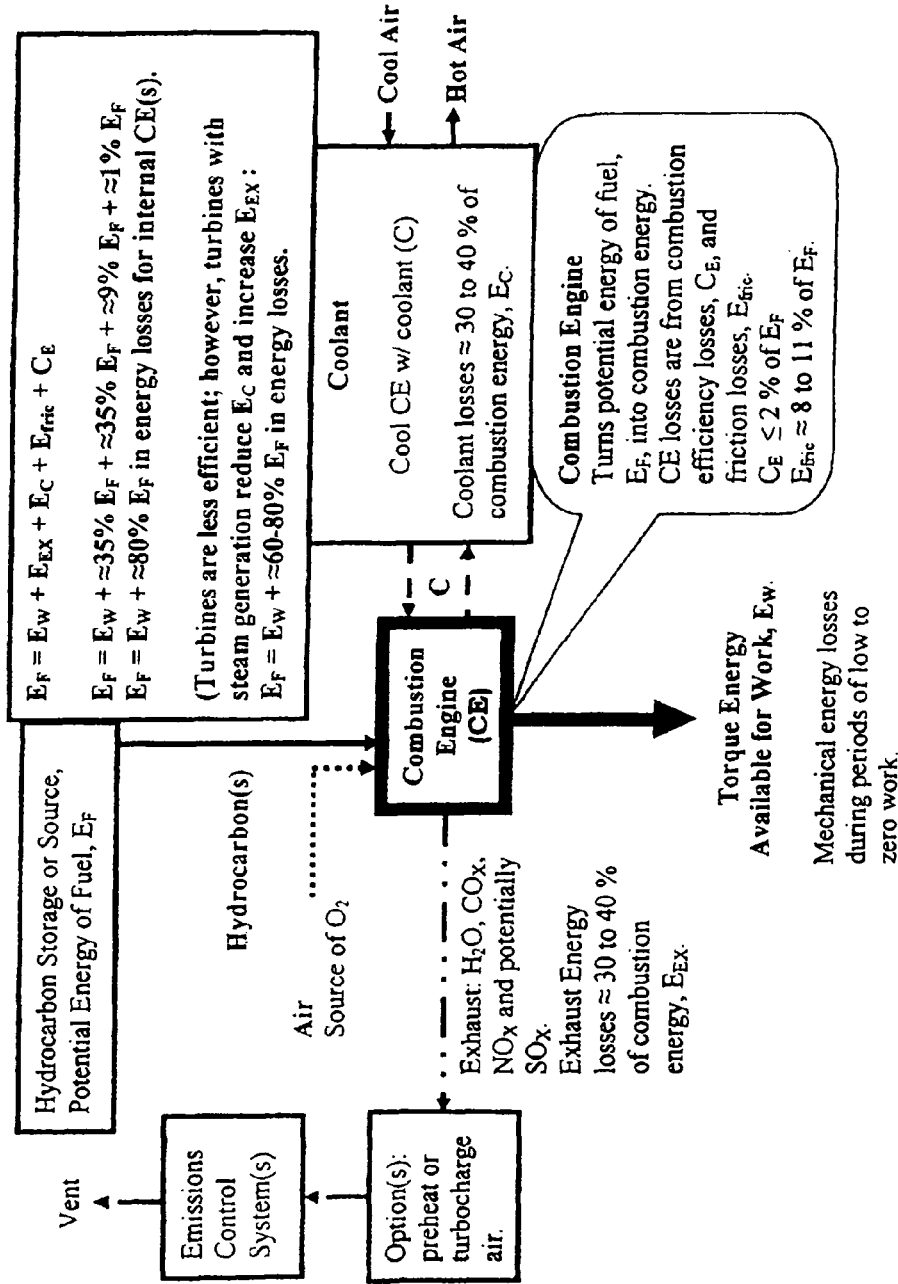
Figure 2:
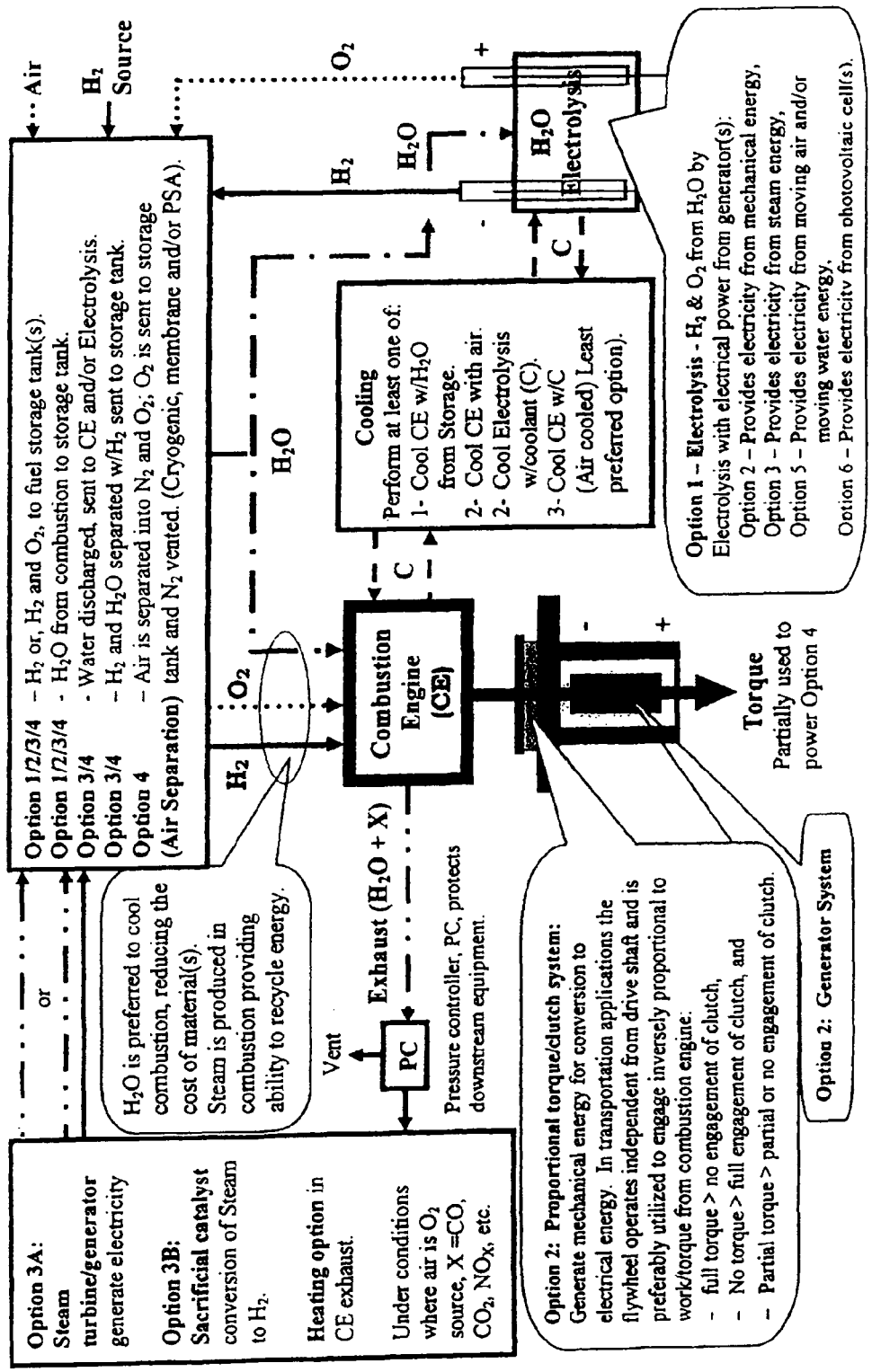
FIG. 2 illustrates in block diagram form a general thermodynamic description of a traditional hydrocarbon combustion engine.
Figure 3:
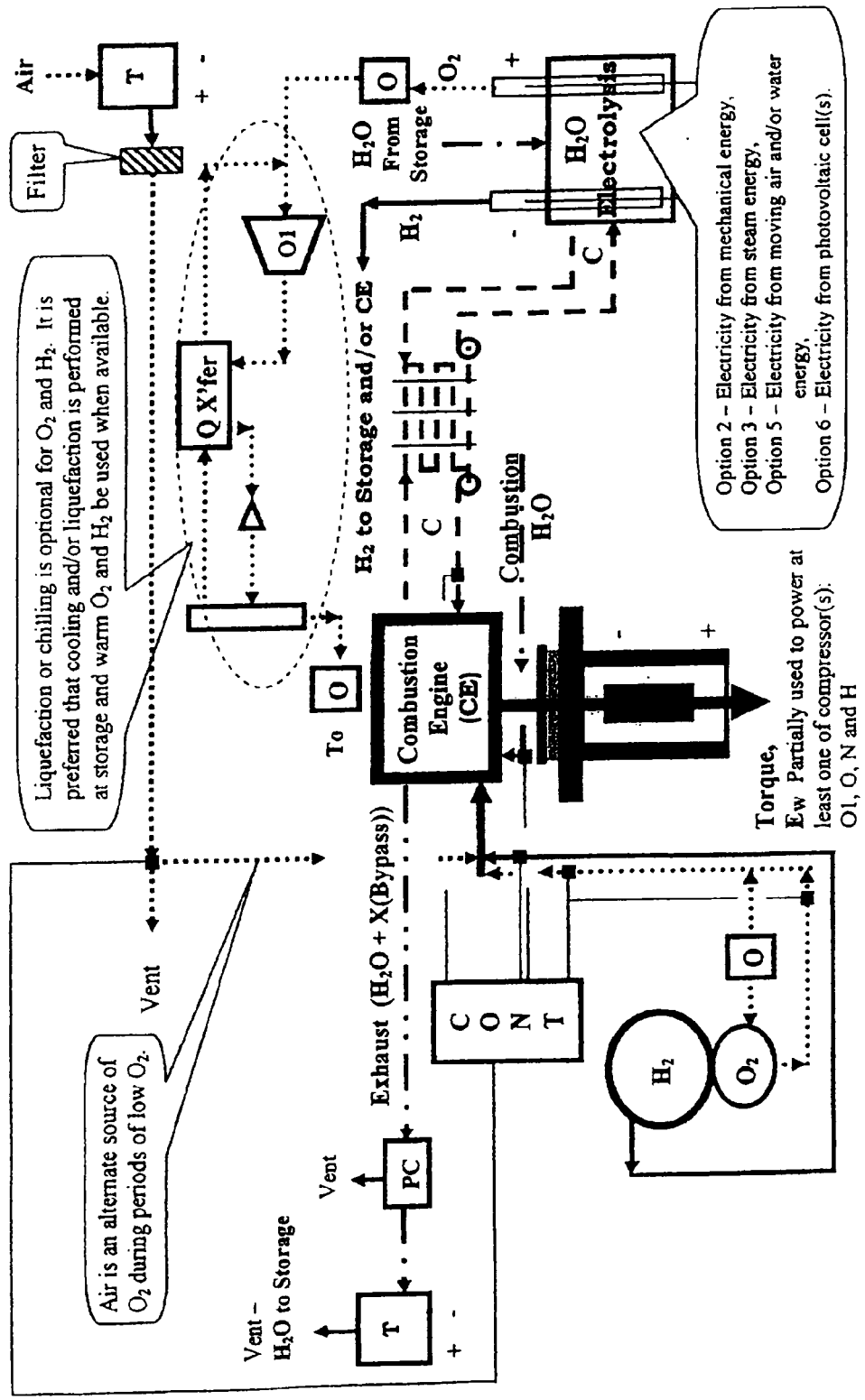
FIG. 3 illustrates in block diagram form a general description of proposed methods, processes, systems and apparatus for a combustion engine fueled by at least one of: $O_2$ and $H_2$; air and $H_2$; $O_2$, $H_2$ and air wherein $H_2O$ is an option to cool the combustion chamber and to cool the combustion temperature, and wherein the fuel system incorporates alternate methods, processes, systems and apparatus to create electricity for electrolysis to convert $H_2O$ into $H_2$ and $O_2$.
Figure 4:
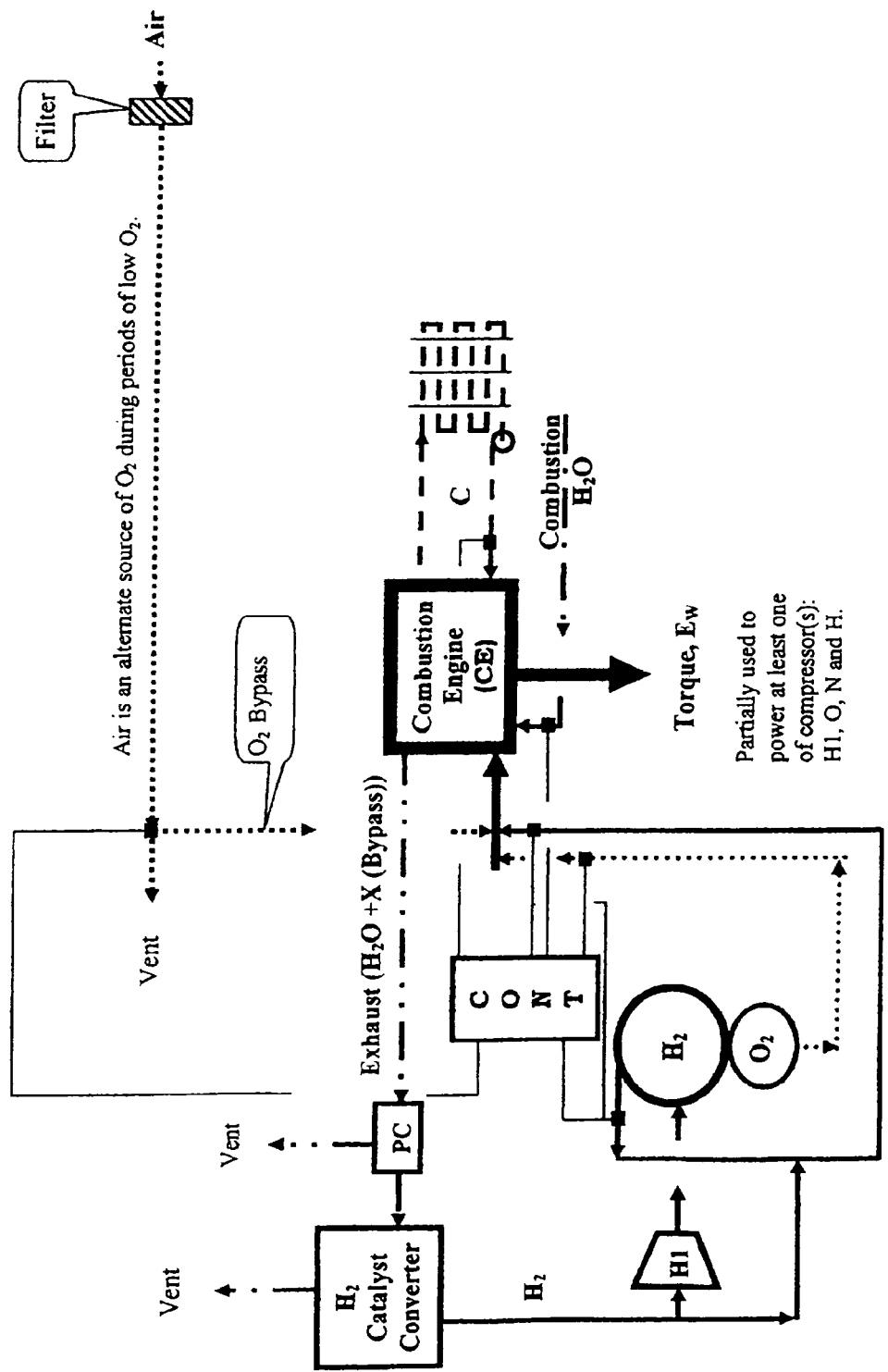
FIG. 4 illustrates in block diagram form a general description of proposed methods, procedures, systems and apparatus for a combustion engine fueled by at least one of $O_2$ and $H_2$; air and $H_2$; $O_2$, $H_2$ and air wherein $H_2O$ is an option to cool the combustion chamber and to cool the combustion temperature, and wherein the fuel system incorporates catalytic conversion of steam into $H_2$.
Figure 5:
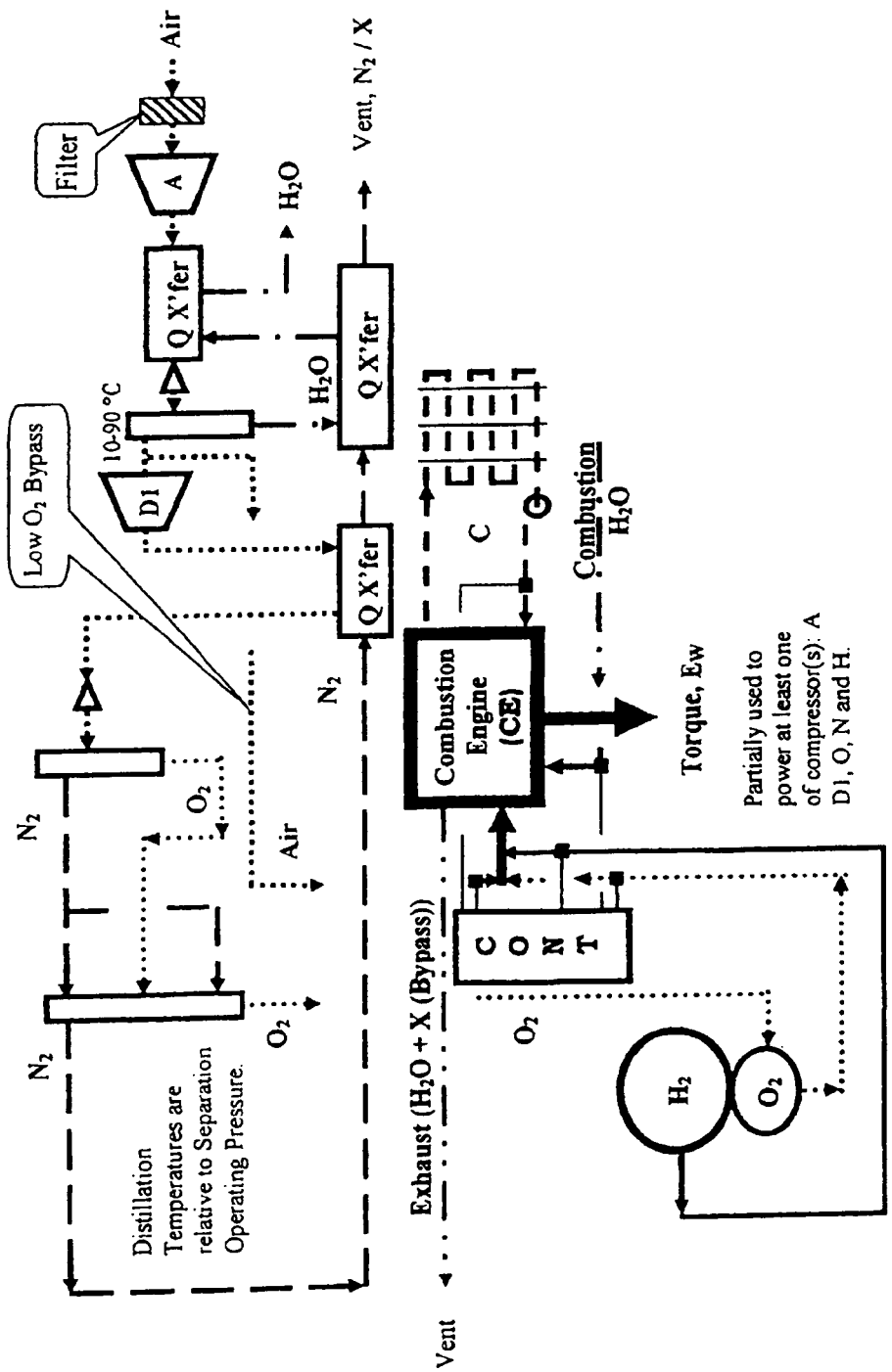
FIG. 5 illustrates in block diagram form a general description of proposed methods, procedures, systems and apparatus for a combustion engine fueled by at least one of: $O_2$ and $H_2$; air and $H_2$; $O_2$, $H_2$ and air wherein $H_2O$ is an option to cool the combustion chamber and to cool the combustion temperature, and wherein the fuel system incorporates the cryogenic distillation of air into nitrogen and $O_2$.
Figure 6:
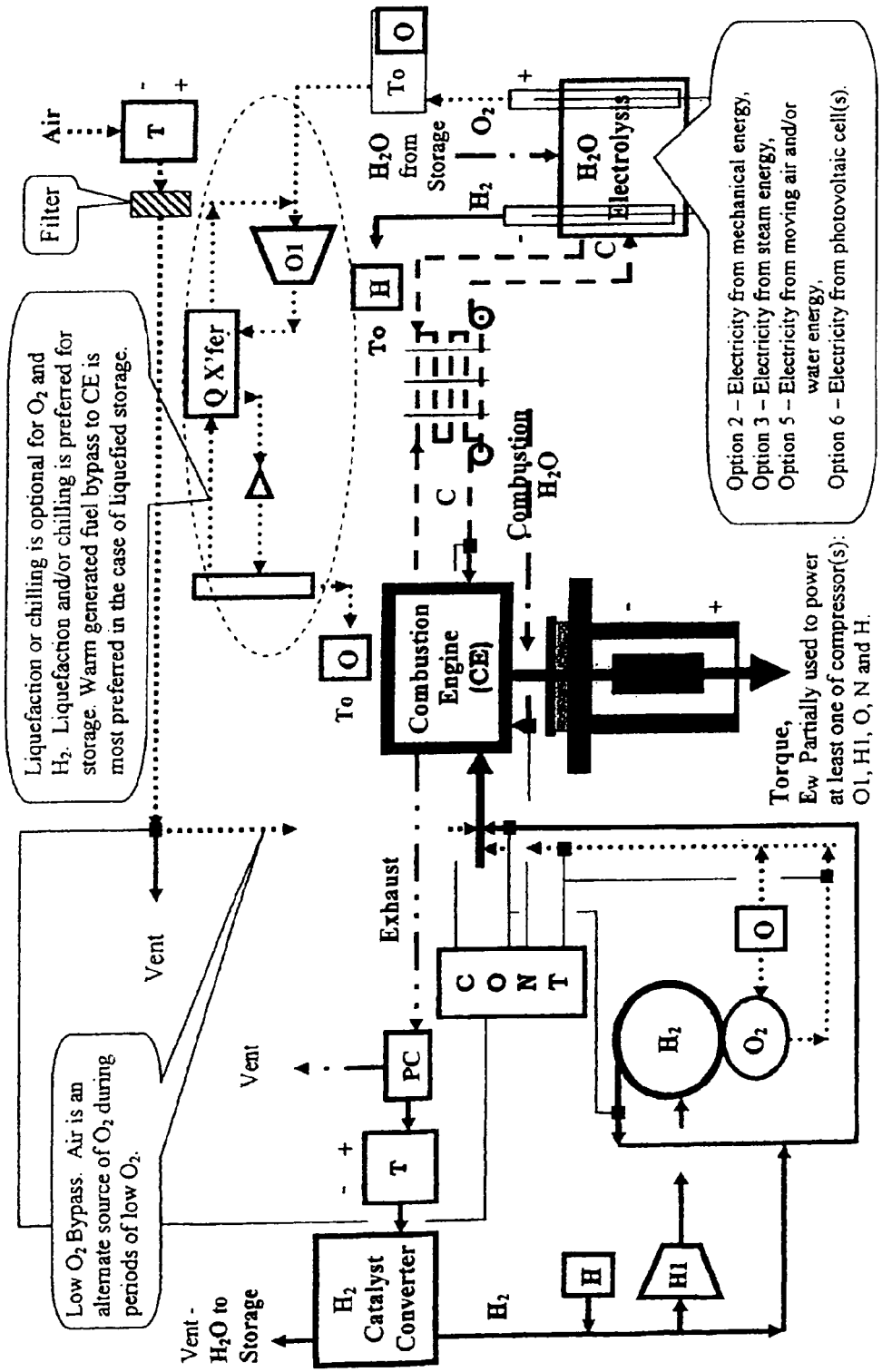
FIG. 6 illustrates in block diagram form a general description of proposed methods, procedures, systems and apparatus for a combustion engine fueled by at least one of: $O_2$ and $H_2$; air and $H_2$; $O_2$, $H_2$ and air wherein $H_2O$ is an option to cool the combustion chamber and to cool the combustion temperature, and wherein the fuel system incorporates catalytic conversion of steam into $H_2$, as well as electrolysis to convert $H_2O$ into $H_2$ and $O_2$.
Figure 7:
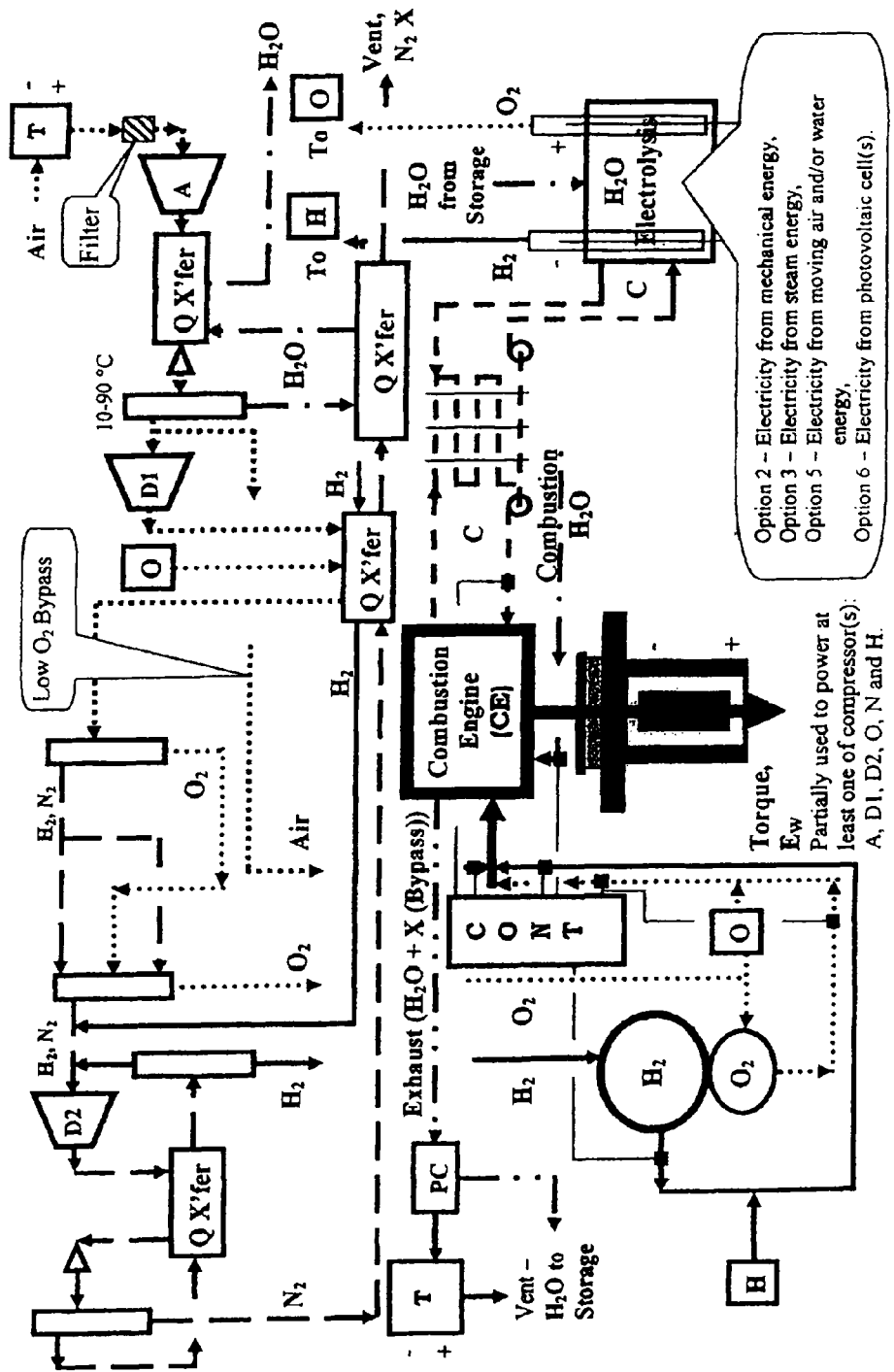
FIG. 7 illustrates in block diagram form a general description of proposed methods, procedures, systems and apparatus for a combustion engine fueled by at least one of: $O_2$ and $H_2$; air and $H_2$; $O_2$, $H_2$ and air wherein $H_2O$ is an option to cool the combustion chamber and to cool the combustion temperature, and wherein the combustion temperature and the fuel system incorporates the cryogenic distillation of air into nitrogen and $O_2$, as well as electricity for electrolysis to convert $H_2O$ into $H_2$ and $O_2$.
Figure 8:
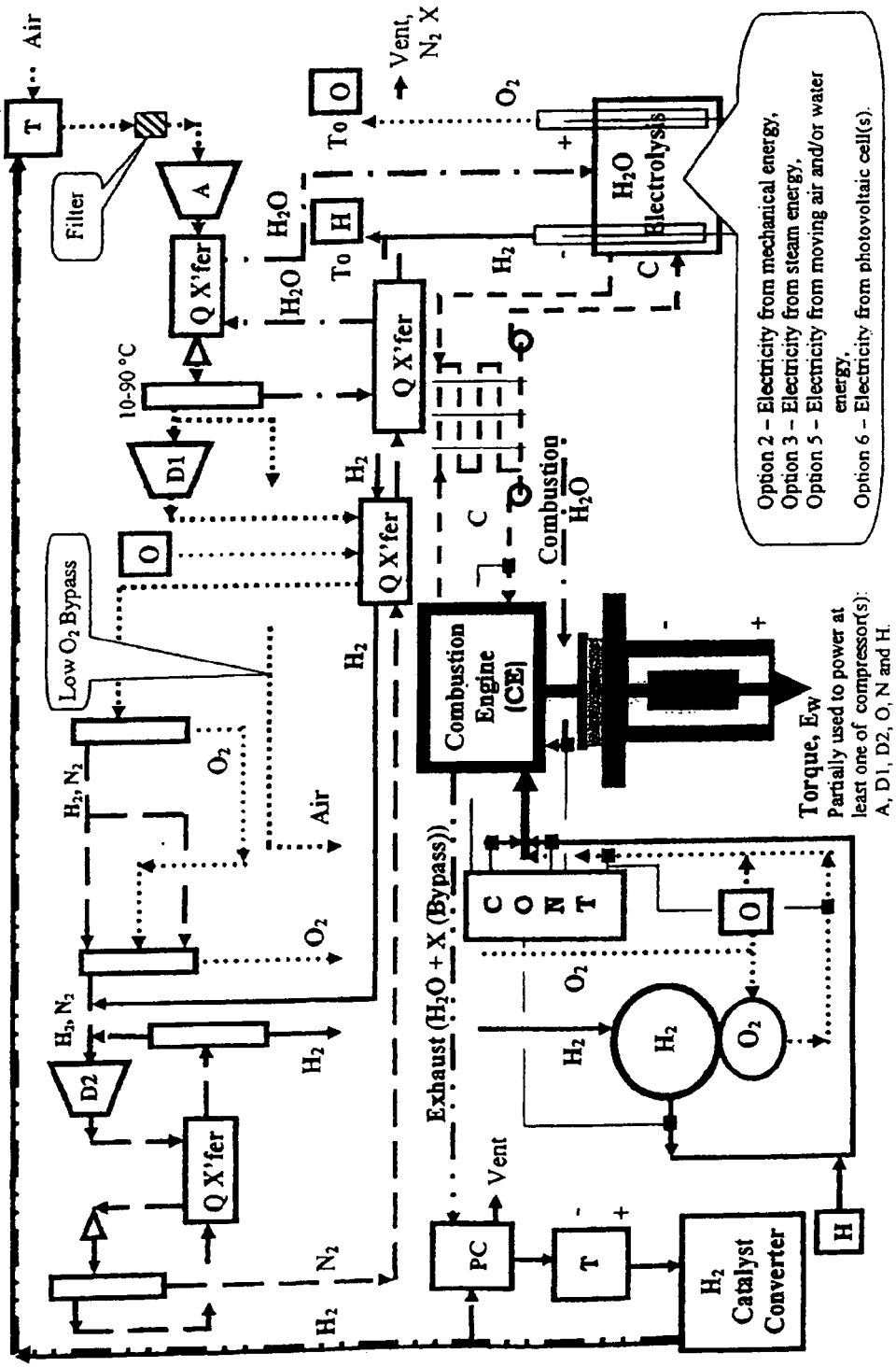
FIG. 8 illustrates in bock diagram form a general description of proposed methods, procedures, systems and apparatus for a combustion engine fueled by at least one of $O_2$ and $H_2$; air and $H_2$; $O_2$, $H_2$ and air wherein $H_2O$ is an option to cool the combustion chamber and to cool the combustion temperature, and wherein the fuel system incorporates catalytic conversion of steam into $H_2$, along with the cryogenic distillation of air into nitrogen and $O_2$, as well as electrolysis to convert $H_2O$ into $H_2$ and $O_2$.
Figure 9:
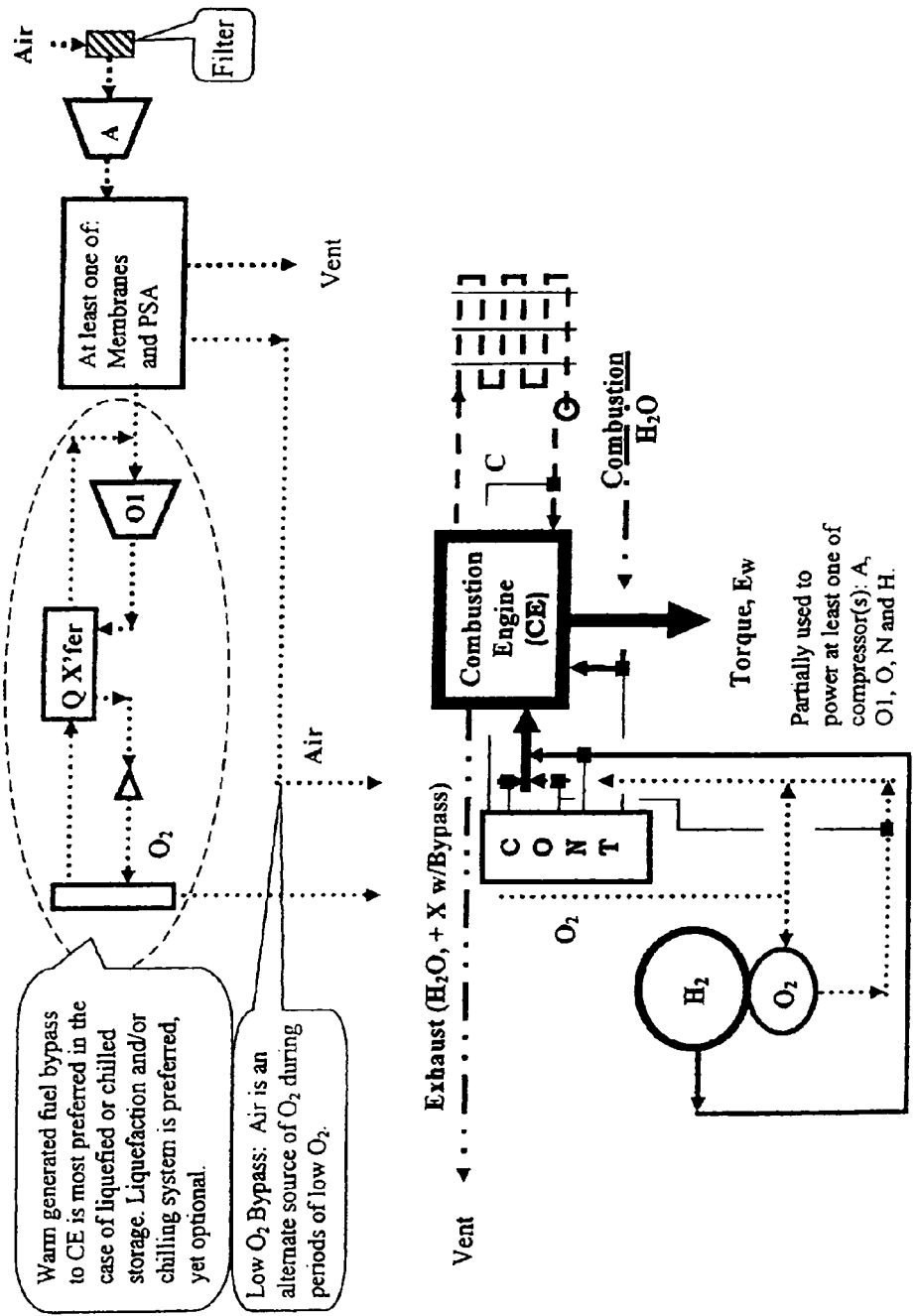
FIG. 9 illustrates in block diagram form a general description of proposed methods, procedures, systems and apparatus for a combustion engine fueled by at least one of: $O_2$ and $H_2$; air and $H_2$; $O_2$, $H_2$ and air wherein $H_2O$ is an option to cool the combustion chamber and to cool the combustion temperature, and wherein the fuel system incorporates the separation of air into nitrogen and $O_2$ with at least one of membranes and PSA.
Figure 10:
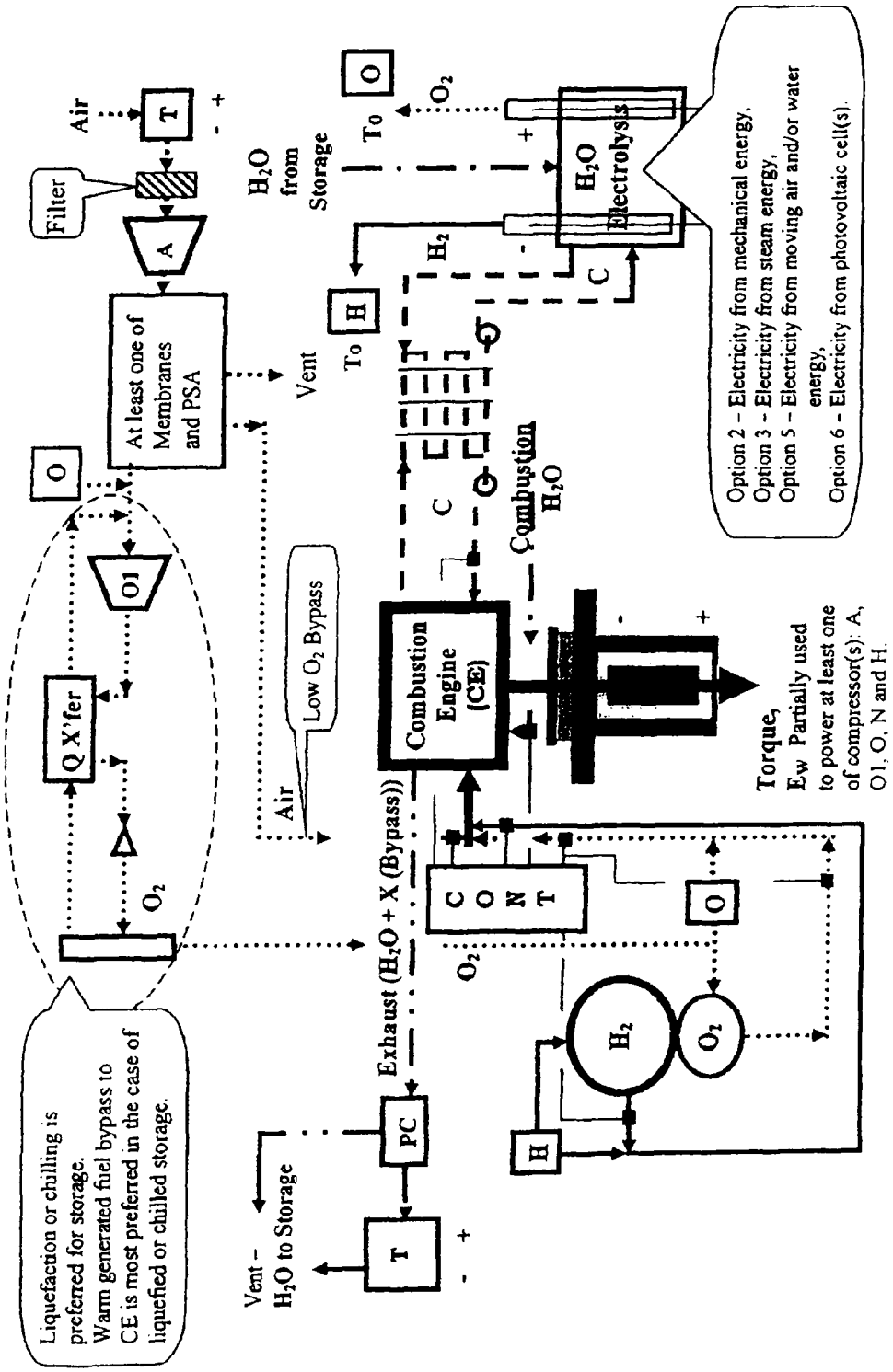
FIG. 10 illustrates in block diagram form a general description of proposed methods, procedures, systems and apparatus for a combustion engine fueled by at least one of: $O_2$ and $H_2$; air and $H_2$; $O_2$, $H_2$ and air wherein $H_2O$ is an option to cool the combustion chamber and to cool the combustion temperature, and wherein the fuel system incorporates the separation of air into nitrogen and $O_2$ with at least one of membranes and PSA, as well as electrolysis to convert $H_2O$ into $H_2$ and $O_2$.
Figure 11:
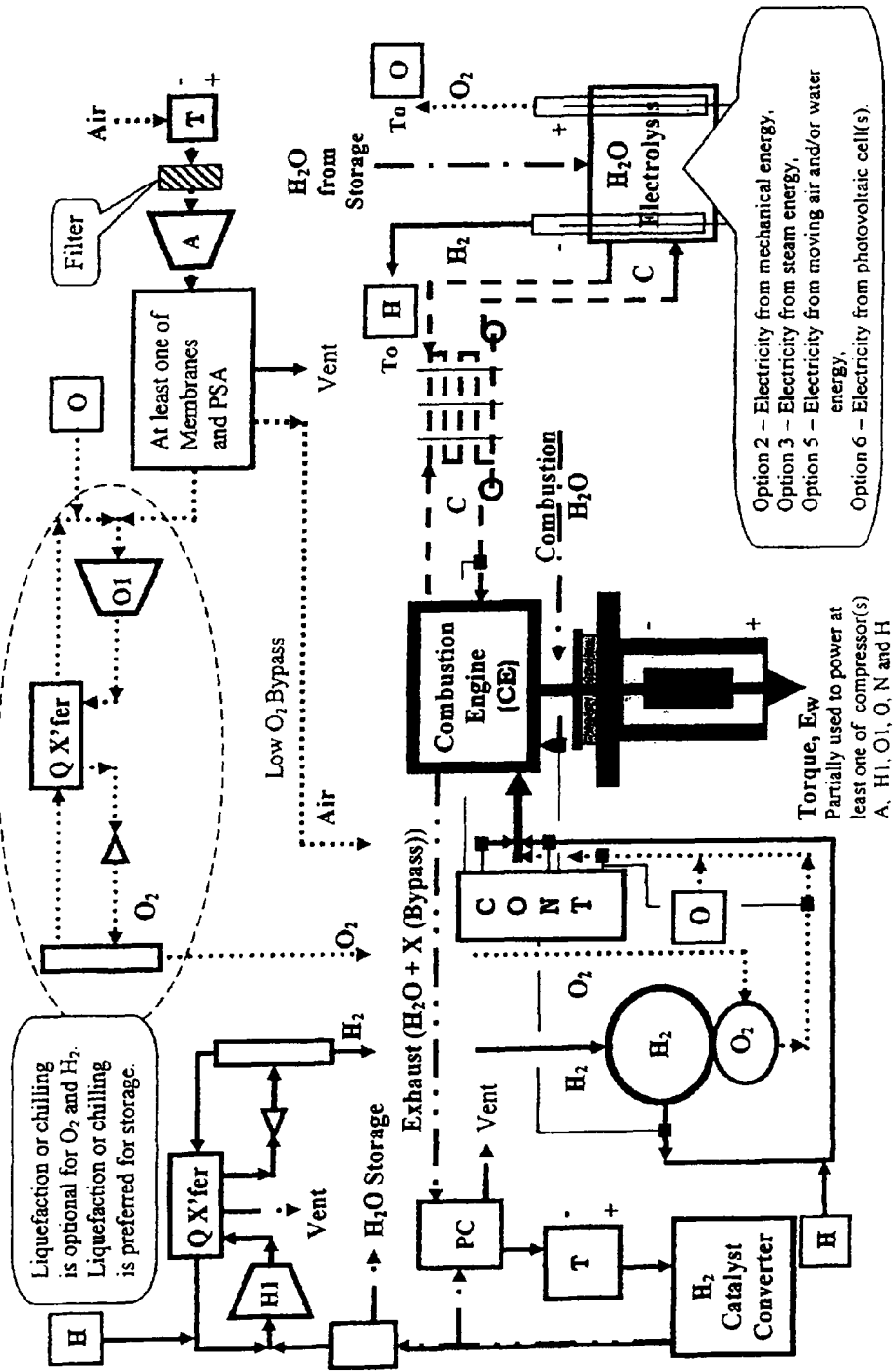
FIG. 11 illustrates in bock diagram form a general description of proposed methods, procedures, systems and apparatus for a combustion engine fueled by at least one of: $O_2$ and $H_2$; air and $H_2$; $O_2$, $H_2$ and air wherein $H_2O$ is an option to cool the combustion chamber and to cool the combustion temperature, and wherein the fuel system incorporates catalytic conversion of steam into $H_2$, along with the separation of air into nitrogen and $O_2$ with at least one of membranes and PSA, as well as alternate methods, processes, systems and apparatus to create electricity for electrolysis to convert $H_2O$ into $H_2$ and $O_2$.
Figure 12:
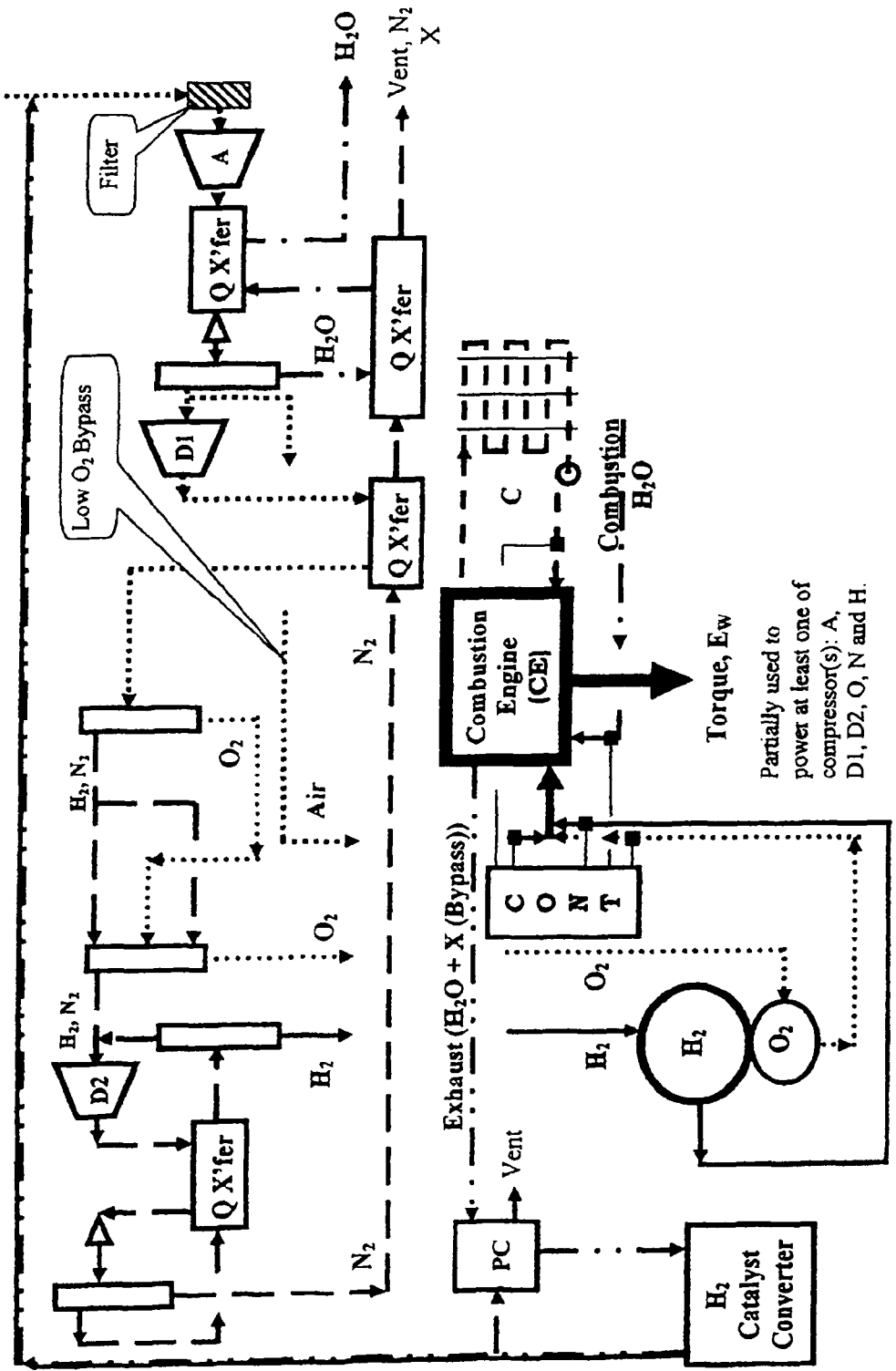
FIG. 12 illustrates in bock diagram form a general description of proposed methods, procedures, systems and apparatus for a combustion engine fueled by at least one of $O_2$ and $H_2$; air and $H_2$; $O_2$, $H_2$ and air wherein $H_2O$ is an option to cool the combustion chamber and to cool the combustion temperature, and wherein the fuel system incorporates catalytic conversion of steam into $H_2$, along with the cryogenic distillation of air into nitrogen and $O_2$.
Figure 13:
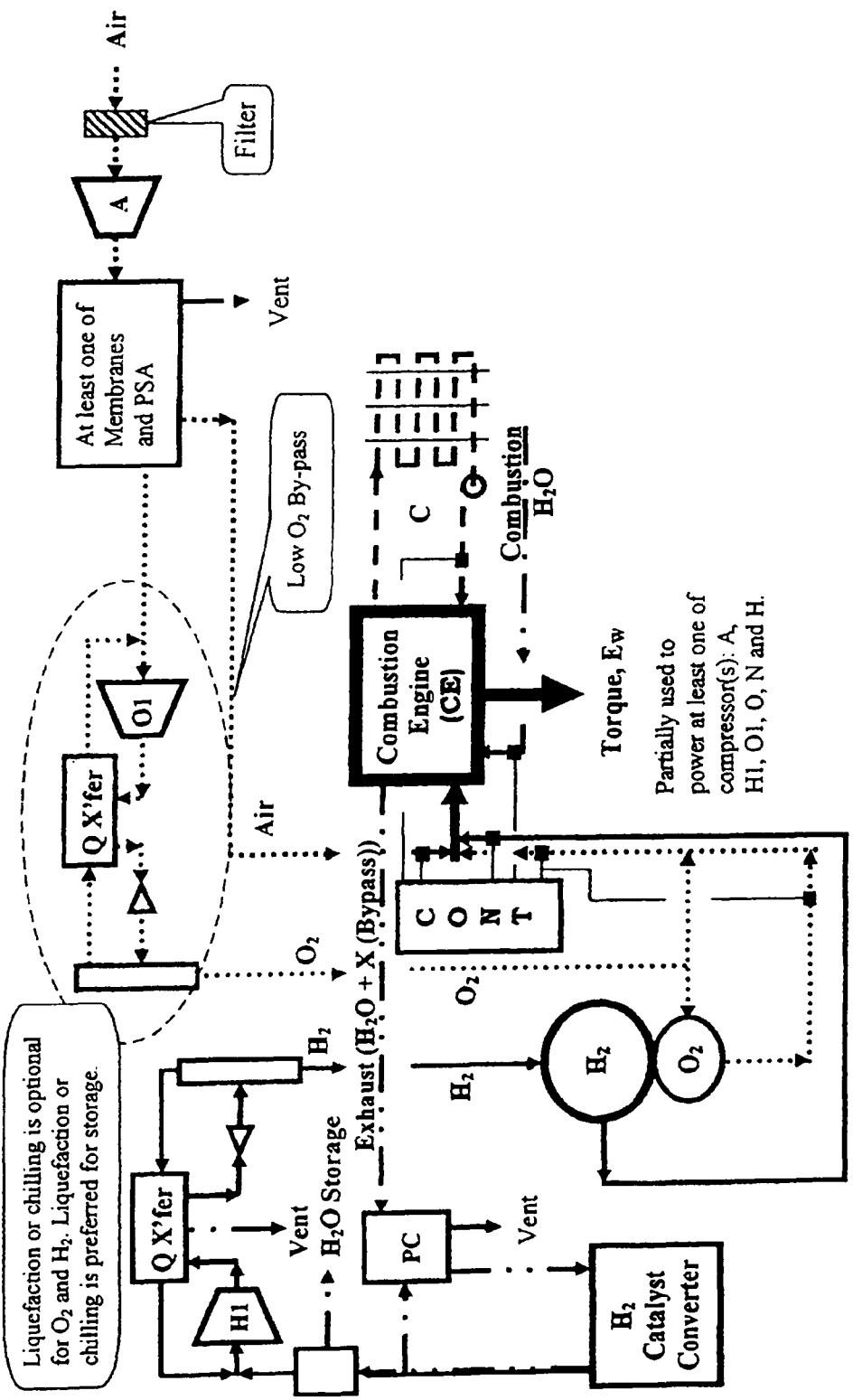
FIG. 13 illustrates in bock diagram form a general description of proposed methods, procedures, systems and apparatus for a combustion engine fueled by at least one of: $O_2$ and $H_2$; air and $H_2$; $O_2$, $H_2$ and air wherein $H_2O$ is an option to cool the combustion chamber and to cool the combustion temperature, and wherein the fuel system incorporates catalytic conversion of steam into $H_2$, along with the separation of air into nitrogen and $O_2$ with at least one of membranes and PSA.
Figure 14:
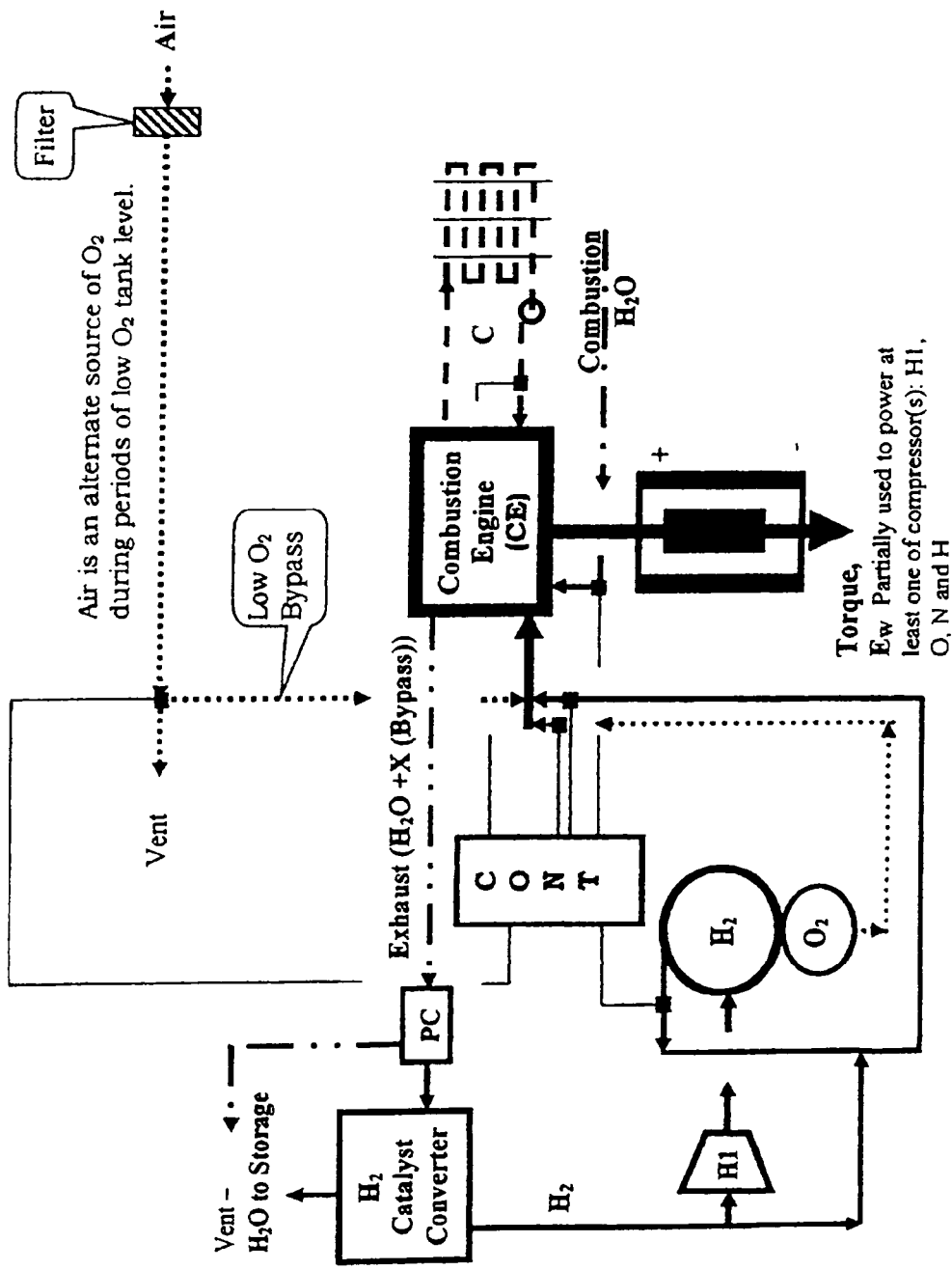
FIG. 14 illustrates in bock diagram form a general description of proposed methods, procedures, systems and apparatus for heating the combustion mixture for a combustion engine that is fueled by at least one of: $O_2$ and $H_2$; air and $H_2$; $O_2$, $H_2$ and air wherein $H_2O$ is an option to cool the combustion chamber and to cool the combustion temperature.
Figure 15:
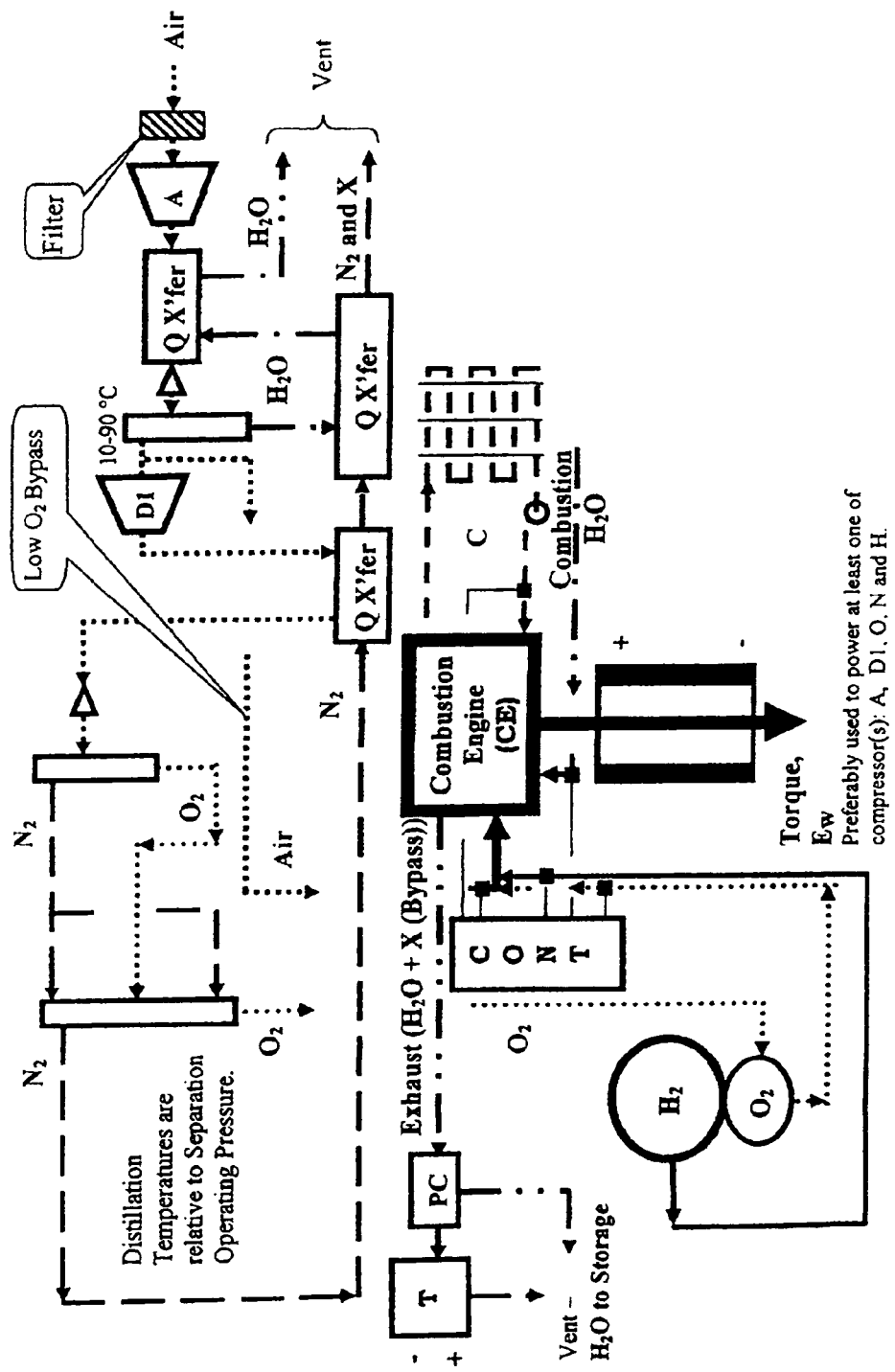
FIG. 15 illustrates in block diagram form a general description of proposed methods, procedures, systems and apparatus for a combustion engine fueled by at least one of: $O_2$ and $H_2$; air and $H_2$; $O_2$, $H_2$ and air wherein $H_2O$ is an option to cool the combustion chamber and to cool the combustion temperature, and wherein the fuel system incorporates the cryogenic distillation of air into nitrogen and $O_2$.
Figure 16:
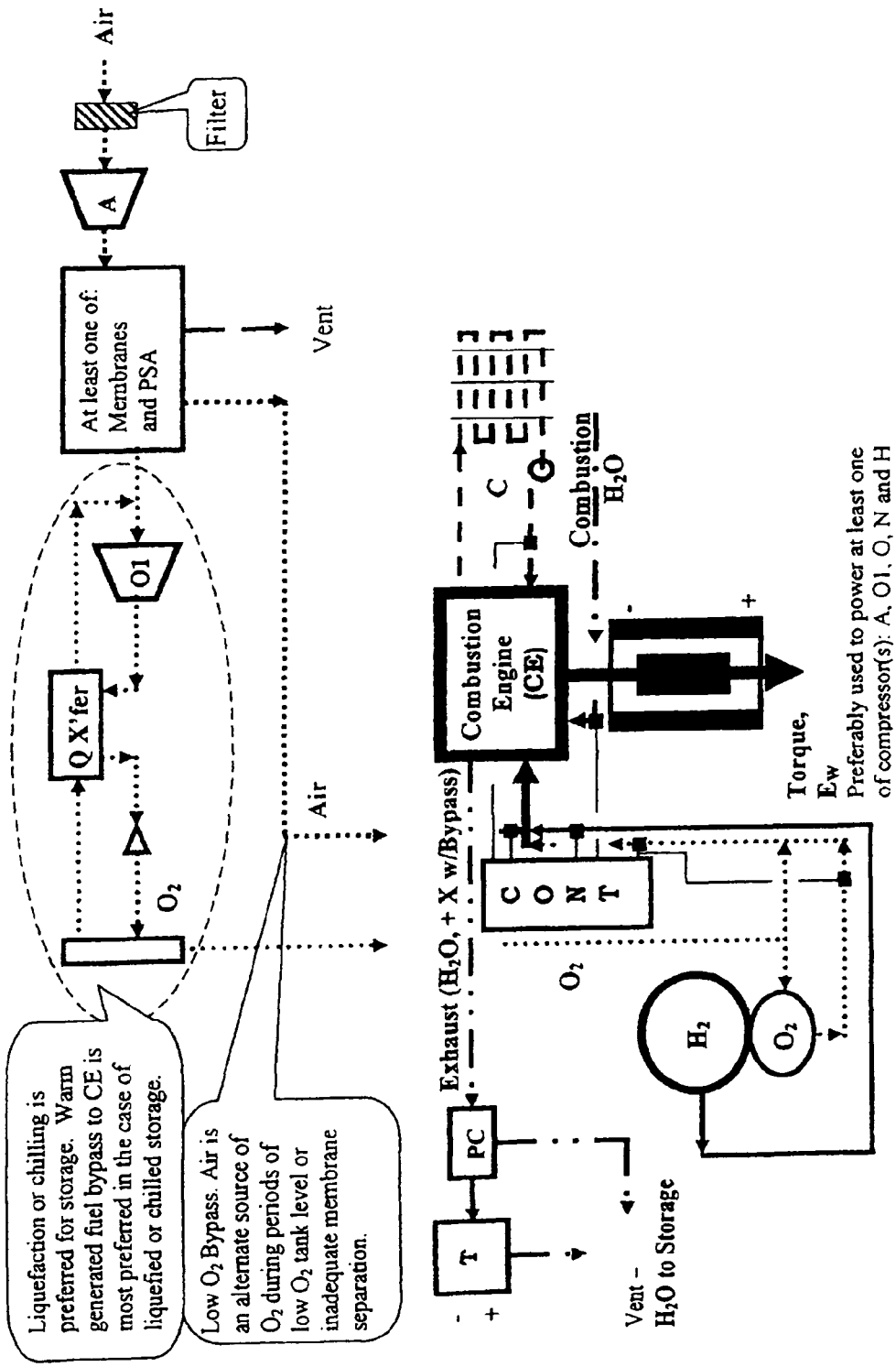
FIG. 16 illustrates in block diagram form a general description of proposed methods, procedures, systems and apparatus for a combustion engine fueled by at least one of $O_2$ and $H_2$; air and $H_2$; $O_2$, $H_2$ and air wherein $H_2O$ is an option to cool the combustion chamber and to cool the combustion temperature, and wherein the fuel system incorporates the separation of air into nitrogen and $O_2$ with at least one of membranes and PSA.
Figure 17:
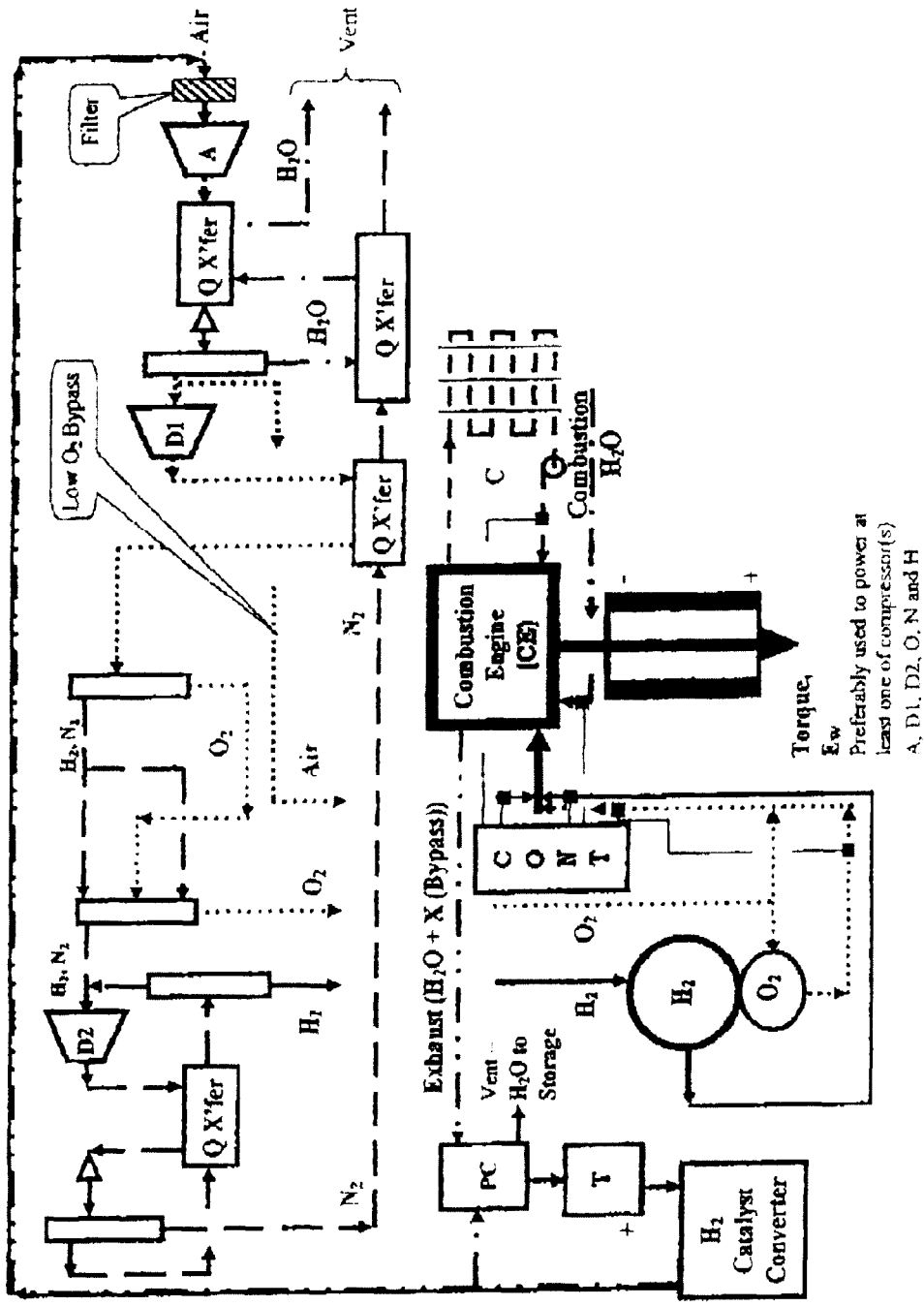
FIG. 17 illustrates in bock diagram form a general description of proposed methods, procedures, systems and apparatus for a combustion engine fueled by at least one of: $O_2$ and $H_2$; air and $H_2$; $O_2$, $H_2$ and air wherein $H_2O$ is an option to cool the combustion chamber and to cool the combustion temperature, and wherein the fuel system incorporates catalytic conversion of steam into $H_2$, along with the cryogenic distillation of air into nitrogen and $O_2$.
Figure 18:
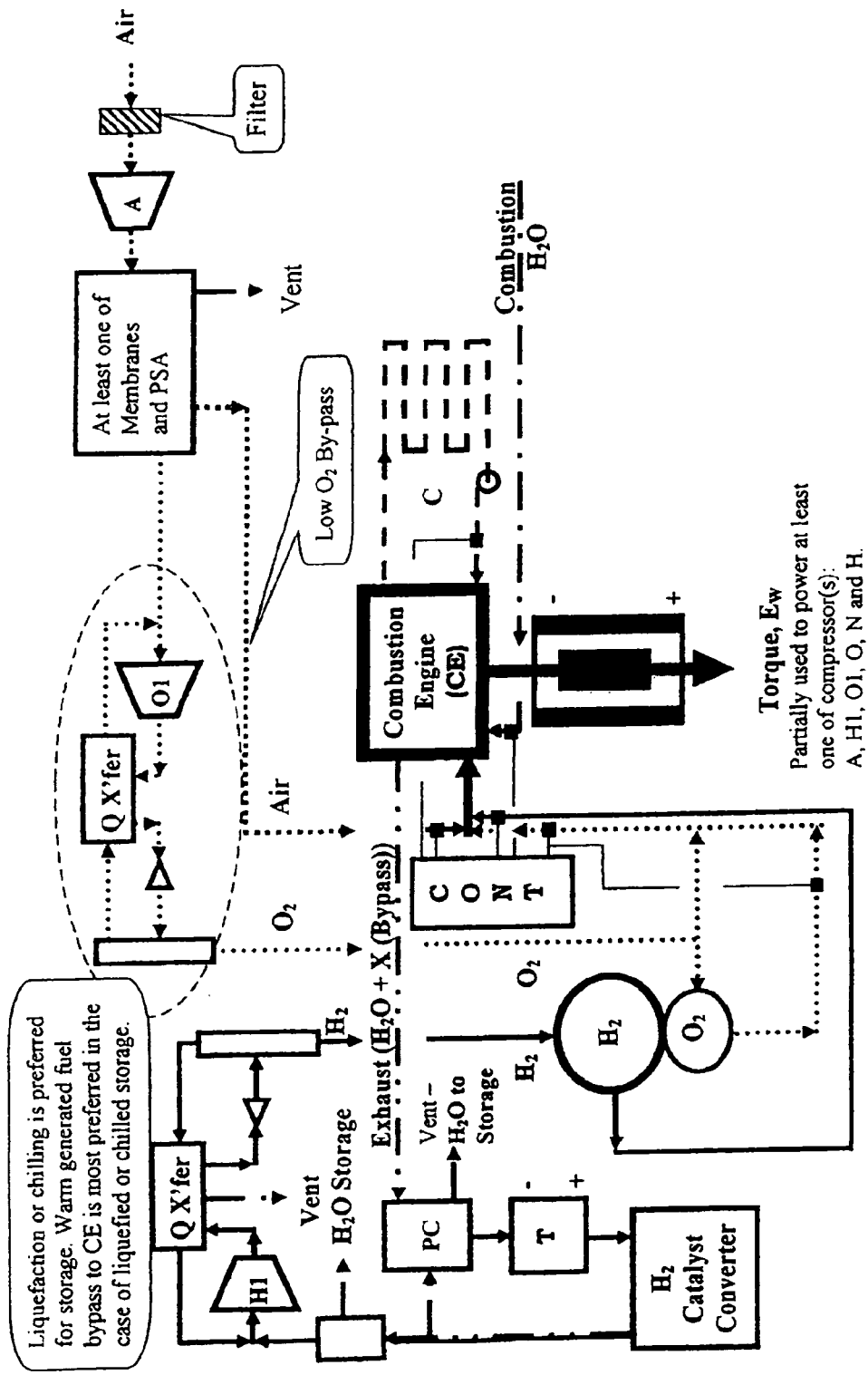
FIG. 18 illustrates in bock diagram form a general description of proposed methods, procedures, systems and apparatus for a combustion engine fueled by at least one of: $O_2$ and $H_2$; air and $H_2$; $O_2$, $H_2$ and air wherein $H_2O$ is an option to cool the combustion chamber and to cool the combustion temperature, and wherein the fuel system incorporates catalytic conversion of steam into $H_2$, along with the separation of air into nitrogen and $O_2$ with at least one of membranes and PSA.
Figure 19:
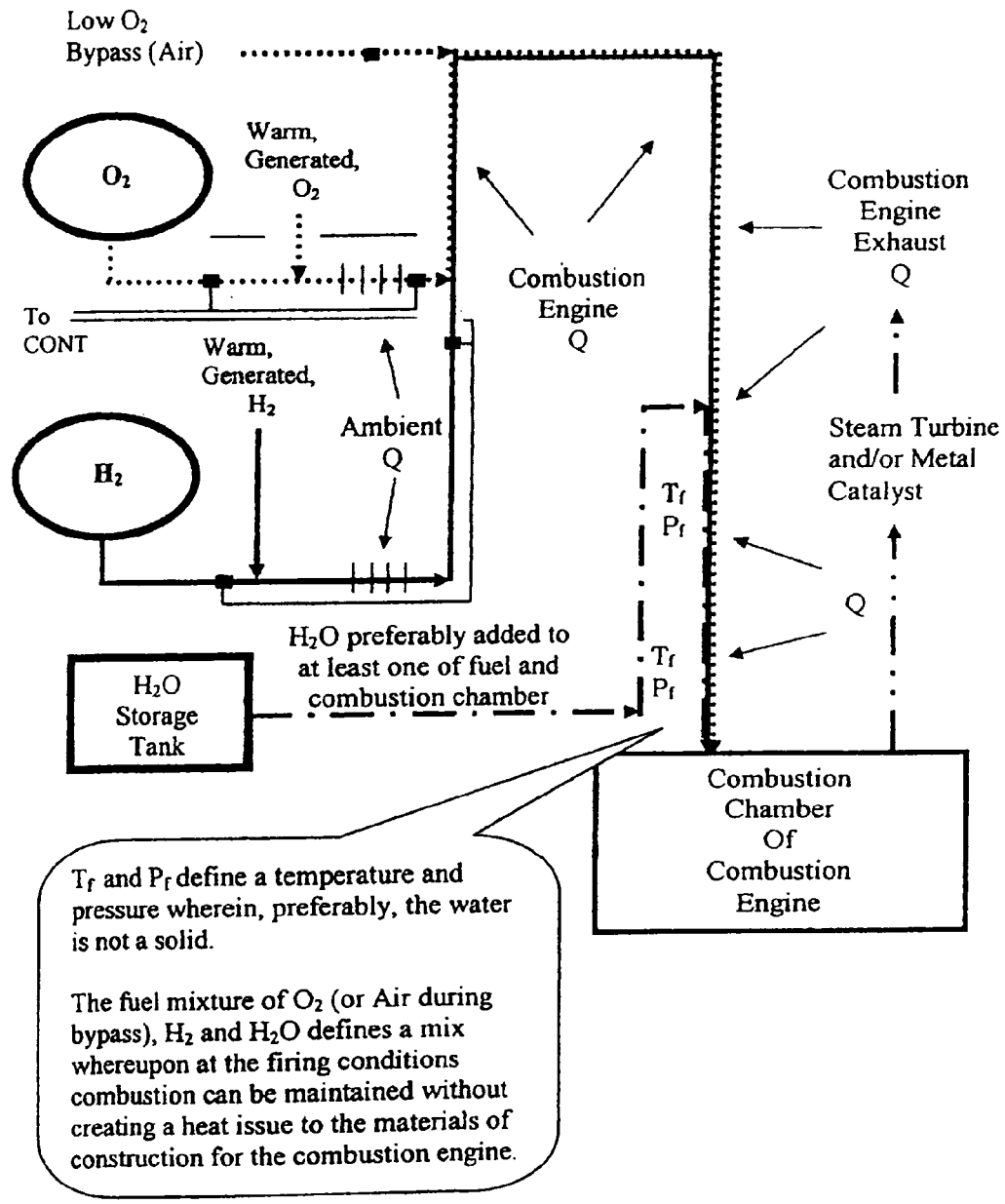
FIG. 19 illustrates in bock diagram form a general description of proposed methods, procedures, systems and apparatus for heating the combustion mixture for a combustion engine that is fueled by at least one of: $O_2$ and $H_2$; air and $H_2$; $O_2$, $H_2$ and air wherein $H_2O$ is an option to cool the combustion chamber and to cool the combustion temperature.

Since the storage of $O_2$ and $H_2$ would be best accomplished at cryogenic temperatures, cryogenic $O_2$ and/or cryogenic $H_2$ can be used to at least partially control combustion temperature. A preferred embodiment of the WCT would be to at least partially control the combustion temperature and/or the engine temperature by the temperature of $O_2$ and/or $H_2$. It is most preferred to preheat at least one of $O_2$, $H_2$, and $H_2O$ to a temperature/pressure combination that allows for efficient combustion. To manage this energy it is a preferred embodiment to heat at least one of the: $O_2$, $H_2$, combustion $H_2O$ and any combination therein by heat exchange from at least one of: ambient temperature, engine combustion energy, engine exhaust steam energy and radiant energy from an electrical resistant heating device and any combination therein. It is most preferred to preheat at least one of $O_2$ and $H_2$ from the ambient temperature prior to heating either: $O_2$, $H_2$ or $H_2O$ by heat exchange from at least one of: ambient temperature, engine combustion energy, engine exhaust steam energy, an electrical radiant heat energy source and any combination therein. Since the heat capacity of water is much greater than that of water vapor (steam) and the latent heat of vaporization of water is a significant heat sink, it is a most preferred to heat the $H_2O$ to a liquid state and not to a gaseous or fluid state (steam). FIG. 19, approximates the preferred embodiment of heating the combustion mixture. While not most preferred, an embodiment of combustion would be to add $H_2O$ with at least one of $N_2$ and Ar to the combustion chamber, utilizing as a heat sink the $H_2O$ as well as $N_2$ and/or Ar to control the combustion temperature. While not preferred, an embodiment would be to utilize air instead of $O_2$ as a source of $O_2$, whenever enough $O_2$ is not available, to combust with $H_2$ to produce $H_2O$ as the primary combustion product, knowing that $NO_X$ will be a secondary combustion product. It is preferred to use an excess of air in the event that air is used instead of $O_2$ as a source of $O_2$; excess air is preferred to control combustion temperature and thereby minimize $NO_X$ formation in the event that pure $O_2$ is not available. An embodiment for the combustion of air and $H_2$ is preferably accomplished with $H_2O$ added to the combustion chamber, thereby utilizing $H_2O$ as a heat sink to reduce the combustion temperature, thereby minimizing $NO_X$ production; the use of $H_2O$ as a heat sink has the additional benefit of producing additional steam in the exhaust. For brevity, the methods, processes, systems and apparatus of the most preferred embodiment(s), the preferred embodiment(s) and the embodiment(s) of combustion will be herein after be referred to as WCT. Methods, processes, systems and apparatus for the WCT are approximated in FIGS. 2 through 24.

Cryogenic Distillation—Methods, processes, systems and apparatus for WCT that incorporate Cryogenic distillation are approximated in FIGS. 5, 7, 8, 12, 15 and 17. Cryogenic distillation principals incorporated into the WCT are those principles as are known in the art of cryogenic distillation. It is to be understood that per the Vapor-Liquid-Equilibrium diagram for each stage of distillation, the temperature of distillation is dependent upon the distillation pressure; higher separation pressures lead to higher separation temperatures. It is to be understood that the $N_2/O_2$ separation portion contains either one, two or three columns for the production of $O_2$, depending on the purity desired; the second column may be eliminated to reach purities of $O_2$ which are less than that of pure $O_2$. The third column is desired to separate Ar from $O_2$, thereby producing very pure $O_2$.

A most preferred embodiment is to cool the air for distillation utilizing at least one of the Joule Thompson Effect and counter-current heat exchange. A preferred embodiment is to cool the air for distillation utilizing at least one of the Joule Thompson Effect and the vaporization of a liquid. An embodiment is to cool the air for distillation utilizing at least one of the Joule Thompson Effect and the expansion of a gas doing work in an engine. A most preferred embodiment is to operate the first stage distillation column at 100 to 200 psia. A preferred embodiment is to operate the first stage distillation column at atmospheric to 500 psia. A preferred embodiment is the use of recycled $N_2$ as a heat sink, wherein said $N_2$ is used to cool at least one of: $O_2$ storage, $H_2$ storage, a cooling system of the combustion engine, a cooling system for electrolysis, the combustion engine, electrolysis, air in an air conditioning system, any portion of cryogenic distillation of air and/or any combination therein. A most preferred embodiment is to cryogenically distill air, wherein the energy utilized for cryogenic separation is energy generated by the WCT and wherein the separated $O_2$ from cryogenic distillation is utilized as a fuel in the WCT.

FIGS. 5, 7, 8, 12, 15 and 17 approximate methods, processes, systems and apparatus of the WCT, wherein cryogenic distillation is used to separate air, wherein $O_2$ from said separation is used as a fuel in said WCT.

Membranes—Membranes, of either organic or inorganic construction, can effectively be used to separate air into $O_2$.

Membrane separation principals incorporated into the WCT are to be those principles as known in the art of membrane separation. Staged membrane separation is preferred to produce very pure $O_2$. With the use of inorganic or organic polymer membranes, it is preferred to place an electrical potential across a membrane designed to hold an electrical potential to facilitate separation. It is most preferred to utilize at least one of organic and inorganic membranes to separate air, wherein the $O_2$ from said separation is used as a fuel in WCT. It is most preferred to utilize the energy of combustion from WCT to provide energy, wherein said energy powers the flow of air through said membrane(s), wherein said membrane separates air, wherein the $O_2$ from said separation is used as a fuel in WCT.

PSA—Whether of positive pressure or vacuum adsorption, PSA can effectively be used to separate air. PSA principals incorporated into the WCT are those principles as are known in the art of PSA. While there are material designs for the adsorption of $O_2$ as well as $N_2$, it is preferred to perform $O_2$ adsorption to minimize the size of PSA. It is most preferred to utilize PSA to separate air, wherein the $O_2$ from said separation is used as a fuel in WCT. It is most preferred to utilize the energy of combustion from the WCT to provide energy, wherein said energy powers said PSA, wherein said PSA separates air, wherein the $O_2$ from said separation is used as a fuel in the WCT.

FIGS. 9, 10, 11, 13, 16 and 18 approximate methods, processes, systems and apparatus of the WCT, wherein at least one of organic membrane(s), inorganic membrane(s), PSA and/or any combination therein is used to separate air, wherein $O_2$ from said separation is used as a fuel in said WCT. In these figures, liquefaction of either $H_2$ or $O_2$ is a depicted option. It is preferred to utilize warm generated $O_2$ and $H_2$ in combustion as a first preference over liquefied $O_2$ or $H_2$; therefore, it is most preferred that any liquefaction be performed in storage as depicted in FIG. 20.

The WCT relates to chemical methods of producing $H_2$ from steam, since steam is the physical state of the water product from the WCT. FIGS. 4, 6, 8, 11, 12, 13, 14, 17 and 18 approximate methods, processes, systems and apparatus discovered in this aspect of the WCT. The WCT converts steam into $H_2$ utilizing the corrosion process. A preferred embodiment is to chemically convert the steam produced by WCT into $H_2$ utilizing the corrosion of at least one metal. A most preferred embodiment is to chemically convert the steam produced by WCT into $H_2$, wherein said $H_2$ is produced by the corrosion of at least one metal, wherein that corrosion is enhanced by an electrical current in the metal(s). A preferred embodiment to chemically convert the steam produced by WCT into $H_2$, wherein said $H_2$ is created by the corrosion of at least one metal, wherein said $H_2$ is used as a fuel in said WCT. A most preferred embodiment is to chemically convert the steam produced by WCT into $H_2$, wherein said $H_2$ is created by the corrosion of at least one metal, wherein said corrosion is enhanced by an electrical current in the metal(s), wherein said $H_2$ is used as a fuel in the WCT. In many of these figures liquefaction of $H_2$ is a depicted option. It is preferred to utilized warm generated $H_2$ in combustion as a first preference over liquefied $H_2$; therefore, it is most preferred that any liquefaction be performed in storage as depicted in FIG. 20.

The WCT relate to electrolysis methods, processes, systems and apparatus to electrolytically convert $H_2O$ into $O_2$ and $H_2$, wherein said $O_2$ and $H_2$ are used as fuel in the WCT. Electrolysis principals incorporated into the WCT are to be those principles as known in the art of electrolysis. FIGS. 3, 6, 7, 8, 10 and 11 approximate the methods, processes, systems and apparatus for electrolysis in the WCT. It is preferred to utilize warm generated $O_2$ and $H_2$ in combustion as a first preference over liquefied $O_2$ or $H_2$; therefore, it is most preferred that any liquefaction be performed in storage as depicted in FIG. 20. As a most preferred embodiment, the WCT stores energy by the potential chemical energy available in $H_2O$ prior to electrolytic separation, as well as in $O_2$ and in $H_2$. Said $O_2$ and $H_2$ are available for fuel in the WCT and/or for a fuel cell to create electrical energy. As a most preferred embodiment, the WCT stores energy by the potential chemical energy available in $H_2O$, wherein said $H_2O$ can electrolytically be converted to $O_2$ and $H_2$, wherein at least a portion of said electrolytically converted $O_2$ and/or $H_2$ is used as fuel in the WCT and/or in a fuel cell to create electrical energy. As a preferred embodiment, the WCT stores energy by the potential chemical energy available in at least one of: $H_2O$, $O_2$, $H_2$ and any combination therein.

Since many combustion systems, methods, engines and apparatus have a mechanical power output or mechanical energy rotating shaft, nearly all applications of the WCT have the capability to convert available mechanical rotating energy into electrical energy. Conversion of available mechanical rotating energy into electrical energy is preferred utilizing an electrical generation device; most preferably a generator. It is an embodiment that an alternator or dynamo is used, wherein said electrical energy from an alternating current may be converted to a direct current. It is an embodiment for the WCT to perform work other than create electrical energy, generate heat or generate steam, wherein said generator is utilized inversely proportional to the mechanical work or torque performed by the WCT. It is a preferred embodiment that the mechanical rotating energy produced by the WCT enter a transmission, wherein said transmission engage in a manner that is inversely proportional to the torque and/or work output of the WCT, wherein said transmission output mechanical rotating energy turn said generator to create said electrical energy. Said transmission is to be as is known in the art. It is most preferred that said transmission engage a flywheel capable of storing rotational kinetic energy, wherein said flywheel turns said generator. FIGS. 3, 6, 7, 8, 10 and 11 approximate methods, processes, systems and apparatus to recycle mechanical rotating energy as discovered. A preferred embodiment is the conversion of mechanical rotating energy created by the WCT into electrical energy utilizing an electrical generator device. A most preferred embodiment is wherein said electrical energy from said electrical generator device is utilized in the electrolysis of $H_2O$ into $H_2$ and $O_2$. A most preferred embodiment is the conversion of mechanical rotating energy created by the WCT into electrical energy utilizing an electrical generator device, wherein said electrical energy is utilized in the electrolysis of $H_2O$ into $H_2$ and $O_2$, wherein said $H_2$ and/or $O_2$ is used as fuel in the WCT.

Fuel Storage—By the ideal gas law (PV=nRT), it can be surmised that the efficiency of compression and efficiency of storage for $O_2$ and/or $H_2$ increases significantly if the $O_2$ and/or the $H_2$ is stored at cryogenic temperatures. It is preferred to store at least one of $H_2$ and/or $O_2$ at cryogenic temperatures. It is preferred to store at least one of $H_2$ and/or $O_2$ in a liquid state. Due to the explosive and flammable nature of $H_2$ and $O_2$, it is preferred to utilize $N_2$ as a refrigerant for the storage of at least one of $H_2$ and $O_2$. Due to the negative Joule Thompson curve for $H_2$, it is most preferred to cool $H_2$ prior to any attempted cryogenic chilling or liquefaction. Due to the rather extreme explosive nature of $O_2$, it is preferred to limit the required storage of $O_2$ with preference to to any of said $O_2$ generating technologies (cryogenic distillation, membrane separation and/or PSA). To maintain fuel storage temperatures, it is preferred to operate a compressor for at least one of: liquefaction of $O_2$, chilling of $O_2$, liquefaction of $H_2$, chilling of $H_2$ and any combination therein. It is most preferred that said compressor be powered by the WCT. FIG. 20, illustrates in block diagram form chilling and/or liquefaction of $O_2$ and/or $H_2$.

Since nearly all applications of WCT have an engine exhaust, nearly all applications of the WCT will have the ability to convert combustion exhaust energy into electrical energy. It is preferred to insulate the WCT, as is known in the art of insulation, to manage energy. Insulation is most preferred in the WCT and the WCT exhaust, to thereby minimize WCT enthalpy losses. Conversion of exhaust energy is preferably performed utilizing a steam turbine. FIGS. 3, 6, 7, 8, 10, 11, 14, 15, 16, 17, 18, 21 and 21A approximate the methods, processes, systems and apparatus to convert steam energy into electrical energy. Steam turbine principals incorporated into the WCT are those principles as are known in the art of steam turbine technology. A preferred embodiment is the conversion of steam energy, wherein said steam energy is created by the WCT, wherein said steam energy is converted into electrical energy utilizing at least one steam turbine, wherein said steam turbine(s) turns at least one generator creating said electrical energy. It is preferred that said electrical energy be regulated. In the case wherein an alternator is used, it is preferred that said electrical energy be converted from an alternating current to a direct current, as is known in the art. A most preferred embodiment is wherein at least a portion said electrical energy is utilized in the electrolysis of $H_2O$ into $H_2$ and $O_2$. A most preferred embodiment is the conversion of steam energy created by the WCT into electrical energy utilizing at least one steam turbine, wherein each said steam turbine(s) turn a generator device, wherein said generator device(s) creates an electrical current, wherein at least a portion of said electrical current is utilized in the electrolysis of $H_2O$ into $H_2$ and $O_2$, wherein at least a portion of said $H_2$ and/or $O_2$ is used as fuel in said WCT.

It is preferred that many applications of the WCT perform some type of movement; therefore many applications of the WCT will have an available source of moving air or moving water. Applications of the WCT will have the ability to convert the energy of moving air or water. FIGS. 3, 6, 7, 8, 10, 11 and 22 approximate the methods, processes, systems and apparatus to convert moving air energy into electrical energy. A preferred embodiment of the WCT is the conversion of the energy of moving air or water into electrical energy, wherein said electrical energy is created by a generator from the moving air or water utilizing a generator which turns in direct consequence of the moving air or water, wherein at least a portion of said electrical energy is utilized in the electrolysis of $H_2O$ into $H_2$ and $O_2$. It is preferred that said electrical energy be regulated. In the case wherein an alternating current is created, it is preferred that said electrical energy be converted to a direct current. A most preferred embodiment is use of at least a portion of said $H_2$ and/or $O_2$ as fuel in the WCT.

Steam Turbine Method, Process and System

The energy of steam is measured in temperature and in pressure. Assuming saturated steam, steam energy is measured by pressure alone, i.e. the steam is normally termed 150, 300 or 400 psig steam, etc. Only in the case superheated steam is steam energy measured by both pressure and temperature. Steam looses temperature and pressure as steam energy is used and/or lost. Upon loosing energy, steam temperature and pressure (usually just measured as pressure) reduces and the steam begins condensing water. Once all of the steam energy is depleted, there is no pressure or water vapor, just hot water. Using this knowledge, one may expect all electrical generation facilities to use every last BTU or psig of steam. Such is not done, because such is not economical, given the required investment in pollution control equipment, heat transfer equipment (boilers) and in steam turbines. It is common for steam generation facilities to operate the final stage of electrical generation wherein the final steam turbine operates at less than atmospheric pressure, 14.7 PSIA=0 PSIG. However, in the case of WCT, pollution control equipment is minimized in combustion and heat transfer equipment is eliminated, thereby reducing investment and improving heat transfer. Heat transfer equipment is minimized or eliminated because the exhaust of the WCT Engine, steam, is directly transferred to the steam turbine. In the case of hydrocarbon combustion, energy of the hot gasses of combustion are transferred via a heat exchanger to water, thereby creating steam, after which said hot gases are transferred to environmental protection equipment. Said heat exchanger(s) are normally called boilers. The discovered WCT eliminate the need for boilers to generate steam, thereby improving heat transfer, thereby improving steam generation efficiency.

It is preferred that steam turbine(s) of the WCT be installed in a configuration, wherein the exhaust of the WCT turn said steam turbine(s). Removal of steam energy is most preferably performed in a staged system, wherein at each stage a portion of the energy of the steam is removed by a steam turbine and the resulting condensation is removed prior to the next steam turbine or stage of energy removal. It is most preferred that all of the steam energy (pressure) be removed by the steam turbine/water removal system(s). It is most preferred that the condensation generated during the generation of electricity be transferred to electrolysis. It is preferred that at least a portion of the energy of the steam (pressure) be removed by the steam turbine/water removal system. FIGS. 21 and 21A approximates the methods, processes, systems and apparatus to convert steam energy into electrical energy.

Air and Water Motion Turbine Method and System

The energy of moving air or water is measured in mass and velocity. Since the mass of air or water into an air or water turbine is equals the mass out of said turbine, the change in velocity is the measure of energy removal. That energy difference can be directly calculated using the laws of physics, specifically kinetic energy. However, it must be noted that the difference in velocity, the removed energy, which can be converted into electrical energy by the turbine will have an opposite drag force. For a stationary combustion engine of the discovered WCT, said drag force can be counterbalanced by the support structure of the turbine. However, in transportation applications wherein the drag force is counter to the direction of motion, said drag force will reduce transportation efficiency. In transportation applications, the vehicle inherently contains a drag force that reduces transportation efficiency. To the extent that said contained drag force can be utilized to convert moving air or water energy into electrical energy at a cost that is less than the energy losses in said contained drag force, is to the extent that said wind and/or water turbine will have practical application. One such application is that of a sail boat, wherein the drag force is in the same direction as the direction of motion. FIG. 22 approximates WCT methods, processes, systems and apparatus to convert moving air energy into electrical energy.

In water applications, wave energy (vertical energy) is much greater than the energy of the water's movement (horizontal energy). It is preferred in water applications that a generator be driven by the energy of the vertical wave movement. FIGS. 23 and 23A approximates WCT methods, processes, systems and apparatus to convert moving water energy into electrical energy. It is preferred to use said electrical energy from said water energy to electrolytically convert $H_2O$ into $H_2$ and $O_2$. It is most preferred to use said $H_2$ and/or said $O_2$ as fuel for said WCT.

Photovoltaic Cells

Wherein light is available, it is an embodiment to utilize photovoltaic cells to create electricity. It is preferred to use said electricity from said photovoltaic cells to electrolytically convert $H_2O$ into $H_2$ and $O_2$. It is most preferred to use said $H_2$ and/or said $O_2$ as fuel for the WCT.

Fuel Cells

Wherein electricity is required, it is an embodiment to utilize fuel cells to create electricity. In such applications, $H_2$ and potentially $O_2$ with a fuel cell would replace a battery. It is preferred to create said electricity with a fuel cell when the WCT is not in operation. It is preferred to utilize a fuel cell to power a compressor for chilling and/or liquefaction of $H_2$ and/or $O_2$. It is most preferred to utilize the WCT to create electricity. It is preferred that said fuel cell be powered by hydrogen and at least one of $O_2$ and air.

Heating

The discovered WCT is especially suited for applications to generate heat. Heat generation may be performed using the WCT in both industrial and domestic applications. In the case of heating a gas or a liquid, the heat energy of the WCT can be effectively transferred via any heat exchange equipment as is known in the art of heat transfer.

In the case of heating air, it is most preferred that the exhaust of combustion be discharged directly into said air to be heated. In the case of heating air to be used in an enclosed human, plant and/or animal application, wherein the combustion components are at least one of $O_2$ and $H_2$; and $O_2$, $H_2$ and $H_2O$, it is most preferred that at least a portion of the exhaust of combustion discharge directly into said air, thereby providing humidified heated air.

In the case of heating water, it is most preferred that the exhaust of combustion discharge directly into said water to be heated, wherein the water heater or hot water storage has a vent to release generated $NO_X$. In the case of heating water, wherein the combustion components are at least one of: $O_2$ and $H_2$; and $O_2$, $H_2$ and $H_2O$, it is most preferred that the exhaust of combustion can be discharged directly into said water to be heated, and wherein the water heater or hot water storage has a pressure relief device, as is known in the art.

It is most preferred in heating applications that the WCT create electricity, as well as heat the subject gas and/or liquid. Configurations for the heating of a gas or a liquid are limited to the creativity of the designer; however, configurations approximating the WCT, wherein the heating of a gas or a liquid is performed is approximated in FIGS. 2 through 18, wherein heat transfer can be performed either in the exhaust of said combustion or in the block of said WCT (CE). (In this case cooling said CE is not a loss of efficiency since the removed heat has a purpose.)

Cooling

The discovered WCT is especially suited for applications to remove heat. Heat removal may be performed using the WCT, wherein at least one of: cryogenic distillation is performed and/or the WCT provides mechanical energy, wherein said mechanical energy powers a refrigeration system. In the case of cooling a gas or a liquid, the heat sink capability of the chilled $N_2$ from said cryogenic distillation is preferably transferred via heat exchange equipment, as is known in the art of heat transfer. In the case of cooling a gas or a liquid, a refrigeration unit is preferably used, wherein said refrigeration unit is powered by energy is created by the WCT.

In the case of cooling air or water, it is most preferred that the heat sink capability of the chilled $N_2$ from said cryogenic distillation be transferred either directly to said air and/or via any heat exchange technology as is known in the art of heat transfer.

It is most preferred in cooling applications that the WCT create electricity, as well as cool a gas and/or liquid. System configurations for the cooling of a gas or a liquid are limited to the creativity of the designer.

Water Chemistry

Water is the most efficient and economical method of storing $O_2$ and/or $H_2$. Electrolysis of water is the preferred method of converting stored $H_2O$ into combustible $H_2$ and/or $O_2$. Electrolysis is best performed with a dissolved electrolyte in the water; the dissolved electrolyte, most preferably a salt, will improve conductivity in the water, thereby reducing the required electrical energy to perform electrolysis. It is an embodiment to perform electrolysis upon water that contains an electrolyte. It is preferred to perform electrolysis upon water that contains a salt. It is most preferred to perform electrolysis upon water that contains polyelectrolytes. However, many dissolved cation(s) and anion(s) combination(s) can precipitate over time reducing the efficiency of electrolysis. Due to inherent solubility, it is a preferred embodiment to perform electrolysis upon water that contains a Group IA/Group VIIA salt (including acids). Further, as temperature is increased, hard water contaminants may precipitate; therefore, it is preferred that the water of electrolysis be distilled or de-ionized prior to the addition of a Group IA/Group VIIA salt. Since electrolytic processes create heat, it is preferred to cool electrolysis. It is most preferred to cool electrolysis with the available heat sink from the $N_2$ available from the cryogenic distillation of air.

A dispersant is preferably added to water to prevent scale. Dispersants are low molecular weight polymers, usually organic acids having a molecular weight of less than 25,000 and preferably less than 10,000. Dispersant chemistry is based upon carboxylic chemistry, as well as alkyl sulfate, alkyl sulfite and alkyl sulfide chemistry; it is the oxygen atom that creates the dispersion, wherein oxygen takes its form in the molecule as a carboxylic moiety and/or a sulfoxy moiety. Dispersants that can be used which contain the carboxyl moiety are, but are not limited to: acrylic polymers, acrylic acid, polymers of acrylic acid, methacrylic acid, maleic acid, fumaric acid, itaconic acid, crotonic acid, cinnamic acid, vinyl benzoic acid, any polymers of these acids and/or any combination therein. Dispersants that can be used contain the alkyl sulfoxy or allyl sulfoxy moieties include any alkyl or allyl compound, which is water soluble containing a moiety that is at least one of: SO, $SO_2$, $SO_3$, and/or any combination therein. Due to the many ways in which an organic molecule can be designed to contain the carboxyl moiety and/or the sulfoxy moiety, it is an embodiment that any water soluble organic compound containing at least one of a carboxylic moiety and/or a sulfoxy moiety. (This is with the knowledge that not all dispersants have equivalent dispersing properties.) Acrylic polymers exhibit very good dispersion properties, thereby limiting the deposition of water soluble salts and are most preferred embodiments as a dispersant. The limitation in the use of a dispersant is in the dispersants water solubility in combination with its carboxylic nature and/or sulfoxy nature.

Water is inherently corrosive to metals. Water naturally oxidizes metals, some with a greater oxidation rate than others. To minimize corrosion, it is preferred that the water have a pH of equal to or greater than 7.5, wherein the alkalinity of the pH is from the hydroxyl anion. Further, to prevent corrosion or deposition of water deposits on steam turbines, it is preferred to add a corrosion inhibitor to the water. It is an embodiment to utilize nitrogen containing corrosion inhibitors, such as hydrazine, as is known in the art.

Corrosion inhibitors are added to water to prevent corrosion. Chelants can be used to prevent corrosion, as well as complex and prevent the deposition of many cations, including hardness and heavy metals. Chelants or chelating agents are compounds having a heterocyclic ring wherein at least two kinds of atoms are joined in a ring. Chelating is forming a heterocyclic ring compound by joining a chelating agent to a metal ion. Chelants contain a metal ion attached by coordinate bonds (i.e. a covalent chemical bond is produced when an atom shares a pair of electrons with an atom lacking such a pair) to at least two nonmetal ions in the same heterocyclic ring. Examples of the number of chelants used for mineral deposition in the present invention are water soluble phosphates consisting of phosphate, phosphate polymers, phosphate monomers and/or any combination thereof. The phosphate polymers consist of, but are not limited to, phosphoric acid esters, metaphosphates, hexametaphosphates, pyrophosphates and/or any combination thereof. Phosphate polymers are particularly effective in dispersing magnesium silicate, magnesium hydroxide and calcium phosphates. Phosphate polymers are particularly effective at corrosion control. With proper selection of a polymer, along with maintaining an adequate polymer concentration level, the surface charge on particle(s) can be favorably altered. In addition to changing the surface charge, polymers also function by distorting crystal growth. Chelants lock the metals in the water into soluble organic ring structures of the chelants. Chelants provide reactive sites that attract coordination sites (i.e. areas of the ion that are receptive to chemical bonding) of the cations. Iron, for example, has six coordination sites. All coordination sites of the iron ion are used to form a stable metal chelant. Chelants combine with cations such as calcium, magnesium, iron and copper that could otherwise form deposits. The resulting chelated particles are water soluble. The effectiveness of chelant(s) is limited by the concentration of competing anions, alkalinity and temperature.

The effect of adding sufficient amounts of the number of chelant(s) by the WCT is to reduce available free metal ions in the water and therefore, reduce the phosphate demand. Phosphate, such as phosphoric acid and/or pyrophosphoric acid is used to complex or form metal phosphates, which are insoluble. In the preferred embodiments, phosphate polymers, such as metaphosphate and/or hexametaphosphate is used as a corrosion inhibitor and as a chelant to prevent correspondingly any precipitation of calcium and/or magnesium, while providing corrosion control. Metaphosphate and/or hexametaphosphate, as well as polymers based upon this chemistry, soften the water by removing the free calcium and/or magnesium ions from the water and by bringing the metal ions into a soluble slightly-ionized compound or radical. In addition, the water containing any excess metaphosphate and/or hexametaphosphate will actually dissolve any phosphate or carbonate which may deposit. Metaphosphate and/or hexametaphosphate do not throw the metal ions out of solution as is the case of usual water softening compounds, but rather lock up the metal ions in a metaphosphate and/or a hexametaphosphate complex molecule; these molecules provide a one or two molecule thickness coating on metal surfaces to limit metal corrosion. This is particularly important for heavy metal materials.

Operating Pressure Relief

Figure 24:
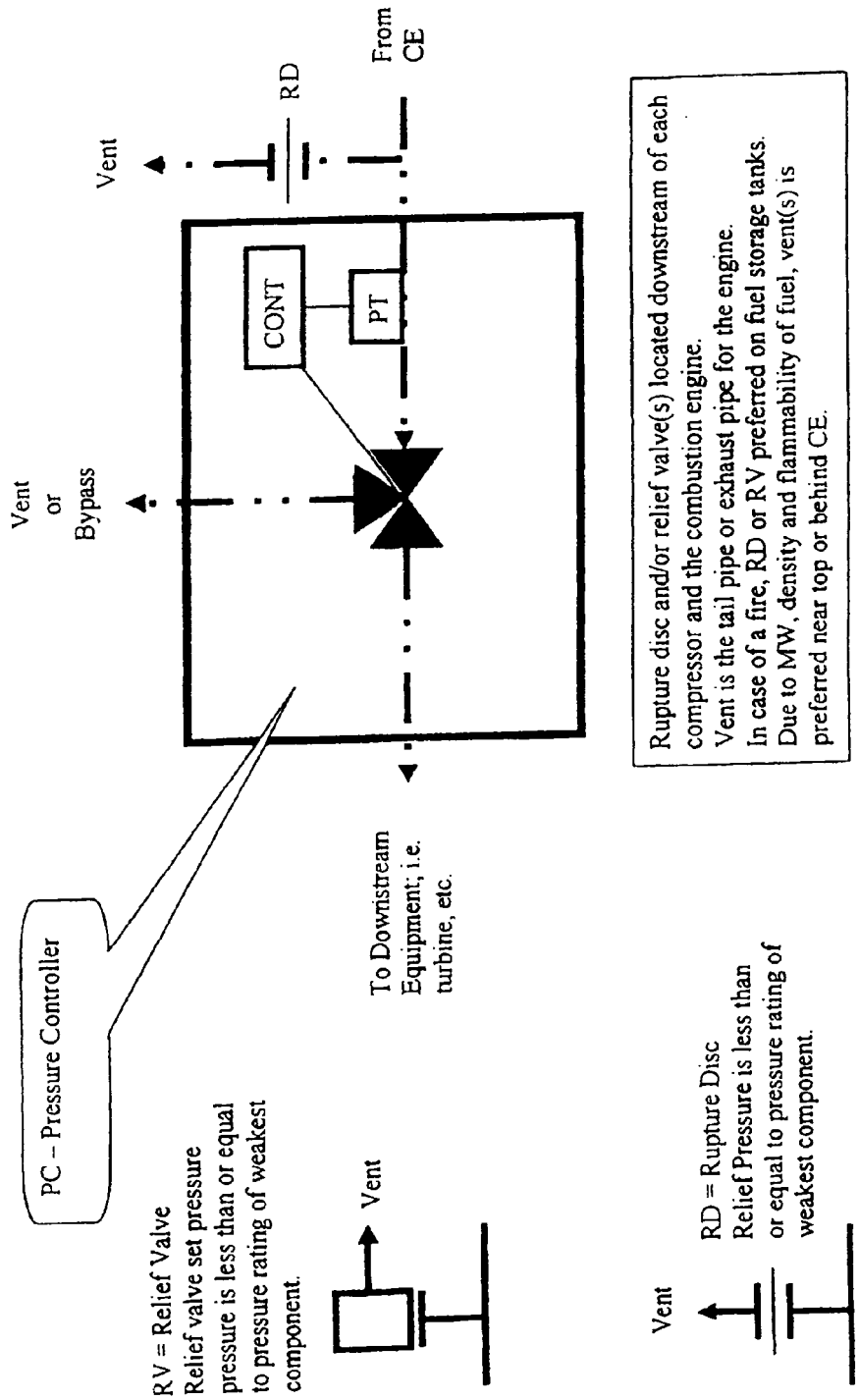
FIG. 24 illustrates in bock diagram form a general description of proposed methods, procedures, systems and apparatus for pressure control for a combustion engine, wherein said combustion engine is fueled by at least one of $O_2$ and $H_2$; air and $H_2$; $O_2$, $H_2$ and air wherein $H_2O$ is an option to cool the combustion chamber and to cool the combustion temperature.
Figure 25:
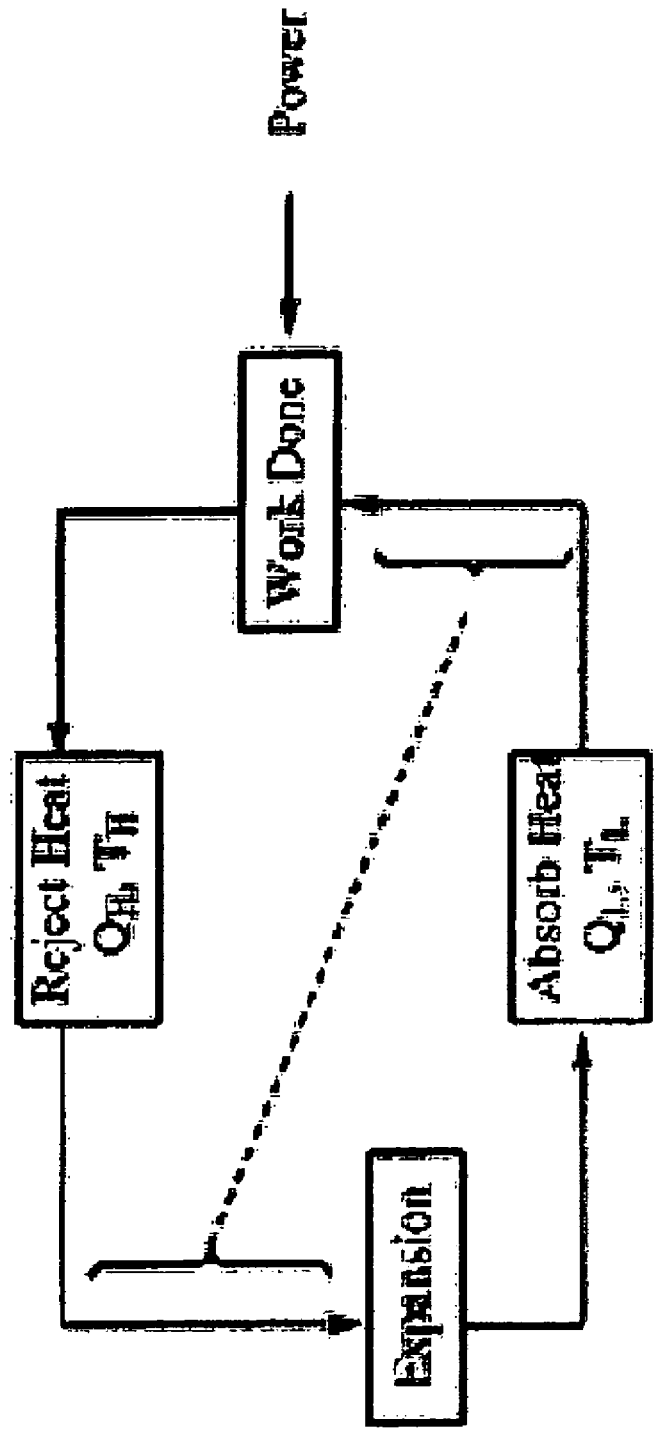
FIG. 25 illustrates in bock diagram form a general description of the methods and processes of refrigeration and liquefaction.
Figure 26:
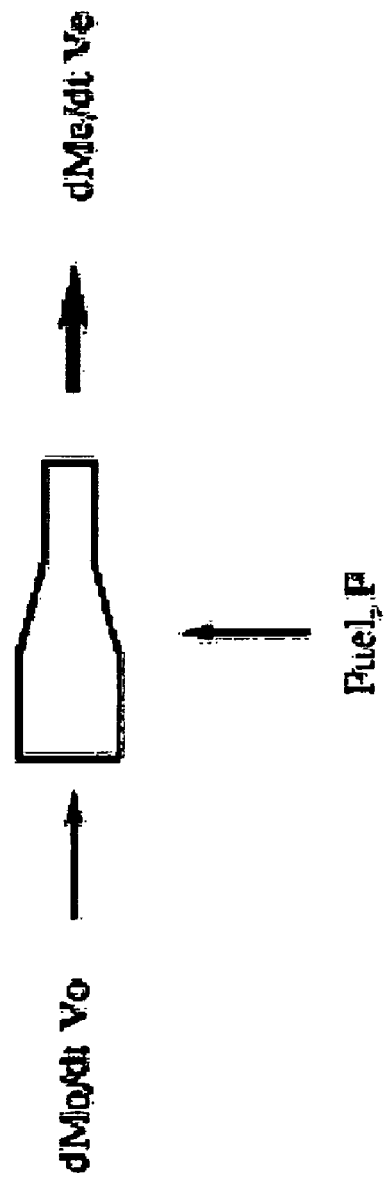
FIG. 26 illustrates in bock diagram form a general description of the methods and processes of a jet engine.

The WCT will have applications wherein the recycling or uses of the exhaust gasses of combustion create high operating pressures. Further, it is very feasible that there may be unintended operating situations, wherein the operating pressure becomes greater than the design pressure of the equipment employed; any such situation can be a significant safety issue. In the case of the internal combustion engine, a significant industry paradigm shift may be required for the industry to even consider trapping and recycling combustion engine exhaust gases. The discovered WCT will contain at least one of: $H_2$, $N_2$, $O_2$, $H_2O$ and/or any combination therein at various pressures in many aspects of the invention. To ensure that the WCT operate safely, in the event of an equipment operating failure or of equipment operating in excess of the intended pressure, pressure relief is preferred. Pressure relief can limit the potential event of a catastrophic failure. It is preferred that pressure relief device(s) be installed throughout the WCT as those devices are known in the art and as are normally located via a Failure Mode and Effect Analysis and/or a Fault Tree Analysis. Example devices include pressure relief valves, rupture discs and pressure relief control loops. It is most preferred that a pressure relief device be installed downstream of any compression generating portion of the WCT. As such, it is most preferred that pressure relief device(s) be installed immediately downstream of any compressor and in the combustion engine exhaust. FIGS. 2 through 18 approximate the location of pressure control/relief in the combustion engine exhaust. FIG. 24 approximates pressure relief designs.

WCT Engine and Apparatus

Referring to FIGS. 3 through 18, a combustion engine (CE) is symbolically shown for receiving as fuel $H_2$ and at least one of: $O_2$ and air. Said combustion engine may be of any type, wherein combustion is performed to generate at least one of: mechanical torque, heat, thrust, electricity and/or any combination therein. It is preferred that $H_2O$ be received in the combustion chamber, along with said fuel, said $H_2O$ in the combustion chamber is to be termed combustion $H_2O$.

$H_2$ flowing to CE is to have a flow. $O_2$ flowing to CE to have a flow. Air flowing to CE is to have a flow. Means to measure said $H_2$ flow, measure said $O_2$ flow and measure said air flow are to be provided such that a proportional signal in relation to flow is sent to the CE controller (CONT) from each of said $H_2$ flow measuring device, said $O_2$ flow measuring device and said air flow measuring device. $H_2$ flowing to CE is to have flow valve(s). $O_2$ flowing to CE to have flow control valve(s). Air flowing to CE is to have flow control device(s) in the form of a valve or a compressor. CONT is to have as input said $H_2$ flow signal, said $O_2$ flow signal and said air flow signal. Said controller is to receive an input signal from an external source indicating the combustion setpoint. Said controller is to compare said combustion setpoint to said $H_2$ flow signal, sending a proportional signal to said $H_2$ flow control valve that is in proportion to the difference in the combustion setpoint and the $H_2$ flow signal, thereby proportioning said $H_2$ flow control valve. CONT is to compare said $O_2$ flow signal and said air flow signal to an $H_2/O_2$ ratio setpoint, providing a proportional signal to an $O_2$ flow control valve and to an air flow control device, wherein: said $H_2$ flow, said $O_2$ flow and said air flow are such that the molar ratio of $H_2/O_2$ is approximately 2:1. In the case wherein said $O_2$ flow control valve signal is not near approximately 100%, CONT sends a signal to close said air flow control device. In the case wherein said $O_2$ flow control valve signal is near approximately 100%, CONT compares said $O_2$ flow signal and said air flow signal to said $H_2/O_2$ ratio setpoint obtaining an air flow difference, sending a proportional signal to said air flow control device that is in proportion to said difference, thereby proportioning said air flow control device.

To conserve energy, as depicted in FIG. 20, it is preferred that the $H_2$ flow control valve(s) consist of a two staged system of flow control valves. The first $H_2$ flow control valve, downstream of generated $H_2$ and downstream of $H_2$ storage is to control $H_2$ flow to CE. The second $H_2$ flow control valve (for installations that have generated $H_2$) is to be located from the generated $H_2$ line and be located in the $H_2$ line flow from $H_2$ storage. The second $H_2$ flow control valve is to remain closed until the first $H_2$ control valve is near approximately 100% open (thereby assuring full usage of generated $H_2$ prior usage of stored $H_2$) at which time the second $H_2$ flow control valve will begin opening to supply $H_2$ from storage.

To conserve energy, as depicted in FIG. 20, it is preferred that the $O_2$ flow control valve(s) consist of two staged flow control valves. The first $O_2$ flow control valve, downstream of generated $O_2$ and downstream of $O_2$ storage is to control $O_2$ flow to CE. The second $O_2$ flow control valve is to be located from the generated $O_2$ line and be located in the $O_2$ line flow from $O_2$ storage. The second $O_2$ flow control valve is to remain closed until the first $O_2$ control valve is near approximately 100% open (thereby assuring full usage of generated $O_2$ prior usage of stored $O_2$) at which time the second $O_2$ flow control valve will begin opening to supply $O_2$ from storage.

It is preferred that said combustion $H_2O$ have flow to said combustion chamber(s) in CE. It is preferred that a source of coolant flow to and/or through the block of CE. It is preferred that a temperature measurement device have a means of measuring combustion temperature and/or CE block temperature near the combustion chamber(s) of CE. Means to measure said combustion $H_2O$ flow and measure said combustion temperature are to be provided such that a proportional signal is sent to a controller (CONT) from each of said combustion $H_2O$ flow measuring device and said combustion temperature measuring device. CONT is to have as input said combustion $H_2O$ flow signal, afore said $H_2$ flow signal and said temperature signal. It is preferred that CONT have a hot temperature setpoint, a coolant temperature setpoint, a warm temperature setpoint and an $H_2/H_2O$ ratio setpoint. It is preferred that CONT compare afore said $H_2$ flow signal and said combustion $H_2O$ flow signal to said $H_2/H_2O$ ratio setpoint, in combination with comparing said temperature signal to said warm temperature setpoint, said coolant temperature setpoint, said hot temperature setpoint and provide a proportional signal to said combustion $H_2O$ flow control vale and to said coolant flow control valve.

In the case wherein said temperature signal is less than said warm temperature setpoint, less than said coolant temperature setpoint and less than said hot temperature setpoint, it is preferred that CONT send a signal to said coolant flow control valve to close said coolant flow control valve; and send a signal to said combustion $H_2O$ flow control valve to close said combustion $H_2O$ flow control valve.

In the case wherein said temperature signal is equal to or greater than said warm temperature to setpoint, less than said coolant temperature setpoint and less than said hot temperature setpoint, it is preferred that CONT send a signal to said coolant flow control valve to close said coolant flow control valve; and send a signal to said combustion $H_2O$ flow control valve, wherein said signal is proportional to the difference between said measured temperature signal and the warm temperature setpoint, and wherein the $H_2/H_2O$ ratio is greater than said $H_2/H_2O$ ratio setpoint, thereby proportioning said combustion $H_2O$ flow control valve.

In the case of said temperature signal greater than said warm temperature setpoint, equal to or greater than said coolant setpoint and less than said hot temperature setpoint, it is preferred that CONT send a signal to the combustion $H_2O$ flow control valve, wherein the $H_2/H_2O$ ratio is equal to said $H_2/H_2O$ ratio setpoint, thereby proportioning said combustion water flow control valve; and send a signal to said coolant flow control valve, wherein said signal is proportional to the difference between said temperature signal and said coolant setpoint, thereby proportioning said coolant flow control valve.

In the case wherein the temperature signal is greater than said warm temperature setpoint, greater than said coolant setpoint and equal to or greater than said hot temperature setpoint, it is preferred that CONT send a signal to open the combustion $H_2O$ flow control valve 100%, which obtains a $H_2/H_2O$ ratio less than said $H_2/H_2O$ setpoint; and send a signal in proportion to the difference between the temperature signal and said coolant setpoint to said coolant flow valve, thereby proportioning said coolant flow control valve; and send a signal to said $H_2$ flow control valve, thereby closing said $H_2$ flow control valve; and send a signal to said $O_2$ flow control valve, thereby closing said $O_2$ flow control valve; and send a signal to said air flow control device, thereby closing said air flow control device.

It is most preferred that the WCT Engine operate at a temperature between said warm temperature setpoint and said coolant temperature setpoint. It is preferred that energy not leave the WCT engine via coolant. It is most preferred that required engine cooling be performed by the addition of combustion $H_2O$ to the combustion chamber(s).

Said WCT Engine is to preferably obtain $O_2$ from at least one of $O_2$ storage, cryogenic distillation, membrane separation, PSA, electrolysis of $H_2O$ and/or any combination therein. Said cryogenic distillation is to obtain $O_2$ from at least one of air and/or electrolysis of $H_2O$, Said membrane separation and/or said PSA is preferably to obtain $O_2$ from air. Said cryogenic distillation and/or said membrane separation and/or said PSA is to preferably be powered by said WCT Engine. Said $O_2$ storage is to preferably be performed at cryogenic temperatures. The mechanical energy for said cryogenic storage is preferably created by said WCT Engine.

Said WCT Engine is preferably to obtain $H_2$ from at least one of $H_2$ storage, steam corrosion of a metal(s), electrolysis of $H_2O$ and/or any combination therein. Said steam, to produce $H_2$ from said corrosion, is preferably an exhaust product of said WCT Engine. Said $H_2$ storage is to preferably be performed at cryogenic temperatures. The mechanical energy for said cryogenic storage is preferably created by said WCT Engine.

Afore said electrolysis of $H_2O$ is preferably to obtain electrical energy for electrolysis from a generator driven by at least one of a steam turbine, mechanical rotating energy, an air turbine powered by the energy of moving air, a water turbine powered by the energy of moving water and/or any combination therein and/or photovoltaic cell(s). It is preferred that said electrical energy be regulated. In the case wherein an alternator or dynamo is used, it is preferred that said electrical energy be converted from an alternating current to a direct current. Said steam turbine is most preferably powered by steam generated by afore said WCT Engine. Said mechanical rotating energy is preferably powered by afore said WCT Engine.

The WCT Engine is to preferably generate mechanical energy in the form of torque. It is preferred that said mechanical energy turn a generator, wherein said generator create electrical energy. Exhaust from said WCT Engine is preferably to turn a steam turbine, wherein said steam turbine turns a generator, wherein said generator creates electrical energy. It is preferred that at least a portion of said electrical energy is used to electrolytically convert $H_2O$ into $H_2$ and $O_2$. It is most preferred to use a portion of said $H_2$ and/or said $O_2$ as fuel for said WCT Engine.

Materials of construction for the WCT Engine, the fuel and energy management systems and apparatus are to be those as known in the art for each application as said application is otherwise performed in the subject art. For example, various composite and metal alloys are known and used as materials for use at cryogenic temperatures. Various composite and metal alloys are known and used as materials for use at operating temperatures of over 500° F. Various ceramic materials can be conductive, perform at operating temperatures of over 2,000° F., act as an insulator, act as a semiconductor and/or perform other functions. Various iron compositions and alloys are known for their performance in combustion engines that operate approximately in the 200 to 1,500° F. range. Titanium and titanium alloys are known to operate over 2,000 and 3,000° F. Tantalum and tungsten are known to operate well over 3,000° F. It is preferred to have at least a portion of the construction of the WCT Engine contain an alloy composition wherein at least one of a period 4, period 5 and/or a period 6 heavy metal is used, as that metal(s) is known in the art to perform individually or to combine in an alloy to limit corrosion and/or perform in a cryogenic temperature application and/or perform in a temperature application over 1,000° F. While aluminum is lightweight and can perform limited structural applications, aluminum is limited in application temperature. Due to the operating temperatures involved in the WCT Engine, thermoplastic materials are not preferred unless the application of use takes into account the glass transition temperature and the softening temperature of the thermoplastic material.

Example 1

A traditional gasoline internal combustion engine obtains approximately 20 miles per gallon. Performing an energy balance on the engine, according to FIG. 2:

$$E_F = E_W + E_{EX} + E_C + E_{fric} + C_E$$

$$E_F = 20 \ mpg + \approx 35\% \ E_F + \approx 35\% \ E_F + \approx 9\% \ E_F + \approx 1\% \ E_F$$

$$E_F = E_W + \approx 80\% \ E_F \text{ in energy losses for internal CE(s).}$$

$$E_F = 20 \ mpg + 80\% \ E_F; \ E_F = 100 \ mpg \text{ and } E_W \approx 20\% \ E_F$$

Again, $$E_F = E_W + E_{EX} + E_C + E_{fric} + C_E$$

Assuming: 1) complete engine insulation, 2) a steam turbine With 80% efficiency, 2) a generator With 90% efficiency and 3) an electrolysis unit With 80% efficiency turns $E_X$ and $E_C$ together into approximately 30% $E_F$. Using WCT, $$E_F = E_W + 30\% \ E_F + \approx 9\% \ E_F + \approx 1\% \ E_F$$

$$E_F = E_W + \approx 40\% \ E_F \text{ (energy losses); } E_W (\text{WCT}) = 60\% \ E_F$$

Example 2

Referencing CRC Handbook of Chemistry and Physics, the total available combustion energy for n-Octane is approximately 1,300 kcal/mole; at 114 lb/lb mole $E_F$=11.4 kcal/g and at 454 g/lb. $E_F$=5176 kcal/lb. (This excludes endothermic losses in the formation of $NO_X$.) Further, the density of n-Octane is approximately 5.9 lb/gallon, which leads to energy figures for n-Octane in the average automobile:

$$E_F \approx 100 \ mpg = 17 \ mile/lb. = 5176 \ kcal/lb.; \ E_W \approx 20 \ mpg = 3.4 \ mile/lb. = 1143 \ kcal/lb.$$

The total available energy for the combustion of hydrogen is 68 kcal/mole; at 2 lb/lb mole $E_F$=34 kcal/g=15436 kcal/lb. Therefore, on a mass basis, $H_2$=34/11.4 3 times more energy per pound.

Using WCT, 60%/20%=3 times more efficient. Correlating, energy figures for WCT in the average automobile:

First, the fuel availability must be calculated. $H_2$ is 100% as delivered. Since cryogenics are at least approximately 16% efficient, the production of $O_2$ is conservatively estimated to be 16% efficient.

$$\tfrac{2}{3} \times 1 + \tfrac{1}{3} \times 0.16 \approx 70\%$$

(Therefore, approximately 30% of the energy of the $H_2$ and $O_2$ is used to generate $O_2$.)

$$E_F \approx \frac{17 \ mile/lb. \ Octane \times 0.70 \times 15436 \ kcal/lb. \ H_2 \times 3}{5176 \ kcal/lb. \ n\text{-}Octane} =$$

$$35.5 \ miles/lb. \ H_2;$$

$$E_W \approx 21.3 \ mile/lb. \ H_2$$

(Note: Every mole of $H_2$ requires ½ mole of generated $O_2$; therefore, at STP every psig of $H_2$ requires 0.5 psig of $O_2$.)

Example 3

According to the Chemical Market Reporter, $H_2$ has a market price of approximately \$0.50/lb. and gasoline has a price of approximately \$1.60 per gallon or approximately \$0.27 per pound. Utilizing traditional hydrocarbon combustion technology in transportation, the cost per mile for fuel is:

$0.27 per lb./3.4 mile per lb.=$0.08 per mile for gasoline

Utilizing the WCT with \$0.50/lb. $H_2$, the cost per mile for fuel is:

$0.50 per lb./21.3 mile per lb.=$0.023 per mile (This calculation can be altered to the current market price of hydrogen.)

Example 4

Electrical power plants currently produce electricity using a natural gas turbine followed by a steam turbine, wherein the energy for steam generation is transferred via a boiler from the exhaust gas of the natural gas turbine. As is typical in the industry:
The efficiency of combustion is approximately 99 percent.
The efficiency of the natural gas turbine is approximately 20 percent.
The efficiency of the boiler is approximately 85 percent.
The efficiency of the steam generator is approximately 90 percent.

Utilizing the above, the efficiency of electricity generation is approximately:

0.99×0.20+0.99×0.20×0.85×0.90=35 percent

For WCT utilizing the combustion/steam turbine configuration in FIG. 23A, appropriate assumptions for efficiency would be approximately:
The efficiency of combustion near 99 percent.
The efficiency of $O_2$ generation (cryogenics at least 16%) near 16 percent.
Hydrogen is delivered, thereby having 100% delivery efficiency.

Heat loss of water at exhaust $((1200° F.-212° F.)/1200° F.)\approx 80\%$ percent.

Friction losses near 12 percent.

Utilizing the above, the efficiency of electricity generation is approximately:

$$0.99\times(\tfrac{2}{3}\times1+\tfrac{1}{3}\times0.16)\times0.80\times0.88=50 \text{ percent}$$

(This can be improved if the final steam turbine operates at less than atmospheric pressure.)

Utilizing the above, incorporating:
An $H_2$ price of approximately $0.50 per pound.
A natural gas price of approximately $6.00 per thousand cubic feet.
A natural gas energy value of approximately 212 kcal/mole.

The cost of electricity production for WCT on a kcal basis is:

$$(15436 \text{ kcal./lb. } H_2)\times(\text{lb. } H_2/\$0.50)\times0.50=15436 \text{ kcal/\$}$$

The cost of electricity production for a traditional natural gas plant on a kcal basis is:

First convert cubic feet to pounds at STP and convert to kcal/lb.:

$$1000 \text{ cubic feet (tcf)}/360 \text{ cubic feet per lb. mole}=2.78 \text{ lb. mole}$$

$$2.78 \text{ lb. mole}\times16 \text{ lb./lb. mole}=44.5 \text{ lb. gas; } \$6.00/44.5 \text{ lb. gas}=\$0.135/\text{lb. gas}$$

$$(212 \text{ kcal/mole}\times454 \text{ mole/lb. mole gas})\times(\text{lb. mole gas}/16 \text{ lb. gas})=6016 \text{ kcal/lb. gas}$$

Second, estimate economics:

$$(6016 \text{ kcal/lb. gas})\times(\text{lb. gas}/\$0.135)\times0.35=15784 \text{ kcal/\$}$$

Example 5

In residential heating, natural gas is often used. Referencing above, the cost of natural gas heating, assuming 80% heat transfer efficiency is:

$$(\$8.00 \text{ per tcf}/45 \text{ lb. per tcf})\times0.80/13.25 \text{ kcal/lb.}=\$0.011/\text{kcal}$$

For WCT using membranes and referencing above with 40% efficiency:

$$\$0.50/\text{lb.}\times(\tfrac{2}{3}\times1+\tfrac{1}{3}\times0.40)\times0.80/34 \text{ kcal/lb.}=\$0.009/\text{kcal}$$

Example 6

Thrust=Force=$F=dMe/dt\ Ve-dMo/dt\ Vo$; Let $Me=Mo+M_F$, wherein $M_F$=mass of fuel.

$F=\int_{to}^{t1}\int_{Vo}^{Ve}Me-Mo=\int_{to}^{t1}\int_{Vo}^{Ve}Mo+M_F-Mo=\int_{to}^{t1}\int_{Vo}^{Ve}M_F$ For WCT, $F_{WCT}=\int_{to}^{t1}\int_{Vo}^{Ve}\{M_{H2}+M_{O2}+M_{H2O}\}$; $F_{Kerosene}F_K=\int_{to}^{t1}\int_{Vo}^{Ve}\{M_K+M_{O2}\}$ Assuming the same time integration and the same thrust velocity integration, then the comparison for thrust can be written as:

Is, $F_{WCT}\geq F_K$? And, therefore, Is $\{M_{H2}+M_{O2}+M_{H2O}\}\geq\{M_K+M_{O2}\}$?

And, then is $\{M_{H2}+M_{H2O}+M_{Air}\}\geq\{M_K+M_{Air}\}$?

And, then is $\{M_{H2}+M_{H2O}\}\geq\{M_K\}$?

And, then is $\{M_{H2}+M_{Air}\}\geq\{M_K+M_{Air}\}$?

$\Delta H_{H2}$=51,571 BTU/lb., $\Delta H_K$=19,314 BTU/lb., $H_2+\tfrac{1}{2}O_2\rightarrow H_2O\ \ C_{14}H_{30}+43/2O_2\rightarrow14CO_2+15H_2O$ 1 lb.+8 lb.$\rightarrow$9 lb. 1 lb.+3.47 lb.$\rightarrow$3.11 lb.+1.36 lb.

$Cp_K$=0.6 BTU ° F./lb., $Cp_{H2O}\approx$0.46 BTU ° F./lb., $Cp_{H2}$=3.45 BTU ° F./lb., $Cp_{Air}$=0.46 BTU ° F./lb.; $\Delta H_{V,H2O}$=974 BTU/lb., $\Delta H_{F,H2O}$=144 BTU/lb., Kerosene(K) a liquid, $H_2$ vaporized by ambient temperature Assuming stoichiometric air and thereby the same combustion exhaust temperature$\approx$1000° F., then there is approximately 1000° F. temperature differential to combustion temperature. (Note air is 18% $O_2$.) Doing an energy balance:

$\Delta H$ Combustion=$\Sigma\Delta H$'s $\Delta H_K=Cp_K(\text{lb. K})(1000)+Cp_{AIR}(3.47/0.18)(1000)+Cp_{AIR}(\text{lb. AIR})(1000)$ 19,314=(0.6)(1)(1000)+0.46(3.47/0.18)(1000)+0.46(lb. Air)(1000)

19,314=600+8868+460(lb. Air), Air (cooling)=21 lb., Total air=21+3.47/0.18=40.3 lb.

For K, 1 lb. K/40.3 lb. air=41.3 lb. thrust @ 1000° F. (40.3 lb. air/lb. K$\approx$1000 ft.$^3$ air/lb. K) $\Delta H_{H2}$=3.45(1×1000)+0.46(8/0.18×1000)+0.46(lb. $H_2O$)(1000)+974(lb. $H_2O$)

51,571=3450+20,444+1434(lb. $H_2O$), $H_2O$ cooling=19.3 lb., Air=8/0.18=44.4 lb.

For $H_2$, 1 lb. $H_2$/44.4 lb. air/19.3 lb. $H_2O$=64.7 lb. thrust. (Note this design requires a 10% increase in intake air compression system capability while maintaining 1000° F. exhaust temperature.) If the same air is used with no $H_2O$ cooling, then the fuel is reduced by 19,314/51,571=0.374, 19,314=3.45(0.374)(1000)+0.46(8/0.18)(0.374×1000)+0.46(lb. Air)(1000), Air (cooling)=22.6 lb.; Air combustion=8(0.374)/0.18=16.62 lb., total air=39.22 lb.

For $H_2$ w/air cooling, 0.37 lb. $H_2$/39.22 lb. Air=39.6 lb. Thrust, a 5% reduction @ 1000° F. (39.22 lb. air/0.37 lb. $H_2$=106 lb. air/lb. $H_2$ 2630 ft.$^3$ air/lb. $H_2$. (Note this design requires a 160% increase in intake air compression system capability to maintain 1000° F. exhaust temperature.).

Previous issues with $H_2$ are $H_2$ requires 160% more air per pound than Kerosene to burn at the same temperature. $H_2$ requires an air increase/air compressor capability increase to perform similar to Kerosene.

Evaluation of Alternative Propulsion Options:

Sg of Liquid $H_2$=0.07; Sg of Liquid $O_2$=1.14; Sg of $H_2O$=1.00; Sg of K=0.80 0.8/0.07=11.4 times the volume; however at (51,571/19,314)2.67 times the energy, 11.4/2.67=4.27 times the volume, say 4.3 times the volume.

While every lb. of $H_2O$ equals a lb. of thrust, there is no thrust multiplication effect for the $H_2O$, as there is with fuel. There is a benefit to create a hydrogen gel with $H_2O$ instead of the currently produced hydrogen methane gel. However, ice sublimation energy will slightly reduce thrust:

19,314=3.45(0.374)(1000)+0.46(8/0.18)(0.374)(1000)+0.46(lb. Air)(1000)+144(0.0374)+0.46 (0.0374)(1000)

10,355=460(lb. Air, Air (cooling)=22.5 lb.:.

Thrust=22.5+8/0.18(0.374)+0.374+0.0374=39.5 lb.

Moving to $H_2$ and $O_2$ Systems w/Air Cooling:

51,571=3.45(1×1000)+0.44(8×1000)+0.46 (lb. Air)(1000), Air (cooling)=97 lb.

Thrust=105 lb., lb. Thrust/lb. fuel=105/9=11.67

Moving to $H_2$ and $O_2$ Systems with $H_2O$ Cooling:

51,571=3.45(1)(1000)+0.44(8)(1000)+0.46 (lb. $H_2O$)(1000)+144(lb. $H_2O$)

$H_2O$ (cooling)=73 lb.

Thrust=82 lb., lb. Thrust/lb. fuel=1.0

Both systems with $O_2$ could contain an $O_2$ gel with $H_2O$ as the frozen component. In all WCT applications, $H_2$ could be a $H_2$ gel with $H_2O$ as the frozen component. In rocket applications, the hydrogen could be mixed with frozen water and with frozen oxygen to create a hydrogen/oxygen/water gel. The molar ration of $H_2/O_2$ would be preferably 2, and the amount of water in the gel would depend on the cooling desired versus the acceptable explosivity of the gel. (Extremely explosive mixture.) Hydrogen has a wide combustion window, approximately 5 to 90% in air.

Preferred Embodiments

1. Preferred operation is $H_2$ with air while stoichiometrically increasing the jet air intake for $H_2$ thermodynamics and/or to operate with excess air for cooling.
2. To increase thrust, $H_2$ with $O_2$ and excess air cooling is most preferred. To increase thrust $H_2$, $O_2$ with $H_2O$ is preferred.
3. It is preferred to use $H_2$ and air at altitudes wherein there is enough air available. $H_2$, $O_2$ and air is preferred at moderate altitudes and high altitudes. $H_2$, $O_2$ and $H_2O$ is preferred at all altitudes and most preferred at very high altitudes, such as in a space plane application.
4. $H_2$, $O_2$ and air is preferred in after burn or high thrust situations, thereby increasing thrust capability upwards of 150% over that available with K or $H_2$ combined with air.
5. $H_2O$ is preferred to cool exhaust, thereby reducing the WCT heat signature and the ability of a heat seeking missile to find the WCT.

Certain objects are set forth above and made apparent from the foregoing description. However, since certain changes may be made in the above description without departing from the scope of the invention, it is intended that all matters contained in the foregoing description shall be interpreted as illustrative only of the principles of the invention and not in a limiting sense. With respect to the above description, it is to be realized that any descriptions, drawings and examples deemed readily apparent and obvious to one skilled in the art and all equivalent relationships to those described in the specification are intended to be encompassed by the present invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is also to be understood that the following claims are intended to cover all of the generic and specific features of the invention herein described, and all statements of the scope of the invention, which, as a matter of language, might be said to fall in between.

I claim:

1. An engine comprising a combustion chamber, wherein a mixture of oxygen, as $O_2$, and hydrogen, as $H_2$, is combusted, creating steam, wherein
    at least a portion of the oxygen is obtained by the separation of air, wherein
    the separation of air is selected from the group consisting of:
    (a) cryogenic separation,
    (b) membrane separation,
    (c) pressure swing adsorption, and
    any combination thereof, wherein
    the air separation is at least partially powered by torque or mechanical rotating energy, wherein
        the torque or mechanical rotating energy is at least partially obtained from at least one of:
    the steam turning a steam turbine,
    the steam in the combustion chamber driving a piston,
    the steam in the combustion chamber driving a steam turbine, and
    any combination therein, and wherein
    the temperature of combustion is at least partially controlled with the addition of water or steam to the combustion chamber in a way that maintains the temperature of combustion or of combustion exhaust.

2. The engine of claim 1, wherein said torque or said mechanical rotating energy turns a generator to create electrical energy.

3. The engine of claim 1, wherein the steam produced by combustion turns a steam turbine, and wherein
    said steam turbine turns a generator to create electrical energy.

4. The engine of claim 1, wherein heat is created.

5. The engine of claim 2 or 3, wherein at least a portion of said electrical energy is used in the electrolysis of water to hydrogen and oxygen, and wherein
    at least a portion of at least one of said hydrogen and oxygen is used in said mixture.

6. The engine of claim 1, further comprising nitrogen or argon in said mixture.

7. The engine of claim 1, wherein said oxygen further comprises air.

8. The engine of claim 1, wherein at least a portion of the steam produced by combustion is converted to hydrogen by the corrosion of at least one metal.

9. The engine of claim 8, wherein the conversion of said steam into said hydrogen is increased by an electrical current in said metal(s).

10. The engine of claim 8 or 9, wherein said hydrogen is at least partially used in said mixture.

11. The engine of claim 1, wherein a generator turns due to the movement of air or water, and wherein
    said generator creates electrical energy, and wherein
    said electrical energy is at least partially utilized in the electrolysis of water to hydrogen and oxygen, and wherein
    at least a portion of at least one of said hydrogen and oxygen is used in said mixture.

12. The engine of claim 1, wherein a photovoltaic cell creates electrical energy, wherein
    said electrical energy is at least partially used in the electrolysis of water to hydrogen and oxygen, and wherein
    at least a portion of at least one of said hydrogen and oxygen is used in said mixture.

13. The engine of claim 1, wherein at least a portion of the nitrogen separated from air in said cryogenic air separation unit is used to cool any portion of at least one selected from a list consisting of: said cryogenic air separation unit, the storage of oxygen, the storage of hydrogen, electrolysis, coolant for said engine, said engine and any combination thereof.

14. The engine of claim 13, wherein said nitrogen separated from air in said cryogenic air separation unit is at least partially used to cool air or water.

15. The engine of claim 1, wherein said oxygen separated from air is at least one of enriched oxygen, pure oxygen and very pure oxygen.

16. The engine of claim 1, wherein at least one selected from a list consisting of a: corrosion inhibitor, chelant, dispersant and any combination therein is added to at least a portion of the water in said engine.

17. The engine of claim 1, wherein said engine performs at least one of: internal, turbine and heating combustion.

18. The engine of claim 1, wherein at least one of oxygen and hydrogen is stored in at least one of a cooled gas state and a liquid state by liquefaction.

19. The engine of claim 18, wherein compressor(s) for at least one of cooling and liquefaction is powered by at least one of said engine and a fuel cell.

20. The engine of claim 19, wherein said fuel cell is powered by hydrogen and at least one of oxygen and air.

21. The engine of claim 1, wherein at least one of said hydrogen and oxygen is stored in a mixture with frozen water crystals to form a gel.

22. The engine of claim 1, wherein at least one selected from a list consisting of: hydrogen, oxygen and water is preheated prior to combustion with the energy from at least one selected from a list consisting of: ambient temperature, said engine, said engine exhaust, an electrical radiant heat source and any combination therein.

23. The engine of claim 1, wherein said mechanical rotating energy enters a transmission, wherein
said transmission engage in a manner that is inversely proportional to at least one of the torque and work output of said engine, and wherein
said transmission output mechanical rotating energy turns a generator to create electrical energy.

24. The engine of claim 23, wherein said transmission engage a flywheel capable of storing said mechanical rotational energy.

25. The engine of claim 23, wherein at least a portion of said electrical energy is used in the electrolysis of water to hydrogen and oxygen.

26. The engine of claim 25, wherein at least a portion of at least one of said hydrogen and oxygen is used in said mixture.

27. The engine of claim 1 or 3, wherein a pressure control device is in said engine exhaust.

28. The engine of claim 1, wherein at least one of said engine combustion heat energy and said engine exhaust energy is used to heat at least one of a gas and a liquid.

29. The engine of claim 28, wherein at least one of the gas is air and the liquid is water.

30. The engine of claim 29, wherein said exhaust discharge directly into said air or water.

31. The engine of claim 1, wherein at least a portion of said engine is insulated.

32. The engine of claim 1, wherein hydrogen is separated from at least one selected from a list consisting of: water, air, nitrogen, oxygen and any combination thereof within said air separation unit.

33. The engine of claim 1, wherein the temperature of said engine exhaust is at least partially cooled with the addition of water to said engine exhaust.

34. The engine of claim 33, comprising jet propulsion.

35. The engine of claim 1 or 33, comprising rocket propulsion.

36. The engine of claim 1, wherein said engine comprises a turbine.

37. The engine of claim 1, comprising jet propulsion wherein air is stoichiometrically increased in the jet intake for hydrogen thermodynamics and/or to operate with excess air for cooling.

* * * * *